United States Patent
Ong et al.

(10) Patent No.: US 8,792,075 B2
(45) Date of Patent: Jul. 29, 2014

(54) PIXELS HAVING EXTRA-PLANAR FRINGE FIELD AMPLIFIERS AND SLICED COMMON ELECTRODES FOR MULTI-DOMAIN VERTICAL ALIGNMENT LIQUID CRYSTAL DISPLAYS

(75) Inventors: Hiap L. Ong, Warren, NJ (US); Juishu Chou, Taipei (TW)

(73) Assignee: Hiap L. Ong and Kyoritgu Optronics Co. Ltd. (TW)

( * ) Notice: Subject to any disclaimer, the term of this patent is extended or adjusted under 35 U.S.C. 154(b) by 116 days.

(21) Appl. No.: 13/341,803

(22) Filed: Dec. 30, 2011

(65) Prior Publication Data

US 2012/0274884 A1 Nov. 1, 2012

Related U.S. Application Data

(60) Continuation-in-part of application No. 12/721,559, filed on Mar. 10, 2010, now Pat. No. 8,446,536, and a continuation-in-part of application No. 12/573,085, filed on Oct. 2, 2009, now Pat. No. 8,427,592, which is a continuation-in-part of application No. 11/751,454, filed on May 21, 2007, now Pat. No. 8,107,030, said application No. 12/721,559 is a continuation-in-part of application No. 11/751,454, which is a continuation-in-part of application No. 11/751,387, filed on May 21, 2007, now Pat. No. 7,956,958, which is a continuation-in-part of application No. 11/227,595, filed on Sep. 15, 2005, now Pat. No. 7,630,033, said application No. 12/721,559 is a continuation-in-part of application No. 12/492,098, filed on Jun. 25, 2009, now Pat. No. 8,040,472, which is a division of application No. 11/227,595.

(51) Int. Cl.
G02F 1/1343 (2006.01)

(52) U.S. Cl.
USPC .............................. 349/141; 349/37; 349/108

(58) Field of Classification Search
USPC ........... 349/129, 108, 106, 37, 139, 141, 143, 349/144
See application file for complete search history.

(56) References Cited

U.S. PATENT DOCUMENTS 7,663,708 B2 * 2/2010 Wang et al. ..................... 349/37
7,859,631 B2 * 12/2010 Lee et al. ....................... 349/144

* cited by examiner

Primary Examiner — Thoi Duong
(74) Attorney, Agent, or Firm — Silicon Valley Group, LLP.; Edward S. Mao

(57) ABSTRACT

A multi-domain vertical alignment liquid crystal display using fringe field amplification is disclosed. Each pixel is subdivided into color dots. Further more each pixel contains extra-planar fringe field amplifiers that separate the color dots of a pixel. The voltage polarity of the color dots and extra-planar fringe field amplifiers are arranged so that fringe fields in each color dot causes multiple liquid crystal domains in each color dot. Specifically, the color dots and the extra-planar fringe field amplifiers are arranged so that neighboring polarized elements have opposite polarities. The performance of the display is further enhanced by using a sliced common electrode having common electrode slices over the color dots.

9 Claims, 30 Drawing Sheets

PIXELS HAVING EXTRA-PLANAR FRINGE FIELD AMPLIFIERS AND SLICED COMMON ELECTRODES FOR MULTI-DOMAIN VERTICAL ALIGNMENT LIQUID CRYSTAL DISPLAYS

RELATED APPLICATIONS

The present application is a Continuation-In-Part of and claims the benefit of U.S. Utility patent application Ser. No. 12/721,559 entitled "Pixels having Extra-Planar Fringe Field Amplifiers for Multi-Domain Vertical Alignment Liquid Crystal Displays" by Hiap L. Ong, filed Oct. 2, 2009, which is incorporated herein in its entirety by reference. U.S. Utility patent application Ser. No. 12/721,559 is a Continuation-In-Part of and claims the benefit of U.S. Utility patent application Ser. No. 12/573,085 entitled "Pixels having Fringe Field Amplifying Regions for Multi-Domain Vertical Alignment Liquid Crystal Displays" by Hiap L. Ong, filed Oct. 2, 2009. U.S. Utility patent application Ser. No. 12/573,085, is also a Continuation-In-Part of and claimed the benefit of U.S. Utility patent application Ser. No. 11/751,454 (Publication serial number US 2008/0002072 A1), entitled "Pixels Using Associated Dot Polarity for Multi-Domain Vertical Alignment Liquid Crystal Displays" by Hiap L. Ong, filed May 21, 2007, which is incorporated herein in its entirety by reference.

U.S. Utility patent application Ser. No. 12/721,559 is a Continuation-In-Part of and claims the benefit of U.S. Utility patent application Ser. No. 11/751,454 (Publication serial number US 2008/0002072 A1), entitled "Pixels Using Associated Dot Polarity for Multi-Domain Vertical Alignment Liquid Crystal Displays" by Hiap L. Ong, filed May 21, 2007.

U.S. Utility patent application Ser. No. 12/721,559 is also a Continuation-In-Part of and claims the benefit of U.S. Utility patent application Ser. No. 11/751,387 (Publication serial number US 2009/00262271 A1), entitled "Large Pixel Multi-Domain Vertical Alignment Liquid Crystal Display Using Fringe Fields" by Hiap L. Ong, filed May 21, 2007. U.S. Utility patent application Ser. No. 12/492,098 is a continuation-in-part of U.S. Utility patent application Ser. No. 11/227,595 (now issued as U.S. Pat. No. 7,630,033), entitled "Large Pixel multi-domain vertical alignment liquid crystal display using fringe fields" by Hiap L. Ong, filed Sep. 15, 2005, and is incorporated herein in its entirety by reference.

U.S. Utility patent application Ser. No. 12/721,559 is a Continuation-In-Part of and claims the benefit of U.S. Utility patent application Ser. No. 12/492,098 (Publication serial number US 2009/00262271 A1), entitled "Large Pixel Multi-Domain Vertical Alignment Liquid Crystal Display Using Fringe Fields" by Hiap L. Ong, filed Jun. 25, 2009. U.S. Utility patent application Ser. No. 12/492,098 is a divisional of U.S. Utility patent application Ser. No. 11/227,595 (now issued as U.S. Pat. No. 7,630,033), entitled "Large Pixel multi-domain vertical alignment liquid crystal display using fringe fields" by Hiap L. Ong, filed Sep. 15, 2005, and is incorporated herein in its entirety by reference.

BACKGROUND OF THE INVENTION

1. Field of the Invention

The present invention relates to liquid crystal displays (LCDs). More specifically, the present invention relates large-pixel multi-domain vertical alignment LCDs.

2. Discussion of Related Art

Liquid crystal displays (LCDs), which were first used for simple monochrome displays, such as calculators and digital watches, have become the dominant display technology. LCDs are used routinely in place of cathode ray tubes (CRTs) for both computer displays and television displays. Various drawbacks of LCDs have been overcome to improve the quality of LCDs. For example, active matrix displays, which have largely replaced passive matrix displays, reduce ghosting and improve resolution, color gradation, viewing angle, contrast ratios, and response time as compared to passive matrix displays.

However, the primary drawbacks of conventional twisted nematic LCDs are the very narrow viewing angle and low contrast ratio. Even the viewing angle of active matrixes is much smaller than the viewing angle for CRT. Specifically, while a viewer directly in front of an LCD receives a high quality image, other viewers to the side of the LCD would not receive a high quality image. Multi-domain vertical alignment liquid crystal displays (MVA LCDs) were developed to improve the viewing angle and contrast ratio of LCDs. FIGS. 1(a)-1(c) illustrate the basic functionality of a pixel of a vertical alignment LCD 100. For clarity, the LCD of FIG. 1 uses only a single domain. Furthermore, for clarity, the LCDs of FIGS. 1(a)-1(c) (and FIG. 2) described in terms of gray scale operation.

LCD 100 has a first optical polarizer 105, a first substrate 110, a first electrode 120, a first alignment layer 125, liquid crystals 130, a second alignment layer 140, a second electrode 145, a second substrate 150, and a second optical polarizer 155. Generally, first substrate 110 and second substrate 150 are made of a transparent glass. First electrode 120 and second electrode 145 are made of a transparent conductive material such as ITO (Indium Tin Oxide). First alignment layer 125 and second alignment layer 140, which are typically made of a polyimide (PI) layer, align liquid crystals 130 vertically in a resting state. In operation, a light source (not shown) sends light from beneath first optical polarizer 105, which is attached to first substrate 110. First optical polarizer 105 is generally polarized in a first direction and second optical polarizer 155, which is attached to second substrate 150, is polarized perpendicularly to first optical polarizer 105. Thus, light from the light source would not pass through both first optical polarizer 105 and second optical polarizer 155 unless the light polarization is rotated by 90 degrees between first optical polarizer 105 and second optical polarizer 155. For clarity, very few liquid crystals are shown. In actual displays, liquid crystals are rod like molecules, which are approximately 5 angstroms in diameter and 20-25 angstroms in length. Thus, there are over 12 million liquid crystal molecules in a pixel that is 120 μm width by 360 μm length by 3 μm height.

In FIG. 1(a), liquid crystals 130 are vertically aligned. In the vertical alignment, liquid crystals 130 would not rotate light polarization from the light source. Thus, light from the light source would not pass through LCD 100 and gives a completely optical black state and a very high contrast ratio for all color and all cell gap. Consequently MVA LCDs provide a big improvement on the contrast ratio over the conventional low contrast twisted nematic LCDs. However, as illustrated in FIG. 1(b), when an electric field is applied between first electrode 120 and second electrode 145, liquid crystals 130 reorientate to a tilted position. Liquid crystals in the tilted position rotate the polarization of the polarized light coming through first optical polarizer 105 by ninety degrees so that the light can then pass through second optical polarizer 155. The amount of tilting, which controls the amount of light passing through the LCD (i.e., brightness of the pixel), is proportional to the strength of the electric field. Generally, a single thin-film-transistor (TFT) is used for each pixel. However for color displays, a separate TFT is used for each color component (typically, Red, Green, and Blue)

However, the light passing through LCD 120 is not uniform to viewers at different viewing angles. As illustrated in FIG. 1(c), a viewer 172 that is left of center would see a bright pixel because the broad (light rotating) side of liquid crystals 130 face viewer 172. A viewer 174 that is centered on the pixel would see a gray pixel because the broad side of liquid crystals 130 is only partially facing viewer 174. A viewer 176 that is right of center would see a dark pixel because the broad side of liquid crystals 130 is barely facing viewer 176.

Multi-domain vertical alignment liquid crystal displays (MVA LCDs) were developed to improve the viewing angle problems of single-domain vertical alignment LCDs. FIG. 2 illustrates a pixel of a multi-domain vertical alignment liquid crystal display (MVA LCD) 200. MVA LCD 200 includes a first optical polarizer 205, a first substrate 210, a first electrode 220, a first alignment layer 225, liquid crystals 235, liquid crystals 237, protrusions 260s, a second alignment layer 240, a second electrode 245, a second substrate 250, and a second optical polarizer 255. Liquid crystals 235 form the first domain of the pixel and liquid crystals 237 form the second domain of the pixel. When an electric field is applied between first electrode 220 and second electrode 245, protrusions 260 cause liquid crystals 235 to tilt in a different direction than liquid crystals 237. Thus, a viewer 272 that is left of center would see the left domain (liquid crystals 235) as black and the right domain (liquid crystals 237) as white. A viewer 274 that is centered would see both domains as gray. A viewer 276 that is right of center would see the left domain as white and the right domain as black. However, because the individual pixels are small, all three viewers would perceive the pixel as being gray. As explained above, the amount of tilting of the liquid crystals is controlled by the strength of the electric field between electrodes 220 and 245. The level of grayness perceived by the viewer directly related to the amount of tilting of the liquid crystals. MVA LCDs can also be extended to use four domains so that the LC orientation in a pixel is divided into 4 major domains to provide wide symmetrical viewing angles both vertically and horizontally.

Thus, multi-domain vertical alignment liquid crystal displays, provide wide symmetrical viewing angles, however, the cost of manufacturing MVA LCDs are very high due to the difficulty of adding protrusions to the top and bottom substrates and the difficulty of properly aligning the protrusions on the top and bottom substrates. Specifically, a protrusion on the bottom substrate must be located at the center of two protrusions on the top substrate; any misalignment between the top and bottom substrates will reduce the product yield. Other techniques of using physical features on the substrates, which have been used in place of or in combination with the protrusions, are also very expensive to manufacture. Furthermore, the protrusions inhibit light transmission and thus reduce the brightness and contrast ratio of the MVA LCDs. Hence, there is a need for a method or system that can provide multi-domain vertical alignment liquid crystal displays, without the need for difficult to manufacture physical features such as protrusions, and without the need to have ultra precise alignment of the top and bottom substrates.

SUMMARY

Accordingly, the present invention provides an Amplified Intrinsic Fringe Field controlled MVA LCD (AIFF MVA LCD) that can be constructed without the physical features on the substrates to form the multiple domains liquid crystal orientation structures. However some embodiments of the present invention include a sliced common electrode to further enhance the stable formation of multiple domains liquid crystal orientation structures. Thus, in accordance with some embodiments of the present invention, a pixel contains multiple color components and each color component is includes multiple color dots and extra-planar fringe field amplifiers to amplify the fringe fields of the color dots to create multiple domains in the liquid crystal orientation structures. In addition a sliced common electrode having common electrode slices over the color dots can further enhance the stable formation of multiple domains liquid crystal orientation structures.

For example in a specific embodiment of the present invention a pixel includes a first color component having a first first-component color dot and a second first component color dot. The pixel also includes a first first-component extra-planar fringe field amplifier located between the first first-component color dot and the second first component color dot. The pixel also includes a sliced common electrode that has a first common electrode slice over the first first-component color dot and a second common electrode slice over the second first-component color dot.

In another embodiment of the present invention, a pixel of a display includes a first color component having a first first-component color dot and a second first-component color dot. The first first-component color dot has a first side and a second side that is diagonal relative to the first side of the first first-component color dot. Similarly the second first-component color dot has a first side and a second side that is diagonal relative to the first side of the second first-component color dot. The pixel also includes a first first-component extra-planar fringe field amplifier that includes a first diagonal amplifying portion located between the second side of the first first-component color dot and the second side of the second first-component color dot. The first first-component color dot and the second first-component color dot are in a first plane and the first first-component extra-planar fringe field amplifier is on a second plane.

The present invention will be more fully understood in view of the following description and drawings.

DETAILED DESCRIPTION

Figure 1B:
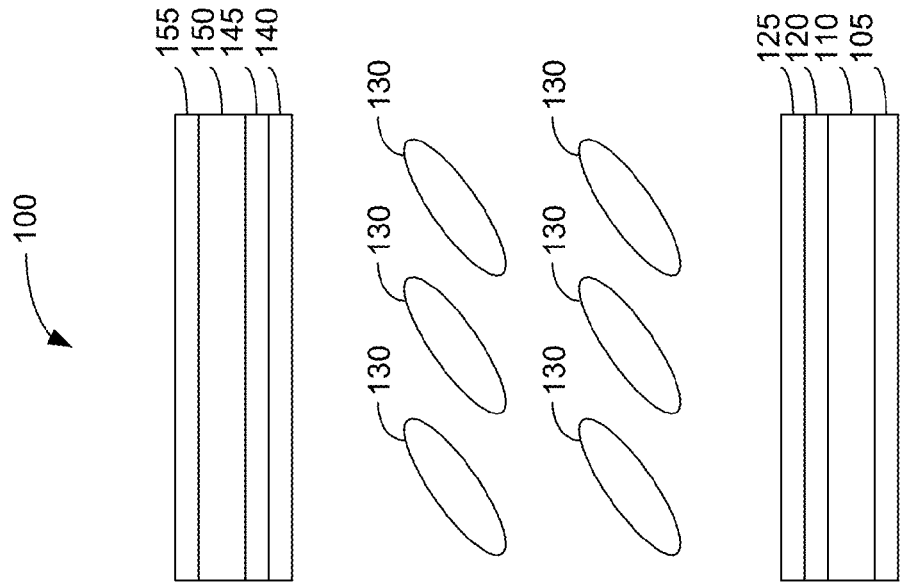
FIGS. 1(a)-1(c) are three illustrations of a pixel of a conventional single domain vertical alignment LCD.
Figure 1A:
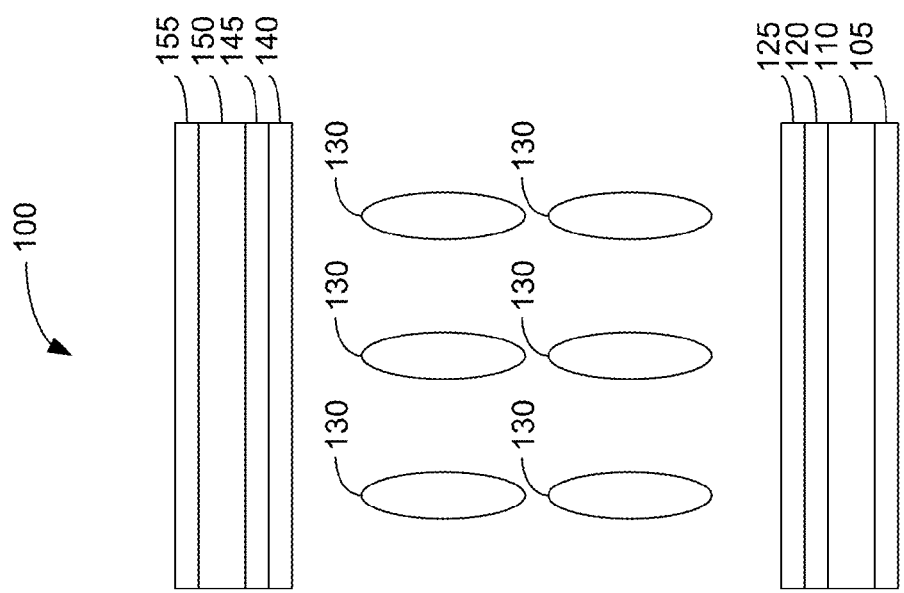
Figure 1C:
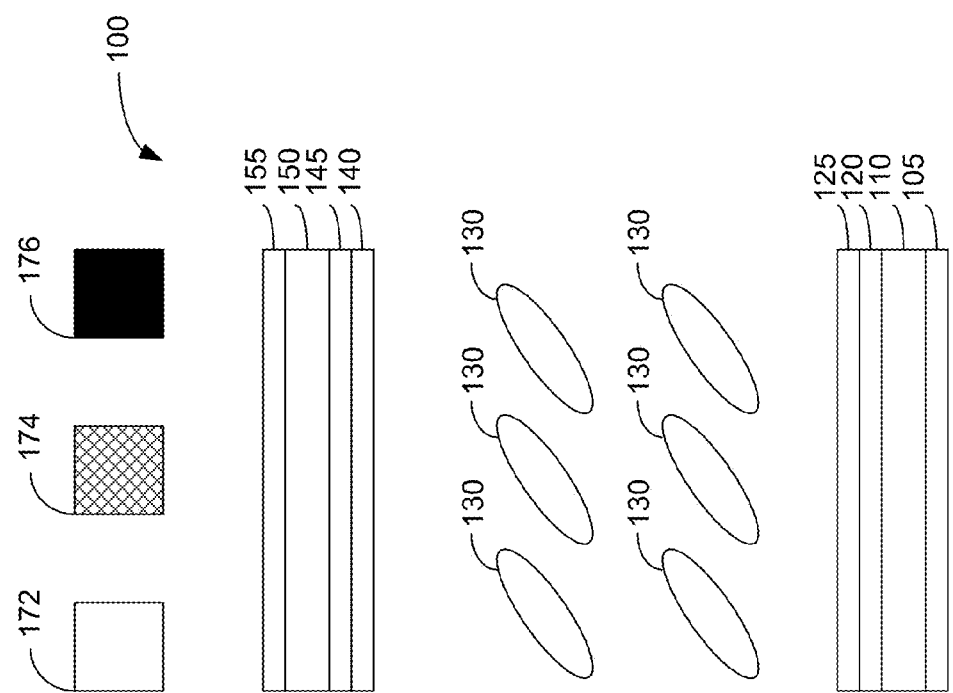
Figure 2:
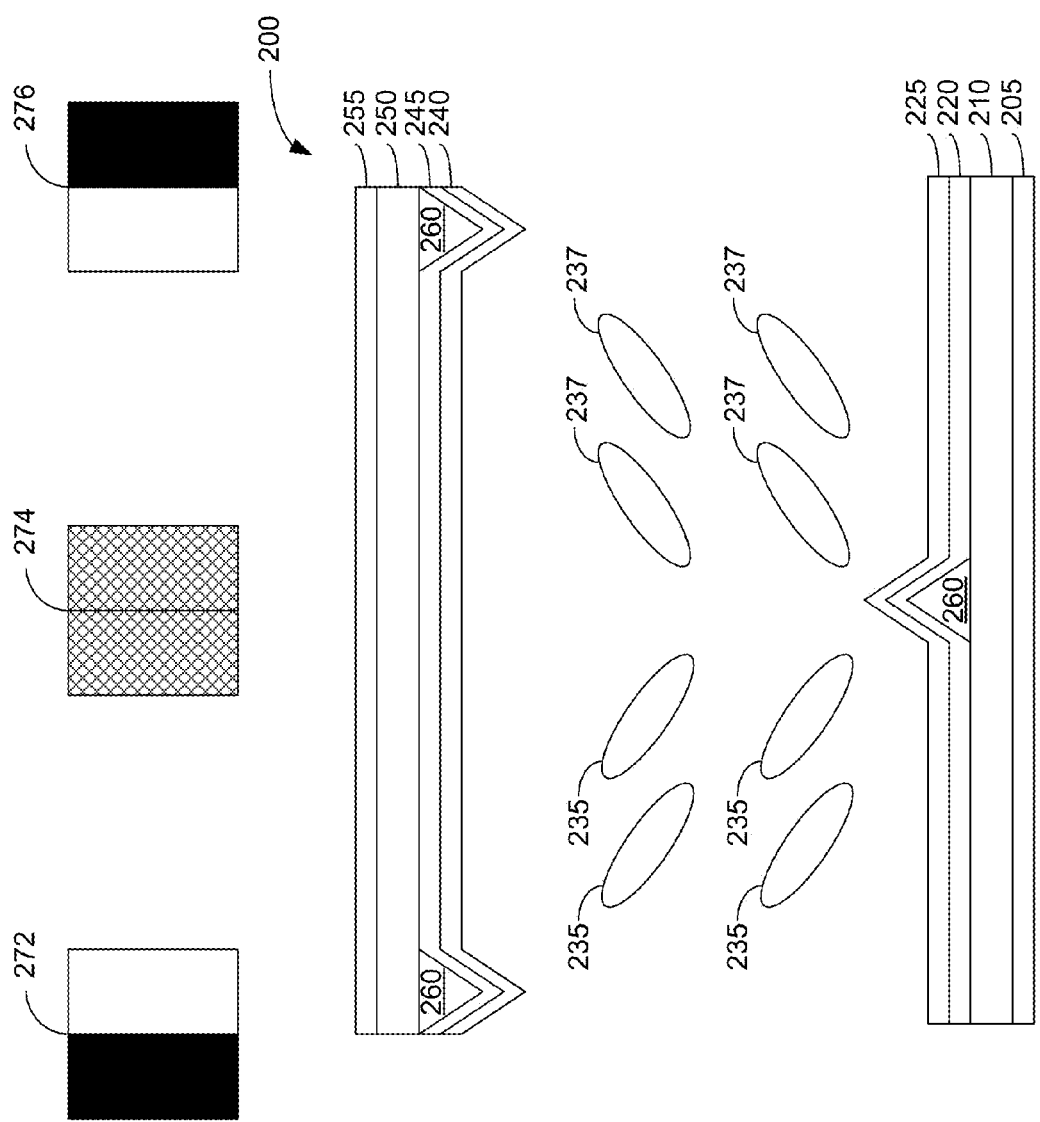
FIG. 2 is an illustration of a pixel of a conventional multi-domain vertical alignment LCD.
Figure 3A:
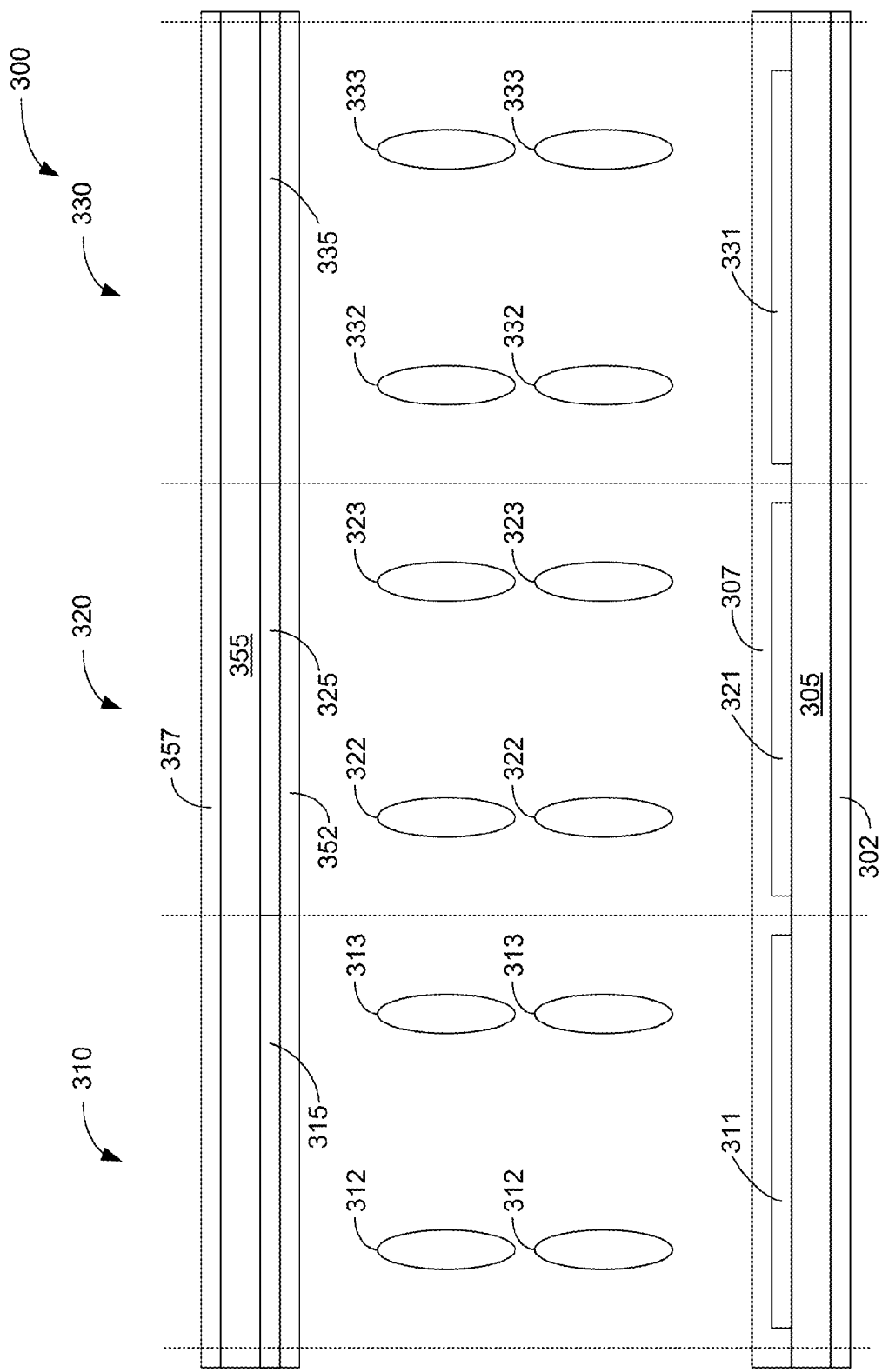
FIGS. 3(a)-3(b) illustrate a multi-domain vertical alignment liquid crystal display in accordance with one embodiment of the present invention.
Figure 3B:
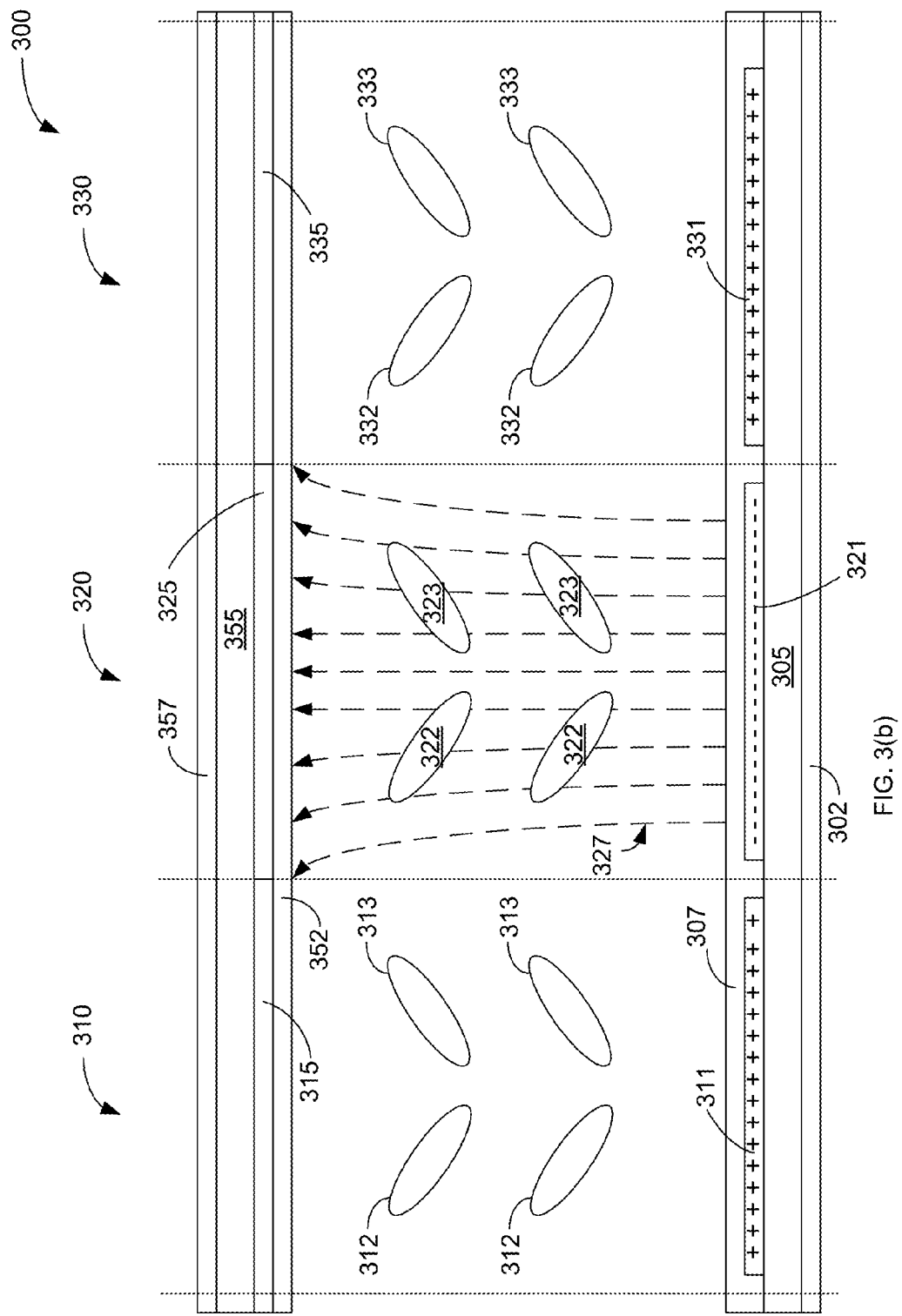

As explained above, conventional MVA LCDs are very expensive to manufacture due to the use of physical features, such as protrusions for creating the multiple domains of each pixel. However, MVA LCDs in accordance with the principles of the present invention use fringe fields to create multiple-domains. FIGS. 3(a) and 3(b) illustrate the basic concept used in accordance with the present invention to create a multi-domain vertical alignment liquid crystal display (MVA LCD) 300. Specifically FIG. 3 shows pixels 310, 320, and 330 in between a first substrate 305 and a second substrate 355. A first optical polarizer 302 is attached to first substrate 305 and a second optical polarizer 357 is attached to second substrate 355. Pixel 310 includes a first electrode 311, liquid crystals 312, liquid crystals 313 and a second electrode 315. Pixel 320 includes a first electrode 321, liquid crystals 322, liquid crystals 323 and a second electrode 325. Similarly, pixel 330 includes a first electrode 331, liquid crystals 332, liquid crystals 333 and a second electrode 335. The electrodes are typically constructed using a transparent conductive material such as ITO. Furthermore, a first alignment layer 307 covers the electrodes on first substrate 305. Similarly a second alignment layer 352 covers the electrodes on second substrate 355. Both LC alignment layers 307 and 352 provide a vertical LC alignment. As explained in more detail below, electrodes 315, 325, and 335 are held at a common voltage V_Com. Therefore, to ease manufacturing, electrodes 315, 325, and 335 can be created as a single structure (as shown in FIGS. 3(a) and 3(b)).

MVA LCD 300 operates pixels 310, 320, and 330 using alternating polarities. For example, if the polarities of pixels 310 and 330 are positive then the polarity of pixel 320 would be negative. Conversely, if the polarities of pixel 310 and 330 are negative then the polarity of pixel 320 would be positive. Generally, the polarity of each pixel would switch between frames, but the pattern of alternating polarities is maintained in each frame. In FIG. 3(a), pixels 310, 320, and 330 are in the "OFF" state, i.e. with the electric field between the first and second electrodes turned off. In the "OFF" state some residual electric field may be present between the first and second electrode. However, the residual electric field is generally too small to tilt the liquid crystals.

In FIG. 3(b), pixels 310, 320, and 330 are in the "ON" state. 3(b) uses "+" and "−" to denote the voltage polarity of the electrodes. Thus, electrodes 311, and 331 have positive voltage polarity and electrodes 321 has negative voltage polarity. Substrate 355 and electrodes 315, 325, and 335 are kept at common voltage V_com. The voltage polarity is defined with respect to the V_com voltage, where a positive polarity is obtained for voltages higher than V_com, and a negative polarity is obtained for voltage smaller than V_com. Although not shown in FIG. 3(a)-3(b), switching elements are formed on first substrate 305 to control the electrode on substrate 305. For clarity, the term "color component electrode" refers electrodes that are controlled by switching elements on the first substrate (substrate 305 in FIG. 3(a)-3(b)) and the term "common electrode" refers to the electrode held at the common voltage V_com on the second substrate (substrate 355 in FIG. 3(a)-3(b)). Furthermore, the term "switching element substrate" refers to the substrate on which the switching elements are formed and the term "common electrode substrate" refers to the substrate on which the common electrodes are formed.

Electric field 327 (illustrated using field lines) between electrodes 321 and 325 causes liquid crystals 322 and liquid crystals 323 to tilt. In general, without protrusions or other features the tilting direction of the liquid crystals is not fixed for liquid crystals with a vertical LC alignment layers at 307 and 352. However, the fringe field at the edges of the pixel can influence the tilting direction of the liquid crystals. For example, electric field 327 between electrode 321 and electrode 325 is vertical around the center of pixel 320 but is tilted to the left in the left part of the pixel, and tiled to the right in the right part of the pixel. Thus, the fringe field between electrode 321 and electrode 325 cause liquid crystals 323 to tilt to the right to form one domain and cause liquid crystals 322 to tilt to the left to from a second domain. Thus, pixel 320 is a multi-domain pixel with a wide viewing angle.

Similarly, the electric field (not shown) between electrode 311 and electrode 315 would have fringe fields that cause liquid crystals 313 to reorientate and tilt to the right in the right side in pixel 310 and cause liquid crystals 312 to tilt to the left in the left side in pixel 310. Similarly, the electric field (not shown) between electrode 331 and electrode 335 would have fringe fields that cause liquid crystals 333 to tilt to the right in the right side in pixel 330 and cause liquid crystals 332 to tilt to the left in the left side in pixel 330.

Alternating polarity of adjacent pixels amplifies the fringe field effect in each pixel. Therefore, by repeating the alternating polarity pattern between rows of pixels (or columns of pixels), a multi domain vertical alignment LCD is achieved without physical features. Furthermore, an alternating polarity checkerboard pattern can be used to create four domains in each pixel. For color LCDs, pixels are divided into color components. Each color component is controlled by a separate switching device, such as a thin-film transistor (TFT). Generally, the color components are red, green, and blue.

However, fringe field effects are relatively small and weak, in general. Consequently, as pixels become larger, the fringe fields at the edge of the pixels would not reach all the liquid crystals within a pixel. Thus, in large pixels the direction of tilting for the liquid crystals not near the edge of the pixels would exhibit random behavior and would not produce a multi-domain pixel. Generally, fringe field effects of pixels would not be effective to control liquid crystal tilt when the pixels (or color component) become larger than 20-30 μm.

Therefore, for large pixel LCDs a novel pixel designs divide a color component into color dots. Fringe field effects can be used to create multiple liquid crystal domains in the color dots. Furthermore, novel extra-planar fringe-field amplifiers can be used to further amplify the fringe fields. In addition, in accordance with the present invention, the common electrode (i.e. the electrode held at common voltage V_COM) is sliced (as described below) to further enhance the fringe fields. The present invention is well suited for both small and large pixel LCDs to enhance the fringe field effects and create multiple liquid crystal domains.

The polarity of each pixel switches between each successive frame of video to prevent image quality degradation, which may result from twisting the liquid crystals in the same direction in every frame. However, the dot polarity pattern switching may cause other image quality issues such as flicker if all the switching elements are of the same polarity. To minimize flicker, the switching elements (e.g. are transistors) are arranged in a switching element driving scheme that include positive and negative polarities. Furthermore, to minimize cross talk the positive and negative polarities of the switching elements should be arranged in a uniform pattern, which provides a more uniform power distribution. Various switching element driving schemes are used by the embodiments of the present invention. The three main switching element driving schemes are switching element point inversion driving scheme, switching element row inversion driving scheme, and switching element column inversion driving scheme. In the switching element point inversion driving scheme, the switching elements form a checkerboard pattern of alternating polarities. In the switching element row inversion driving scheme, the switching elements on each row have the same polarity; however, each switching element in one row has the opposite polarity as compared to the polarity of switching elements in adjacent rows. In the switching element column inversion driving scheme, the switching elements on each column have the same polarity; however, a switching element in one column has the opposite polarity as compared to the polarity of switching elements in adjacent columns. While the switching element point inversion driving scheme provides the most uniform power distribution, the complexity and additional costs of switching element point inversion driving scheme over switching element row inversion driving scheme or switching element column inversion driving scheme may not be cost effective. Thus, most LCD displays for low cost or low voltage applications are manufactured using switching element row inversion driving scheme while switching element point inversion driving scheme is usually reserved for high performance applications.

Pixels in accordance with embodiments of the present invention include various key components arranged in novel arrangements to achieve high quality low cost display units. For example, pixel can include color components, color dots, fringe field amplifying regions (FFAR), switching elements, device component areas, and associated dots, extra-planar fringe fiend amplifiers. Furthermore, the common electrodes may be sliced (as explained below) to further enhance the fringe fields to produce multiple domains.

The device component area encompasses the area occupied by the switching elements and/or storage capacitor as well as the area that was used to manufacture the switching elements and/or storage capacitors. For clarity, a different device component area is defined for each switching element.

Associated dots and fringe field amplifying regions are electrically polarized areas that are not part of the color components. In many embodiments of the present invention, associated dots covers the device component areas. For these embodiments, the associated dots are manufactured by depositing an insulating layer over the switching element and/or storage capacitors. Passivation layer is used commonly as the insulating layer. Followed by depositing an electrically conductive layer to form the associated dot. The associated dots are electrically connected to specific switching element and or other polarized components (such as color dots). The storage capacitors are electrically connected to specific switching element and color dot electrodes to compensate and offset the capacitance change on the liquid crystal cells during the switching-on and switching-off processes of the liquid crystal cells. Consequently, the storage capacitors are used to reduce the cross-talk effects during the switching-on and switching-off processes of the liquid crystal cells. A patterning mask is used when it is necessary to form the patterned electrode for the associated dots. Generally, a black matrix layer is added to form a light shield for the color dots, switching element, DCA, and associated dot. In general, the black matrix layer is black, however some displays use different color to achieve a desired color pattern or shading. A color layer is added to give desired color for the color dot. Generally, the color layer is achieved by depositing a color filter layer on the corresponding ITO glass substrate. Specifically, a patterned color filter layer is deposited between second substrate 355 and second electrodes 315, 325, and 335 with the pattern corresponding to the color for the color dot and associated dots. However, some displays may also place a patterned color filter layer on top or underneath the switching element, the electrode layer of the color dots, associated dots, or DCA on the first substrate 305.

In other embodiments of the present invention, the associated dot is an area independent of the switching elements. Furthermore, some embodiments of the present invention have additional associated dots not directly related to the switching elements. Generally, the associated dot includes an active electrode layer such as ITO or other conductive layer, and is connected to a nearby color dot or powered in some other manner. For opaque associated dots, a black matrix layer can be added on the bottom of the conductive layer to form the opaque area. In some embodiments of the present invention, the black matrix can be fabricated on the ITO glass substrate side to simplify the fabrication process. The additional associated dots improve the effective use of display area to improve the aperture ratio and to form the multiple liquid crystal domains within the color dots. Some embodiments of the present invention use associate dots to improve color performance. For example, careful placement of associated dots can allow the color of nearby color dots to be modified from the usual color pattern.

Fringe field amplifying regions (FFARs) are more versatile than associated dots. Specifically, fringe field amplifying regions may have non-rectangular shapes, although generally, the overall shape of the fringe field amplifying regions can be divided into a set of rectangular shapes. Furthermore, fringe field amplifying regions extend along more than one side of a color dot. In addition, fringe field amplifying regions may be used in place of associated dots in some embodiments of the present invention. Specifically, in these embodiments the fringe field amplifying region covers the device component areas but also extend along more than one side of color dots adjacent to the device component areas.

Extra-planar fringe field amplifiers (EPFFAs) are polarized structures that are on a different horizontal plane than the color dots of a pixel. Extra-planar fringe field amplifiers (EPFFAs) have been placed near the edges of the color dots to amplify the fringe field of the color dots. One benefit of using extra-planar fringe field amplifiers is that the color dots can be placed closer together to improve the brightness of a display. However, in accordance with some embodiments of the present invention, Extra-planar fringe field amplifiers (EPFFAs) are located along the slices of the electrode of the color component. Extra-planar fringe fiend amplifiers and sliced electrodes are described in detail below.

In general, the color dots, device component areas, and associated dots are arranged in a grid pattern and are separated from adjacent neighbors by a horizontal dot spacing HDS and a vertical dot spacing VDS. When fringe field amplifying regions are used in place of associated dots, part of the fringe field amplifying regions would also fit in the grid pattern. However, in accordance with some embodiments of the present invention, color dots can have non-rectangular shapes. In these embodiments, the color dots generally do not fit a strict grid pattern. However, in some of these embodiments, the color dots of a particular color component fit into a rectangular area. Therefore, the color components having the non-rectangular color dots can be arranged in a grid pattern.

Figure 4A:
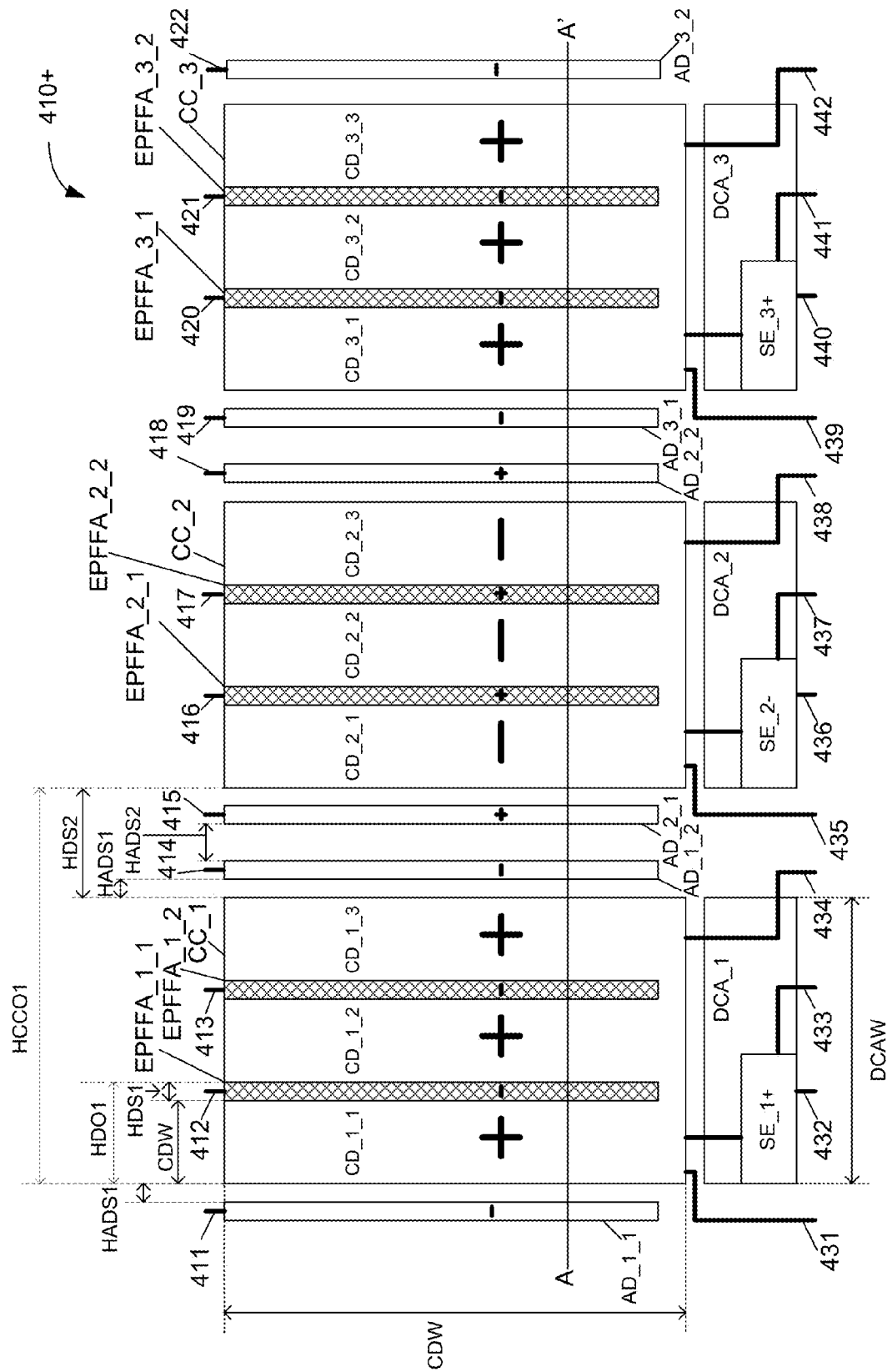
FIGS. 4(a)-4(e) illustrate a pixel design in accordance with one embodiment of the present invention.
Figure 4B:
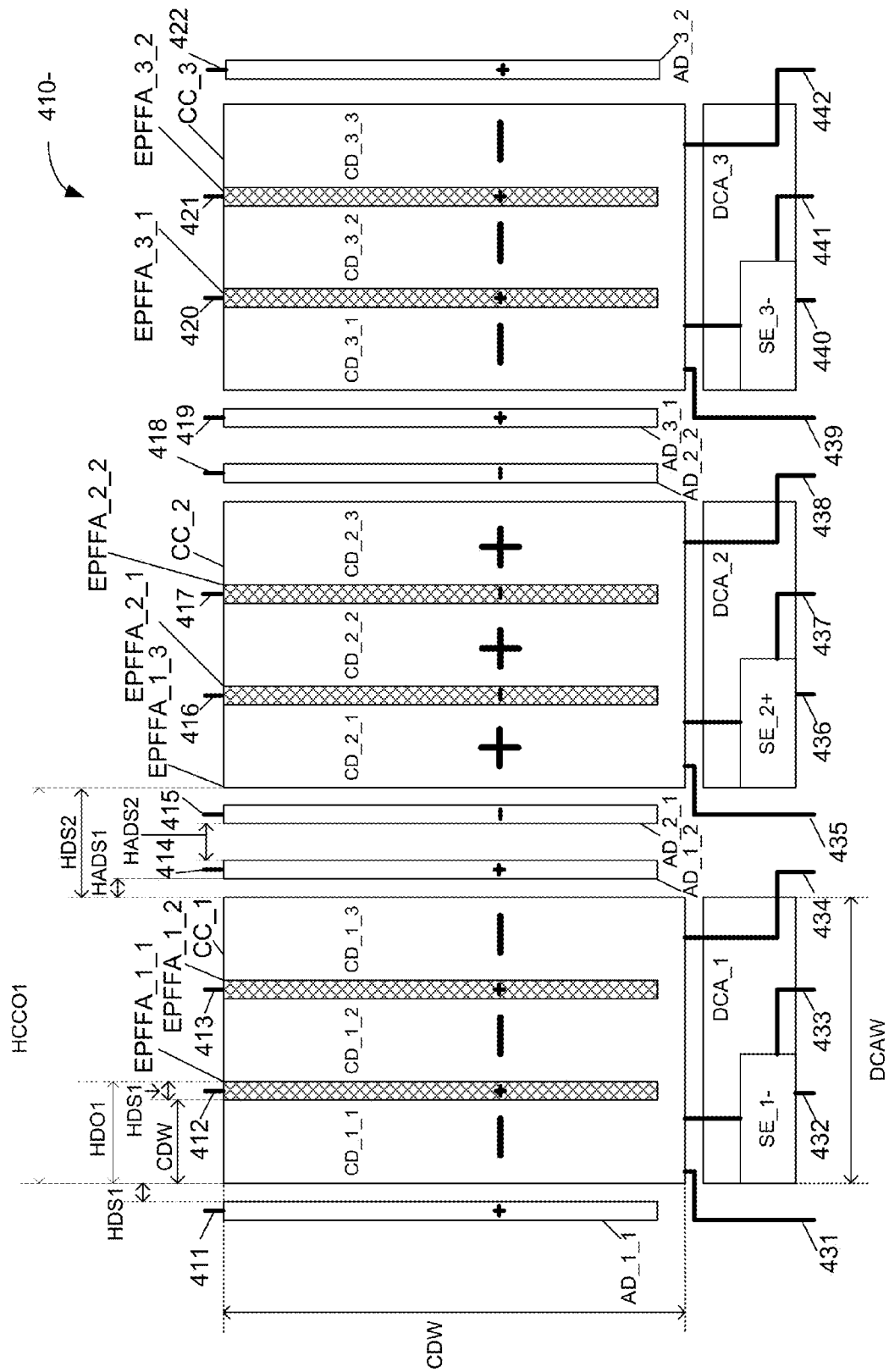

FIGS. 4(a) and 4(b) show different dot polarity patterns of a pixel design 410 that is often used in displays having a switching element point inversion driving scheme or switching element column inversion driving scheme. In actual operation a pixel will switch between a first dot polarity pattern and a second dot polarity pattern between each image frame. For clarity, the dot polarity pattern, in which the first color dot of the first color component has a positive polarity, is referred to as the positive dot polarity pattern. Conversely, the dot polarity pattern in which the first color dot of the first color component has a negative polarity is referred to as the negative dot polarity pattern. Specifically, in FIG. 4(a), pixel design 410 has a positive dot polarity pattern (and is thus labeled 410+) and in FIG. 4(b), pixel design 410 has a negative dot polarity pattern (and is thus labeled 410-). Furthermore, the polarity of each polarized component in the various pixel designs are indicated with "+" for positive polarity or "-" for negative polarity.

Pixel design 410 has three color components CC_1, CC_2 and CC_3. Each of the three color components includes three color dots. For clarity, the color dots are referenced as CD_X_Y, where X is a color component (from 1 to 3 in FIGS. 4(a)-4(b) and Y is a color dot number (from 1 to 3 in FIGS. 4(a)-4(b)). Pixel design 410 also includes a switching element (referenced as SE_1, SE_2, and SE_3) for each color component, two polarized extra-planar fringe field amplifier for each color component (referenced as EPFFA_I_J, where I is the color component and J is the extra-planer fringe field amplifier number), and two associated dots for each color component (referenced as AD_M_N, where M is the color component and N is the associated dot number). Switching elements SE_1, SE_2, and SE_3 are arranged in a row. A device component area is shown around each of switching element SE_1, SE_2, and SE_3 and labeled DCA_1, DCA_2, and DCA_3, respectively.

First color component CC_1 of pixel design 410 has three color dots CD_1_1, CD_1_2, and CD_1_3. Color dots CD_1_1, CD_1_2, and CD_1_3, form a row and are separated by horizontal dot pacing HDS1. In other words, color dots CD_1_1, CD_1_2, and CD_1_3 are vertically aligned and horizontally separated by horizontal dot spacing HDS1. Furthermore, color dots CD_1_1 and CD_1_2 are horizontally offset by horizontal dot offset HDO1 which is equal to horizontal dot spacing HDS1 plus the color dot width CDW. However, color dots CD_1_1 and CD_1_2 are electrically connected at the bottom of color dots CD_1_1 and CD_1_2. Similarly, color dots CD_1_2 and color dots CD_1_3 are electrically connected at the bottom of color dots CD_1_2 and CD_1_3. In pixel design 410, switching element SE_1 is located below color component CC_1. Switching element SE_1 is coupled to the electrodes of color dots CD_1_1, CD_1_2, and CD_1_3 to control the voltage polarity and voltage magnitude of color dots CD_1_1, CD_1_2, and CD_1_3.

Similarly, second color component CC_2 of pixel design 410 has three color dots CD_2_1, CD_2_2, and CD_2_3. Color dots CD_2_1, CD_2_2, and CD_2_3 are also placed in a row and are separated by horizontal dot spacing HDS1. Thus, color dots CD_2_1, CD_2_2, and CD_2_3 are vertically aligned and horizontally, separated by horizontal dot spacing HDS1. However, color dots CD_2_1 and CD_2_2 are electrically connected at the bottom of color dots CD_2_1 and CD_2_2. Similarly, color dots CD_2_2 and color dots CD_2_3 are electrically connected at the bottom of color dots CD_2_2 and CD_2_3. Switching element SE_2 is located below color component CC_2. Switching element SE_2 is coupled to the electrodes of color dots CD_2_1, CD_2_2, and CD_2_3 to control the voltage polarity and voltage magnitude of color dots CD_2_1, CD_2_2, and CD_2_3. Second color component CC_2 is vertically aligned with first color component CC_1 and separated from color component CC_1 by a horizontal dot spacing HDS2, thus color components CC_2 and CC_1 are horizontally offset by a horizontal color component offset HCCO1, which is equal to two times horizontal dot spacing HDS1 plus three times color dot width CDW plus horizontal dot spacing HDS2.

Similarly, third color component CC_3 of pixel design 410 has three color dots CD_3_1, CD_3_2, and CD_3_3. Color dots CD_3_1, CD_3_2, and CD_3_3 are also placed in a row and are separated by horizontal dot spacing HDS1. Thus, color dots CD_3_1, CD_3_2, and CD_3_3 are vertically aligned and horizontally separated by horizontal dot spacing HDS1. However, color dots CD_3_1 and CD_3_2 are electrically connected at the bottom of color dots CD_3_1 and CD_3_2. Similarly, color dots CD_3_2 and color dots CD_3_3 are electrically connected at the bottom of color dots CD_3_2 and CD_3_3. Switching element SE_3 is located below color component CC_3. Switching element SE_3 is coupled to the electrodes of color dots CD_3_1, CD_3_2, and CD_3_3 to control the voltage polarity and voltage magnitude of color dots CD_3_1, CD_3_2, and CD_3_3. Third color component CC_3 is vertically aligned with second color component CC_2 and separated from color component CC_2 by horizontal dot spacing HDS2, thus color components CC_3 and CC_2 are horizontally offset by a horizontal color component offset HCCO1.

For clarity, the color dots of pixel design 410 are illustrated with color dots having the same color dot width CDW. Furthermore, all the color dots in pixel design 410 have the same color dot height CDH. However, some embodiments of the present invention may have color dots with different color dot widths and different color doth heights.

Pixel design 410 also includes extra-planar fringe field amplifiers EPFFA_1_1, EPFFA_1_2, EPFFA_2_1, EPFFA_2_2, EPFFA_3_1, and EPFFA_3_2. In pixel design 410, the extra-planar fringe field amplifiers are rectangular with an extra-planar fringe field amplifier width EPFFAW (not labeled in FIG. 4(a)) and an extra-planar fringe field amplifier height EPFFAH (not labeled in FIG. 4(a)).

As shown in FIG. 4(a), the extra-planar fringe field amplifiers are placed in between the color dots of pixel design 410. Specifically, extra-planar fringe field amplifier EPFFA_1_1 is placed in between color dots CD_1_1 and CD_1_2 and extra-planar fringe field amplifier EPFFA_1_2 is placed between color dots CD_1_2 and CD_1_3. Similarly, extra-planar fringe field amplifier EPFFA_2_1 is placed in between color dots CD_2_1 and CD_2_2, extra-planar fringe field amplifier EPFFA_2_2 is placed between color dots CD_1_2 and CD_1_3, extra-planar fringe field amplifier EPFFA_3_1 is placed in between color dots CD_3_1 and CD_3_2, extra-planar fringe field amplifier EPFFA_3_2 is placed between color dots CD_3_2 and CD_3_3.

Figure 4C:
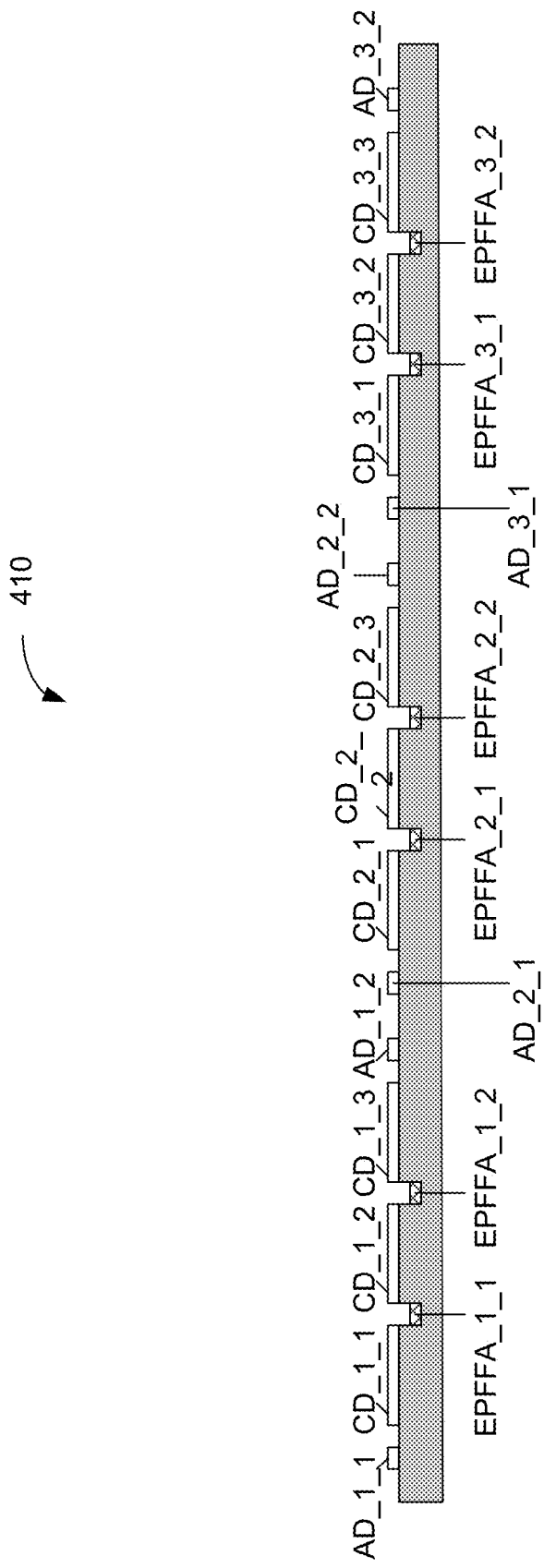

Although it appears from FIGS. 4(a) and 4(b) that the color dots are touching the extra-planar fringe field amplifiers, the extra-planar fringe field amplifiers actually lie in a different plane as illustrated in FIG. 4(c), which shows a cross section of pixel design 410 taken at the A-A' cut.

FIG. 4(c) shows cross section of associated dots AD_1_1, AD_1_2, AD_2_1, AD_2_2, AD_3_1, and AD_3_3, color dots CD_1_1, CD_1_2, CD_1_3, CD_2_1, CD_2_2, CD_2_3, CD_3_1, CD_3_2, and CD_3_3, and extra-planar fringe field amplifiers EPFFA_1_1, EPFFA_1_2, EPFFA_2_1, EPFFA_2_2, EPFFA_3_1, and EPFFA_3_2. The associated dots and color dots are in a first plane and the extra-planar fringe field amplifiers are in a second plane. Specifically, the extra-planar fringe field amplifiers of pixel design 410 are on a lower plane than the associated dots and the color dots. More specifically, the top of the extra planar fringe field amplifiers are separated from bottom of the color dots by an amplifier depth spacing ADS. In other embodiments of the present invention the extra-planar fringe field amplifiers can be above the color dots. In these embodiments amplifier depth spacing ADS is measured from the top of the color dots to the bottom of the extra-planar fringe field amplifiers. Furthermore, some embodiments of the present invention may use fringe field amplifiers or fringe field amplifying regions in the same plane as the color dots. In these embodiments the fringe field amplifiers or fringe field amplifying regions are spaced apart from the color dots to prevent electrical contact between the color dots and the fringe field amplifiers or fringe field amplifying regions.

Thus, extra-planar fringe field amplifier EPFFA_1_2 can be described as horizontally adjacent to color dot CD_1_1 and horizontally adjacent to color dot CD_1_2 but on a different plane relative to color dots CD_1_1 and CD_1_2. Extra-planar fringe field amplifier EPFFA_1_2 can also be described as horizontally in between color dots CD_1_1 and CD_1_2 but on a lower plane relative to color dots CD_1_1 and CD_1_2. Similarly, extra-planar fringe field amplifiers EPFFA_1_2, EPFFA_2_1, EPFFA_2_2, EPFFA_3_1, and EPFFA_3_2 are horizontally in between color dots CD_1_2 and CD_1_3, color dots CD_2_1 and CD_2_2, color dots CD_2_2 and CD_2_3, color dots CD_3_1 and CD_3_2, and color dots CD_3_2 and CD_3_3, respectively, and on a different plane than the color dots.

By using extra-planar fringe field amplifiers, the color dots can be placed closer together as compared to using polarized elements in the plane of the color dots. Reducing the spacing of the color dots increases the brightness and contrast of the display.

For example, in pixel design 420, horizontal dot spacing HDS1 (i.e. the space between color dots within a color component) is equal to the width of the extra-planar fringe field amplifier (EPFFA_W). Other embodiments of the present invention can even have the color dots partially overlap the extra-planar fringe field amplifiers to further reduce dot spacing. Extra-planar fringe field amplifiers can be formed using any conductor. However, to minimize costs and process steps, generally, extra-planar fringe field amplifiers are formed using a metal layer that is used for the formation of the switching elements.

Pixel design 410 also includes associated dots AD_1_1, AD_1_2, AD_2_1, AD_2_2, AD_3_1, and AD_3_2. In pixel design 410, the associated dots are rectangular with an associated dot width ADW (not labeled in FIG. 4(a)) and an associated dot height ADH (not labeled in FIG. 4(a)). As shown in FIG. 4(a), the associated dots are placed on the left side and the right side of each color component. Specifically, associated dot AD_1_1 is placed along the left side of color dot CD_1_1 and associated dot AD_1_2 is placed along the right side of color dot CD_1_3. Specifically, associated dot AD_1_1 is horizontally separated from the left side of color dot CD_1_1 by a horizontal associated dot spacing HADS1 and associated dot AD_1_2 is horizontally separated the right side of color dot CD_1_3. Similarly, associated dot AD_2_1 is placed along the left side of color dot CD_2_1 and horizontally separated from color dot CD_2_1 by horizontal associated dot spacing HADS1; and associated dot AD_2_2 is placed along the right side of color dot CD_2_3 and horizontally separated from color dot CD_2_3 by horizontal associated dot spacing HADS1. In addition, associated dot AD_3_1 is placed along the left side of color dot CD_3_1 and horizontally separated from color dot CD_3_1 by horizontal associated dot spacing HADS1; and associated dot AD_3_2 is placed along the right side of color dot CD_3_3 and horizontally separated from color dot CD_3_3 by horizontal associated dot spacing HADS1.

Pixel design 410 is designed so that the extra-planar fringe field amplifiers and associated dots can receive polarity from an adjacent pixel. Specifically, a first conductor is coupled to an extra-planar fringe field amplifier or associated dot to receive polarity from the pixel above the current pixel and a second conductor is coupled to the switching element to provide polarity to an extra-planar fringe field amplifier or associated dot of a pixel below the current pixel. In some embodiments of the present invention, the conductor is coupled to a switching element via intermediate conductors such as a color dot. For example, conductor 411, which is coupled to the electrode of associate dot AD_1_1, extends upward to connect to the equivalent conductor of conductor 431 of a pixel above the current pixel to receive polarity (see FIG. 4(c)). Conductor 431, which is coupled to switching element SE_1 via color dot CD_1_1 extends downward to connect to the equivalent conductor of conductor 411 in the pixel below the current pixel. Conductors 414 and 434 serve the same purpose for associated dot AD_1_2. Conductor 412, which is coupled to the electrode of extra-planar fringe field amplifier EPFFA_1_1, extends upwards to connect to the equivalent conductor of conductor 432 of a pixel above the current pixel to receive polarity. Conductors 413 and 433 serve the same purpose for extra-planar fringe field amplifier EPFFA_1_2.

Similarly, conductors 415 and 435 serve the same purpose for associated dot AD_2_1 as conductors 411 and 431 serve for associated dot AD_1_1. Conductors 416 and 436 serve the same purpose for extra-planar fringe field amplifier EPFFA_2_1 as conductors 412 and 432 serve for extra-planer fringe field amplifier EPFFA_1_1. Conductors 417 and 437 serve the same purpose for extra-planar fringe field amplifier EPFFA_2_2 as conductors 413 and 433 serve for extra-planer fringe field amplifier EPFFA_1_2. Conductors 418 and 438 serve the same purpose for associated dot AD_2_2 as conductors 414 and 434 serve for associated dot AD_1_2.

Similarly, conductors 419 and 439 serve the same purpose for associated dot AD_3_1 as conductors 411 and 431 serve for associated dot AD_1_1. Conductors 420 and 440 serve the same purpose for extra-planar fringe field amplifier EPFFA_3_1 as conductors 412 and 432 serve for extra-planar fringe field amplifier EPFFA_1_1. Conductors 421 and 441 serve the same purpose for extra-planar fringe field amplifier EPFFA_3_2 as conductors 413 and 433 serve for extra-planer fringe field amplifier EPFFA_1_2. Conductors 422 and 442 serve the same purpose for associated dot AD_3_2 as conductors 414 and 434 serve for associated dot AD_1_2.

The polarities of the color dots, extra-planar fringe field amplifiers, and switching elements are shown using "+" and "−" signs. Thus, in FIG. 4(a), which shows the positive dot polarity pattern of pixel design 410+, switching elements SE_1 and SE_3; color dots CD_1_1, CD_1_2, CD_1_3, CD_3_1, CD_3_2, and CD_3_3; associated dots AD_2_1 and AD_2_2; and extra-planar fringe field amplifiers EPFFA_2_1 and EPFFA_2_2 have positive polarity. However, switching element SE_2; color dots CD_2_1, CD_2_2, and CD_2_3; associated dots AD_1_1, AD_1_2, AD_3_1, and AD_3_2; and extra-planar fringe field amplifiers EPFFA_1_1, EPFFA_1_2, EPFFA_3_1, and EPFFA_3_2 have negative polarity.

FIG. 4(b) shows pixel design 410 with the negative dot polarity pattern. For the negative dot polarity pattern, switching elements SE_1 and SE_3; color dots CD_1_1, CD_1_2, CD_1_3, CD_3_1, CD_3_2, and CD_3_3; associated dots AD_2_1 and AD_2_2; and extra-planar fringe field amplifiers EPFFA_2_1 and EPFFA_2_2 have negative polarity. However, switching element SE_2; color dots CD_2_1, CD_2_2, and CD_2_3; associated dots AD_1_1, AD_1_2, AD_3_1, and AD_3_2; and extra-planar fringe field amplifiers EPFFA_1_1, EPFFA_1_2, EPFFA_3_1, and EPFFA_3_2 have positive polarity.

As explained above fringe fields in each of the color dots are amplified if adjacent components have opposite polarities. Pixel design 410 makes use of the associated dots and extra-planar fringe field amplifiers to enhance and stabilize the formation of multiple domains in the liquid crystal structure. In general, the polarities of the polarized components are assigned so that a color dot of a first polarity has neighboring polarized components of the second polarity. For example for the positive dot polarity pattern of pixel design 410 (FIG. 4(a)), color dot CD_1_3 has positive polarity. However the neighboring polarized components (extra-planar fringe field amplifier EPFFA_1_2 and associated dot AD_1_2) have negative polarity. Thus, the fringe field of color dot CD_1_3 is amplified.

Figure 4D:
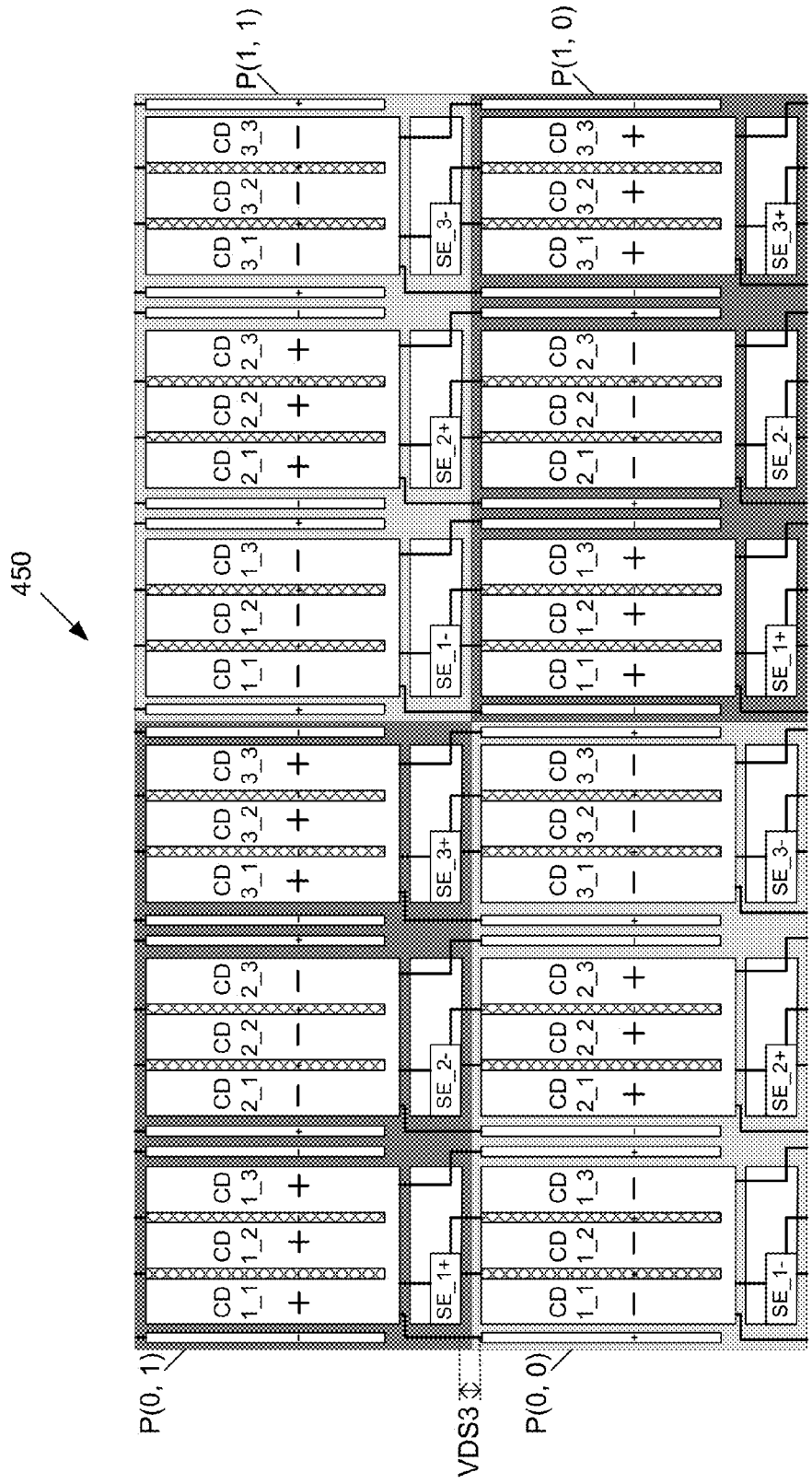

Pixels using pixel design 410 of FIGS. 4(a) and 4(b) can be used in displays using switching element point inversion driving schemes. FIG. 4(d) shows a portion of display 450 using pixels P(0, 0), P(1, 0), P(0, 1), and P(1, 1) of pixel design 410 with a switching element point inversion driving scheme. Display 450 could have thousands of rows with thousand of pixels on each row. The rows and columns would continue from the portion shown in FIG. 4(d) in the manner shown in FIG. 4(d). For clarity, the gate lines and source lines that control the switching elements are omitted in FIG. 4(d). To better illustrate each pixel, the area of each pixel is shaded; this shading is only for illustrative purposes in FIG. 4(d) and has no functional significance. In display 450 the pixels are arranged so that pixels in a row alternate dot polarity patterns (positive or negative) and pixels in a column also alternate between positive and negative dot polarity pattern. Thus, pixels P(0, 1) and P(1, 0) have positive dot polarity pattern and pixels P(0, 0) and P(1, 1) have the negative dot polarity pattern. However, at the next frame the pixels will switch dot polarity patterns. Thus in general a pixel P(x, y) has a first dot polarity pattern when x+y is even and a second dot polarity pattern when x+y is odd. Pixels on each row of pixels are vertically aligned and separated horizontally so that the right most color dots of a pixel are separated from the leftmost color dot of an adjacent pixel by a horizontal dot spacing HDS3. Pixels on a column of pixels are horizontally aligned and separated by a vertical dot spacing VDS3.

As stated above, the extra-planar fringe field amplifiers and associated dots of a first pixel receive polarity from the switching elements of a second pixel. For example, the electrode of extra-planar fringe field amplifier EPFFA_1_2 of pixel P(0, 0) is coupled to switching elements SE_1 of pixel P(0, 1) via conductor 413 of pixel P(0, 0) and conductor 433 of pixel P(0, 1). Similarly, the electrode of extra-planar fringe field amplifier EPFFA_3_1 of pixel P(0, 0) is coupled to switching elements SE_3 of pixel P(0, 1) via conductor 420 of pixel P(0, 0) and conductor 440 of pixel P(0, 1). Furthermore, as explained above, the polarity of polarized components adjacent to a color dot having a first polarity would have a second polarity.

In a particular embodiment of the present invention, each color dot has a width of 140 micrometers and a height of 420 micrometers. Each extra-planar fringe field amplifier has an extra-planar fringe field amplifier width of 4 micrometers and an extra-planar fringe field amplifier height of 375 micrometers, Horizontal dot spacing HDS1 is 4 micrometers, vertical dot spacing VDS1 is 4 micrometers, vertical dot spacing VDS2 is 4 micrometers, vertical dot spacing VDS3 is 30 micrometers, Horizontal dot spacing HDS1 is 4 micrometers, horizontal dot spacing HDS2 is 25 micrometers, horizontal associated dot spacing HADS1 is 4 micrometers, horizontal associated dot spacing HADS2 is 9 micrometers, associated dot width ADW is 4 micrometers, associated dot height ADH is 375 micrometers, and amplifier depth spacing of 0.4 micrometers.

Figure 4E:
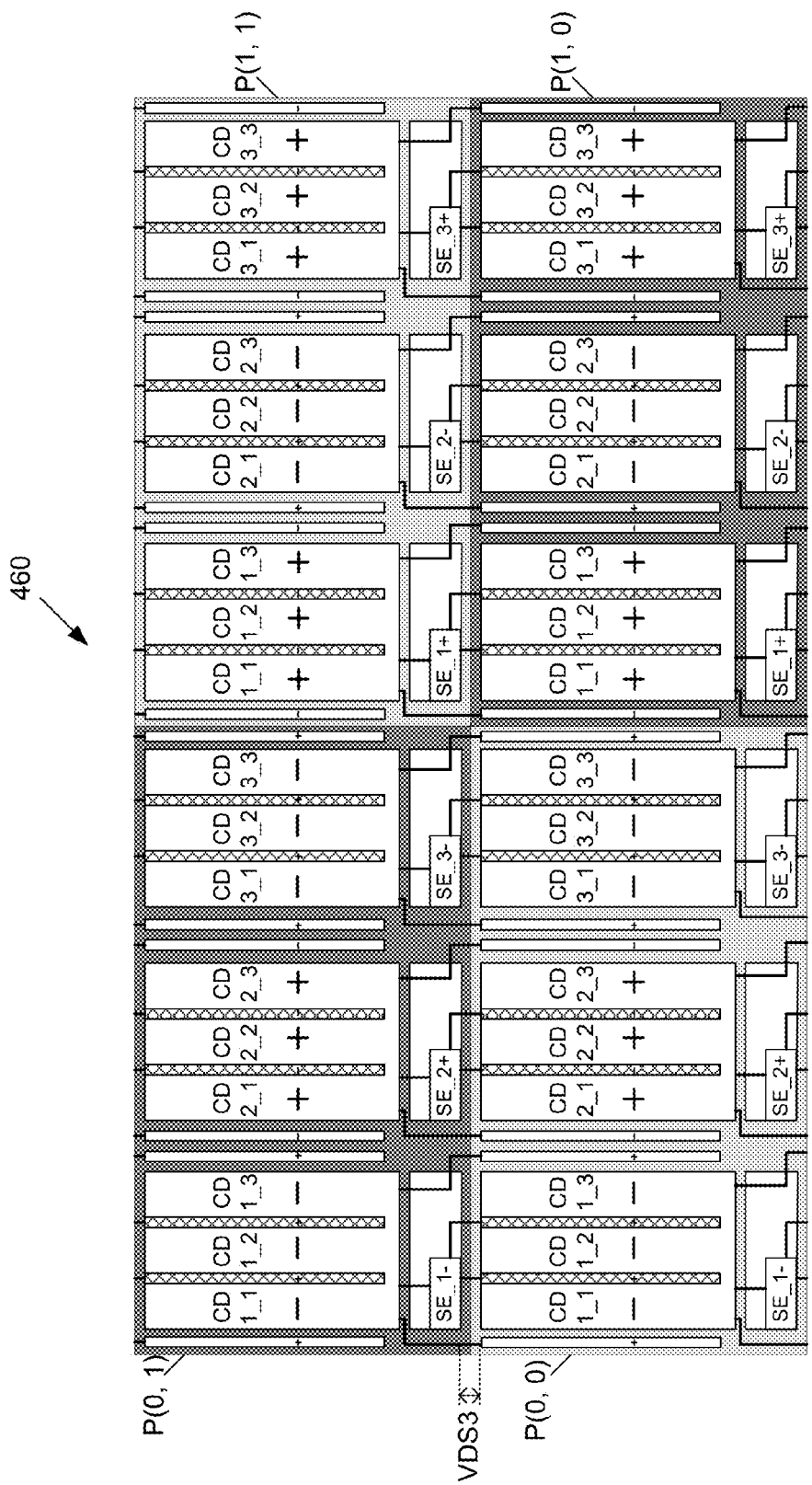

Pixel design 410 can also be used in displays using switching element column inversion driving scheme. FIG. 4(e) shows a portion of display 460 using pixels P(0, 0), P(1, 0), P(0, 1), and P(1, 1) of pixel design 410 with a switching element column inversion driving scheme. Display 460 could have thousands of rows with thousand of pixels on each row. The rows and columns would continue from the portion shown in FIG. 4(e) in the manner shown in FIG. 4(6). For clarity, the gate lines and source lines that control the switching elements are omitted in FIG. 4(6). To better illustrate each pixel, the area of each pixel is shaded; this shading is only for illustrative purposes in FIG. 4(6) and has no functional significance. In display 460 the pixels are arranged so that pixels in a row alternate dot polarity patterns (positive or negative) and pixels in a column also have the same dot polarity pattern. Thus, pixels P(0, 0) and P(0, 1) have negative dot polarity pattern and pixels P(1, 0) and P(1, 1) have positive dot polarity pattern. However, at the next frame the pixels will switch dot polarity patterns. Thus in general a pixel P(x, y) has a first dot polarity pattern when x is even and a second dot polarity pattern when x is odd. Pixels on each row of pixels are vertically aligned and separated horizontally so that the right most color dots of a pixel are separated from the leftmost color dot of an adjacent pixel by a horizontal dot spacing HDS3. Pixels on a column of pixels are horizontally aligned and separated by a vertical dot spacing VDS3.

As stated above, the extra-planar fringe field amplifiers and associated dots of a first pixel receive polarity from the switching elements of a second pixel. For example, the electrode of extra-planar fringe field amplifier EPFFA_1_2 of pixel P(0, 0) is coupled to switching elements SE_1 of pixel P(0, 1) via conductor 413 of pixel P(0, 0) and conductor 433 of pixel P(0, 1). Similarly, the electrode of extra-planar fringe field amplifier EPFFA_3_1 of pixel P(0, 0) is coupled to switching elements SE_3 of pixel P(0, 1) via conductor 420 of pixel P(0, 0) and conductor 440 of pixel P(0, 1). Furthermore, as explained above, the polarity of polarized components adjacent to a color dot having a first polarity would have a second polarity.

Although having opposite polarity provides better fringe field amplification, even using a neutral polarity on the extra-planar fringe field amplifiers provide some amplification of the fringe field in the color dots. In most embodiments of the present invention that use neutral polarity on the extra-planar fringe field amplifiers, the neutral polarity is achieved by applying common voltage V_COM on the extra-planar fringe field amplifiers. Some small modifications 410 are made if neutral polarity is to be used for the extra-planar fringe-field amplifiers. Specifically, the electrodes used to bring opposite polarity from adjacent pixels to the extra-planar fringe field amplifiers are not needed but additional electrodes are used to couple the extra planar fringe field amplifiers to receive common voltage V_COM.

Figure 5A:
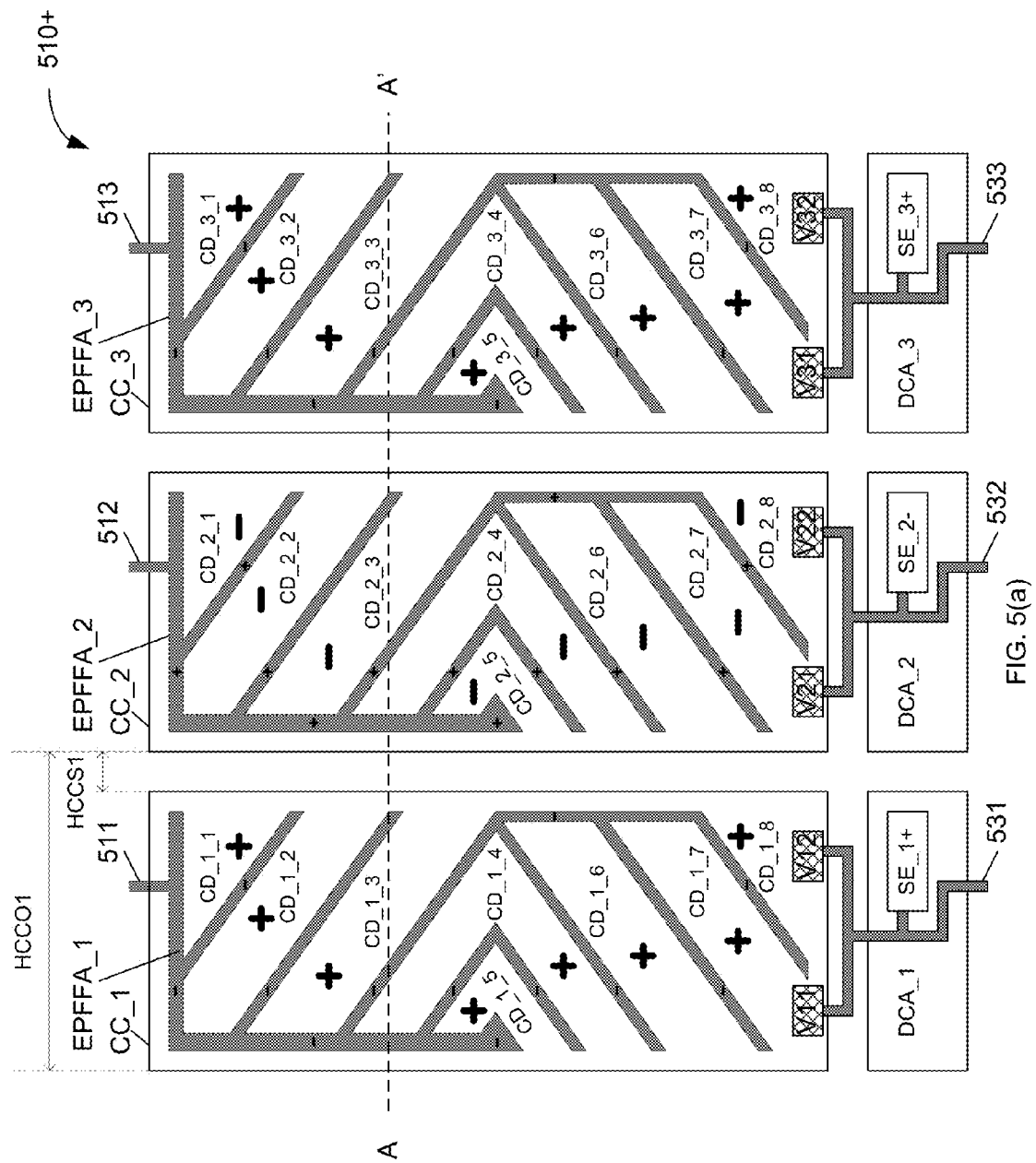
FIGS. 5(a)-5(f) illustrate a pixel design in accordance with one embodiment of the present invention.
Figure 5B:
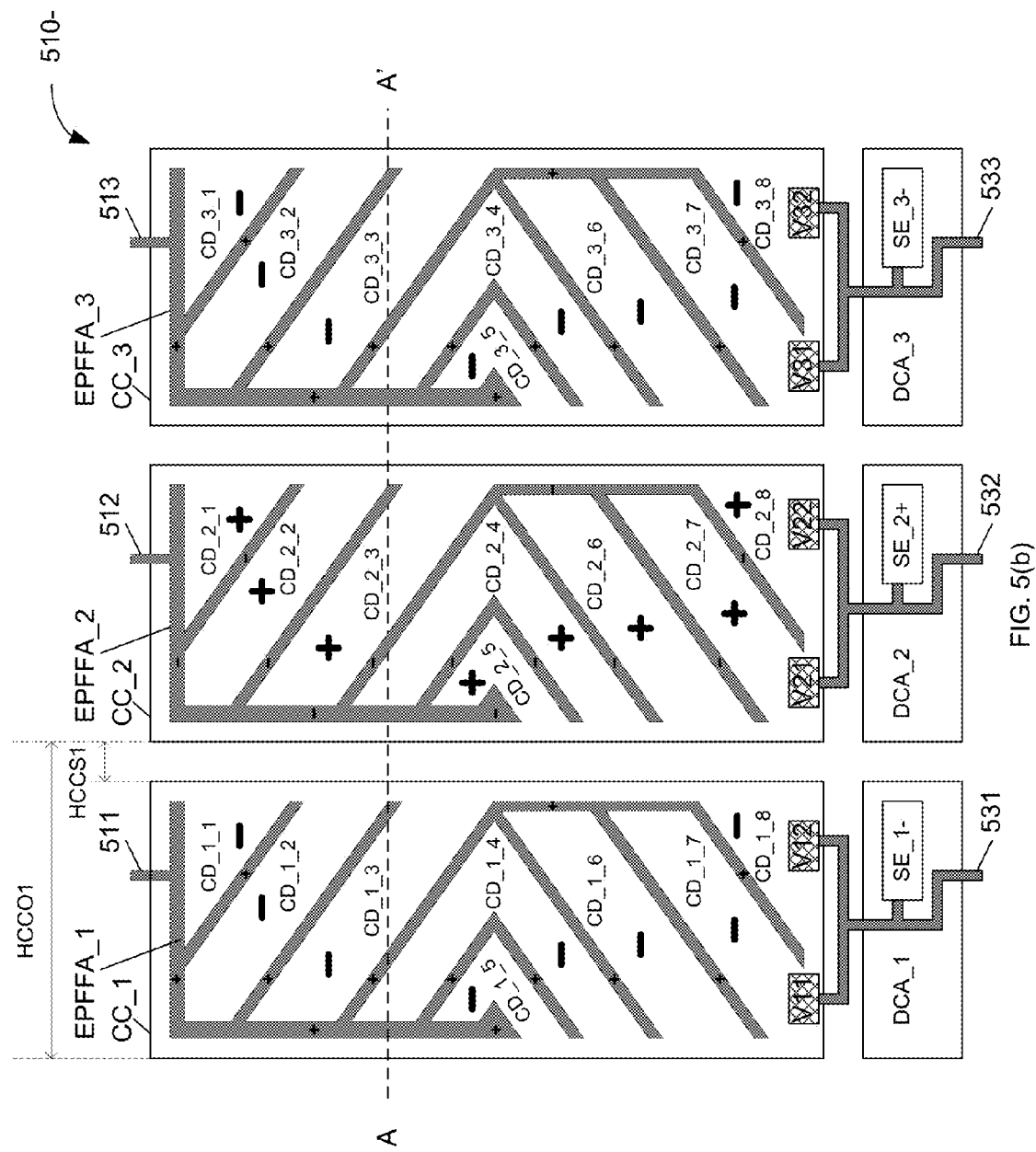
Figure 5C:
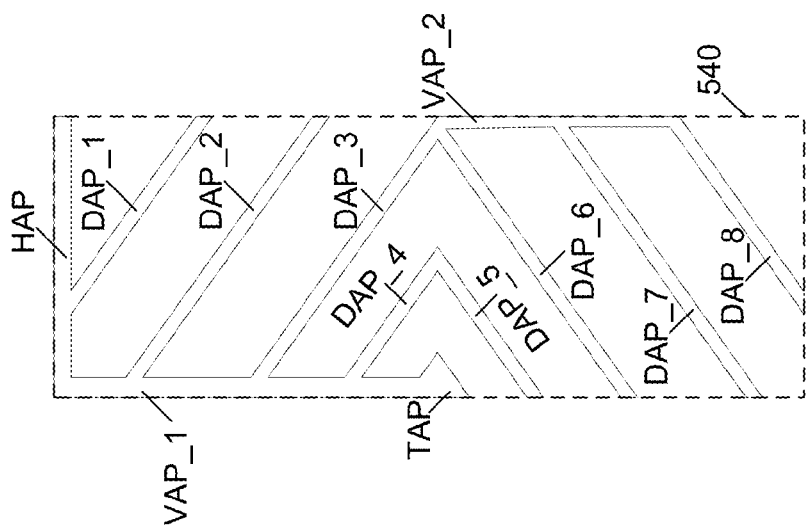

FIGS. 5(a) and 5(b) show different dot polarity patterns of a pixel design 510 that is often used in displays having a switching element point inversion driving scheme. In actual operation a pixel will switch between a first dot polarity pattern and a second dot polarity pattern between each image frame. Specifically, in FIG. 5(*a*), pixel design 510 has a positive dot polarity pattern (and is thus labeled 510+) and in FIG. 5(*b*), pixel design 510 has a negative dot polarity pattern (and is thus labeled 510−). Furthermore, the polarity of each polarized component in the various pixel designs are indicated with "+" for positive polarity or "−" for negative polarity.

Pixel design 510 has three color components CC_1, CC_2 and CC_3. Each of the three color components includes eight color dots. For clarity, the color dots are referenced as CD_X_Y, where X is a color component (from 1 to 3 in FIGS. 5(*a*)-5(*b*) and Y is a color dot number (from 1 to 8 in FIGS. 5(*a*)-5(*b*)). Unlike pixel design 410, the color dots of pixel design 510 do not have a rectangular shape and do not all have the same shape. Specifically, the color dots of pixel design 510 include triangles, non-regular pentagons, parallelograms, and non-regular hexagons. Pixel design 510 also includes a switching element (referenced as SE_1, SE_2, and SE_3) for each color component and a polarized extra-planar fringe field amplifier for each color component (referenced as EPFFA_I, where I is the color component). Switching elements SE_1, SE_2, and SE_3 are arranged in a row. A device component area is shown around each of switching element SE_1, SE_2, and SE_3 and labeled DCA_1, DCA_2, and DCA_3, respectively. Vias V11 and V12 are used to connect the color dots to a conductor 531 which is connected to switching element SE_1+. Conductor 531 is also used to connect to extra-planar fringe field amplifiers of other pixels as explained below.

First color component CC_1 of pixel design 510 has eight color dots CD_1_1, CD_1_2, CD_1_3, CD_1_4, CD_1_5, CD_1_6, CD_1_7, and CD_1_8, which together form a rectangular shape for color component CC_1. In pixel design 510, the color dots are electrically coupled around the edge of color component CC_1. The color dots of color component CC_1 are separated from each other by portions of extra-planar fringe field amplifier EPFFA_1, which is shown in greater detail in FIG. 5(*c*).

As shown in FIG. 5(*c*), extra-planar fringe field amplifier EPFFA_1, includes a horizontal amplifying portion HAP, a first and second vertical amplifying portion VAP_1 and VAP_2, eight diagonal amplifying portions DAP_1, DAP_2, DAP_3, DAP_4, DAP_5, DAP_6, DAP_7, and DAP_8, and a triangular amplifying portion TAP. The various amplifying portions of extra-planar fringe field amplifier EPFFA_1 are bounded by a hypothetical rectangle 540, drawn with dotted lines. In the description that follows, the left side, top, bottom, and right side of rectangle 540 is used for descriptive purposes only.

Horizontal amplifying portion HAP and vertical amplifying portion VAP_1 form a right angle at the top left corner of rectangle 540. Horizontal amplifying portion HAP has length (horizontally) that is the width of rectangle 540. Vertical amplifying portion VAP_1 has a length (vertical) that is approximately half the height of rectangle 540. Diagonal amplifying portion DAP_1 begins at horizontal amplifying portion HAP and extends down and to the right. Specifically, diagonal amplifying portion DAP_1 begins at approximately one-third the length of horizontal amplifying portion HAP to the right of the corner formed by horizontal amplifying portion HAP and vertical amplifying portion VAP_1 and ends at the right side of rectangle 540. Diagonal amplifying portion DAP_2 begins at vertical amplifying portion VAP_1 and extends down and to the right. Specifically, diagonal amplifying portion DAP_2 begins at approximately one-forth the length of vertical amplifying portion VAP_1 below the corner formed by horizontal amplifying portion HAP and vertical amplifying portion VAP_1 and ends at the right side of rectangle 540. Diagonal amplifying portion DAP_3 begins at vertical amplifying portion VAP_1 and extends down and to the right. Specifically, diagonal amplifying portion DAP_3 begins at approximately one-half the length of vertical amplifying portion VAP_1 below the corner formed by horizontal amplifying portion HAP and vertical amplifying portion VAP_1 and ends at the right side rectangle 540. Diagonal amplifying portion DAP_4 begins at vertical amplifying portion VAP_1 and extends down and to the right. Specifically, diagonal amplifying portion DAP_4 begins at approximately three-fourth the length of vertical amplifying portion VAP_1 below the corner formed by horizontal amplifying portion HAP and vertical amplifying portion VAP_1 and ends at near the middle of rectangle 540. Triangular amplifying portion TAP is at the end of vertical amplifying portion VAP_1. Triangular amplifying portion TAP is has a width that is about twice the width of vertical amplifying portion VAP_1. Diagonal amplifying portion DAP_5 begins at the end of diagonal amplifying portion DAP_4 and extends down and to the left. Specifically, diagonal amplifying portion DAP_5 ends at left side of rectangle 540. Diagonal amplifying portion DAP_6 begins at the end of diagonal amplifying portion DAP_3 and extends down and to the left. Specifically, diagonal amplifying portion DAP_6 ends at left side of rectangle 540. Vertical amplifying portion VAP_2 also begins at the end of diagonal amplifying portion DAP_3 but extends downwards. Vertical amplifying portion VAP_2 has a length that is approximately one-fourth of the height rectangle 540. Diagonal amplifying portion DAP_7 begins at approximately the middle of vertical amplifying portion VAP_2 and extends down and to the left. Specifically, diagonal amplifying portion DAP_7 extends to the left side of rectangle 540. Diagonal amplifying portion DAP_8 begins at the end of vertical amplifying portion VAP_2 and extends down and to the left. Specifically, diagonal amplifying portion DAP_7 extends to the bottom of rectangle 540. The various amplifying portions of extra-planar fringe field amplifier EPFFA_1 are placed in between or adjacent to the color dots of color component CC_1. However, extra-planar fringe field amplifier EPFFA_1 is on a different plane than the color dots.

Color dot CD_1_1 (FIG. 5(*a*)) has a triangular shape with a horizontal side, a vertical side, and a diagonal side. Color dot CD_1_1 is in the top right corner of color component CC_1. A section of horizontal amplifying portion HAP of extra-planar fringe field amplifier EPFFA_1 runs along the horizontal side of color dot CD_1_1 and diagonal amplifying portion DAP_1 of extra-planar fringe field amplifier EPFFA_1 runs along the diagonal side of color dot CD_1_1. Color dot CD_1_2 has a non-regular pentagon shape with a horizontal side, a left vertical side, an upper diagonal side, a bottom diagonal side, and a right vertical side. A section of horizontal amplifying portion HAP of extra-planar fringe field amplifier EPFFA_1 runs along the horizontal side of color dot CD_1_2, a section of vertical amplifying portion of VAP_1 of extra-planar fringe field amplifier EPFFA_1 runs along the left vertical side of color dot CD_1_2, diagonal amplifying portion DAP_1 of extra-planar fringe field amplifier EPFFA_1 runs along the upper diagonal side of color dot CD_1_2, and diagonal amplifying portion DAP_2 of extra-planar fringe field amplifier EPFFA_1 runs along the lower diagonal side of color dot CD_1_2. Color dot CD_1_3 has a parallelogram shape with a left vertical side, an upper diagonal side, a lower diagonal side, and a right vertical side. A section of vertical amplifying portion of VAP_1 of extra-planar fringe field amplifier EPFFA_1 runs along the left vertical side of color dot CD_1_2, diagonal amplifying portion DAP_2 of extra-planar fringe field amplifier EPFFA_1 runs along the upper diagonal side of color dot CD_1_3, and diagonal amplifying portion DAP_3 of extra-planar fringe field amplifier EPFFA_1 runs along the lower diagonal side of color dot CD_1_3.

Color dot CD_1_4 has a non-regular hexagon shape in the form of a sideways "V". Specifically, color dot CD_1_4, has an upper left vertical side, an upper long diagonal side, a lower long diagonal side, an upper short diagonal side, a lower short diagonal side, and a lower left vertical side. A section of vertical amplifying portion of VAP_1 of extra-planar fringe field amplifier EPFFA_1 runs along the upper left vertical side of color dot CD_1_4, diagonal amplifying portion DAP_3 of extra-planar fringe field amplifier EPFFA_1 runs along the upper long diagonal side of color dot CD_1_4, diagonal amplifying portion DAP_4 of extra-planar fringe field amplifier EPFFA_1 runs along the upper short diagonal side of color dot CD_1_4, diagonal amplifying portion DAP_5 of extra-planar fringe field amplifier EPFFA_1 runs along the lower short diagonal side of color dot CD_1_4, and diagonal amplifying portion DAP_6 of extra-planar fringe field amplifier EPFFA_1 runs along the lower long diagonal side of color dot CD_1_4.

Color dot CD_1_5 also has a non-regular hexagon shape in the form of a sideways "V". Specifically, color dot CD_1_5, has an upper left vertical side, an upper long diagonal side, a lower long diagonal side, an upper short diagonal side, a lower short diagonal side, and a lower left vertical side. A section of vertical amplifying portion of VAP_1 of extra-planar fringe field amplifier EPFFA_1 runs along the upper left vertical side of color dot CD_1_5, diagonal amplifying portion DAP_4 of extra-planar fringe field amplifier EPFFA_1 runs along the upper long diagonal side of color dot CD_1_5, triangular amplifying portion TAP of extra-planar fringe field amplifier EPFFA_1 borders both the upper short diagonal side of color dot CD_1_5 and the lower short diagonal side of color dot CD_1_4, and diagonal amplifying portion DAP_5 of extra-planar fringe field amplifier EPFFA_1 runs along the lower long diagonal side of color dot CD_1_5.

Color dot CD_1_6 has a parallelogram shape with a left vertical side, an upper diagonal side, a lower diagonal side, and a right vertical side. A section of vertical amplifying portion of VAP_2 of extra-planar fringe field amplifier EPFFA_1 runs along the right vertical side of color dot CD_1_6, diagonal amplifying portion DAP_6 of extra-planar fringe field amplifier EPFFA_1 runs along the upper diagonal side of color dot CD_1_6, and diagonal amplifying portion DAP_7 of extra-planar fringe field amplifier EPFFA_1 runs along the lower diagonal side of color dot CD_1_6.

Color dot CD_1_7 has a non-regular pentagon shape with a horizontal side, a left vertical side, an upper diagonal side, a lower diagonal side, and a right vertical side. A section of vertical amplifying portion of VAP_2 of extra-planar fringe field amplifier EPFFA_1 runs along the right vertical side of color dot CD_1_7, diagonal amplifying portion DAP_7 of extra-planar fringe field amplifier EPFFA_1 runs along the upper diagonal side of color dot CD_1_7, and diagonal amplifying portion DAP_8 of extra-planar fringe field amplifier EPFFA_1 runs along the lower diagonal side of color dot CD_1_7.

Color dot CD_1_8 has a triangular shape with a horizontal side, a vertical side, and a diagonal side. Color dot CD_1_8 is in the bottom right corner of color component CC_1. Diagonal amplifying portion DAP_8 of extra-planar fringe field amplifier EPFFA_1 runs along the diagonal side of color dot CD_1_8.

In pixel design 510, switching element SE_1 is located below color component CC_1. Switching element SE_1 is coupled to the electrodes of the color dots of color component CC_1 to control the voltage polarity and voltage magnitude of color dots CD_1_1, CD_1_2, CD_1_3, CD_1_4, CD_1_5, CD_1_6, CD_1_7, and CD_1_8. Specifically, for pixel design 510, switching element SE_1 is coupled to color component CC_1 using two vias V11 and V12 for better power distribution.

Similarly, second color component CC_2 of pixel design 510 has eight color dots CD_2_1, CD_2_2, CD_2_3, CD_2_4, CD_2_5, CD_2_6, CD_2_7, and CD_2_8, which are arranged in the same manner as color dots CD_1_1, CD_1_2, CD_1_3, CD_1_4, CD_1_5, CD_1_6, CD_1_7, and CD_1_8. An extra-planar fringe field amplifier EPFFA_2 is used with color component CC_2 in the same manner as described above for extra-planar fringe field amplifier EPFFA_1 with color component CC_1. A switching element SE_2 within a device component area DCA_2, which is located below color component CC_2, is coupled to color component CC_2 using vias V21 and V22. Second color component CC_2 is vertically aligned with first color component CC_1 and separated from color component CC_1 by horizontal color component spacing HCCS1, thus color components CC_1 and CC_2 are horizontally offset by a horizontal color component offset HCCO1.

Furthermore, color component CC_3 of pixel design 510 has eight color dots CD_3_1, CD_3_2, CD_3_3, CD_3_4, CD_3_5, CD_3_6, CD_3_7, and CD_3_8, which are arranged in the same manner as color dots CD_1_1, CD_1_2, CD_1_3, CD_1_4, CD_1_5, CD_1_6, CD_1_7, and CD_1_8. An extra-planar fringe field amplifier EPFFA_3 is used with color component CC_3 in the same manner as described above for extra-planar fringe field amplifier EPFFA_1 with color component CC_1. A switching element SE_3 within a device component area DCA_3, which is located below color component CC_3, is coupled to color component CC_3 using vias V31 and V32. Third color component CC_3 is vertically aligned with second color component CC_2 and separated from color component CC_2 by horizontal color component spacing HCCS1, thus color components CC_3 and CC_2 are horizontally offset by a horizontal color component offset HCCO1.

Figure 5D:
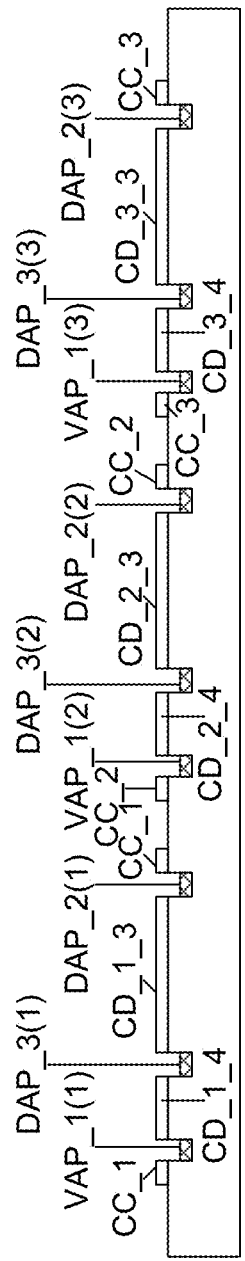

Although it appears from FIGS. 5(a) and 5(b) that the color dots are touching the extra-planar fringe field amplifiers, the extra-planar fringe field amplifiers actually lie in a different plane as illustrated in FIG. 5(d), which shows a cross section of pixel design 510 taken at the A-A' cut.

FIG. 5(d) shows cross section of color dots CD_1_4, CD_1_3, CD_2_4, CD_2_3, CD_3_4, and CD_3_3, and portions of extra-planar fringe field amplifiers EPFFA_1, EPFFA_2, EPFFA_3. Specifically, vertical amplifying portion VAP_1, diagonal amplifying portion DAP_3, and diagonal amplifying portion DAP_2 of extra-planar fringe field amplifiers EPFFA_1, EPFFA_2, EPFFA_3 are shown in FIG. 5(d). For clarity, vertical amplifying portion VAP_1 of extra-planar fringe field amplifier EPFFA_1 is labeled as VAP_1(1), vertical amplifying portion VAP_1 of extra-planar fringe field amplifier EPFFA_2 is labeled as VAP_1(2), vertical amplifying portion VAP_1 of extra-planar fringe field amplifier EPFFA_3 is labeled as VAP_1(3). Similar labeling is used for the diagonal amplifying portions. The color dots are in a first plane and the extra-planar fringe field amplifiers are in a second plane. Specifically, the extra-planar fringe field amplifiers of pixel design 510 are on a lower plane than the color dots. More specifically, the top of the extra planar fringe field amplifiers are separated from bottom of the color dots by an amplifier depth spacing ADS (not specifically labeled in FIG. 5(d)). In other embodiments of the present invention the extra-planar fringe field amplifiers can be above the color dots. In these embodiments amplifier depth spacing ADS is measured from the top of the color dots to the bottom of the extra-planar fringe field amplifiers.

Thus, diagonal amplifying portion DAP_3 of extra-planar fringe field amplifier EPFFA_1 can be described as diagonally adjacent to color dot CD_1_4 and diagonally adjacent to color dot CD_1_3 but on a different plane relative to color dots CD_1_3 and CD_1_4. Diagonal amplifying portion DAP3 of extra-planar fringe field amplifier EPFFA_1 can also be described as diagonally in between color dots CD_1_3 and CD_1_4 but on a lower plane relative to color dots CD_1_3 and CD_1_4. Similarly, diagonal amplifying portions DAP_1, DAP_2, DAP_3, DAP_4, DAP_5, DAP_6, DAP_7, and DAP_8 of extra-planar fringe field amplifiers EPFFA_1 are diagonally in between color dots CD_1_1, and CD_1_2, color dots, CD_1_2 and CD_1_3, color dots CD_1_3 and CD_1_4, color dots CD_1_4 and CD_1_5, color dots CD_1_5 and CD_1_4, color dots CD_1_4 and CD_1_6, color dots CD_1_6 and CD_1_7, and color dots CD_1_7 and CD_1_8, respectively, and on a different plane than the color dots.

Pixel design 510 is designed so that the extra-planar fringe field amplifiers can receive polarity from an adjacent pixel. Specifically, a first conductor is coupled to an extra-planar fringe field amplifier to receive polarity from the pixel above the current pixel and a second conductor is coupled to the switching element to provide polarity to an extra-planar fringe field amplifier of the pixel below the current pixel. Specifically, conductor 511, which is coupled to extra-planar fringe field amplifier EPFFA_1, extends upward to connect to the equivalent conductor of conductor 531 of a pixel above the current pixel to receive polarity (see FIG. 5(e)). Conductor 531, which is coupled to switching element SE_1, extends downward to connect to the equivalent conductor of conductor 511 in the pixel below the current pixel. Conductors 512 and 532 serve the same purpose for extra-planar fringe field amplifier EPFFA_2. Similarly, conductors 513 and 533 serve the same purpose for extra-planar fringe field amplifier EPFFA_3.

The polarities of the color dots, the extra-planar fringe field amplifiers, and switching elements are shown using "+" and "−" signs. Thus, in FIG. 5(a), which shows the positive dot polarity pattern of pixel design 510+, switching elements SE_1 and SE_3; color dots CD_1_1, CD_1_2, CD_1_3, CD_1_4, CD_1_5, CD_1_6, CD_1_7, CD_1_8, CD_3_1, CD_3_2, CD_3_3, CD_3_4, CD_3_5, CD_3_6, CD_3_7, CD_3_8; and extra-planar fringe field amplifier EPFFA_2 have positive polarity. However, switching element SE_2; color dots CD_2_1, CD_2_2, CD_2_3, CD_2_4, CD_2_5, CD_2_6, CD_2_7, and CD_2_8; and extra-planar fringe field amplifiers EPFFA_1, and EPFFA_3 have negative polarity.

FIG. 5(b) shows pixel design 510 with the negative dot polarity pattern. For the negative dot polarity pattern, switching elements SE_1 and SE_3; color dots CD_1_1, CD_1_2, CD_1_3, CD_1_4, CD_1_5, CD_1_6, CD_1_7, CD_1_8, CD_3_1, CD_3_2, CD_3_3, CD_3_4, CD_3_5, CD_3_6, CD_3_7, CD_3_8; and extra-planar fringe field amplifier EPFFA_2 have negative polarity. However, switching element SE_2; color dots CD_2_1, CD_2_2, CD_2_3, CD_2_4, CD_2_5, CD_2_6, CD_2_7, and CD_2_8; and extra-planar fringe field amplifiers EPFFA_1, and EPFFA_3 have positive polarity.

As explained above fringe fields in each of the color dots are amplified if adjacent components have opposite polarities. Pixel design 510 makes use of the extra-planar fringe field amplifiers to enhance and stabilize the formation of multiple domains in the liquid crystal structure. In general, the polarities of the polarized components are assigned so that a color dot of a first polarity has neighboring polarized components of the second polarity. For example for the positive dot polarity pattern of pixel design 510 (FIG. 5(a)), color dot CD_1_3 has positive polarity. However the neighboring polarized components (vertical amplifying portion VAP_1, diagonal amplifying portion DAP_2, and diagonal amplifying portion DAP_3 of extra-planar fringe field amplifier EPFFA_1) have negative polarity. Thus, the fringe field of color dot CD_1_3 is amplified. However as explained above, some embodiments of the present invention may use neutral polarity on the extra-planar fringe field amplifiers.

Figure 5E:
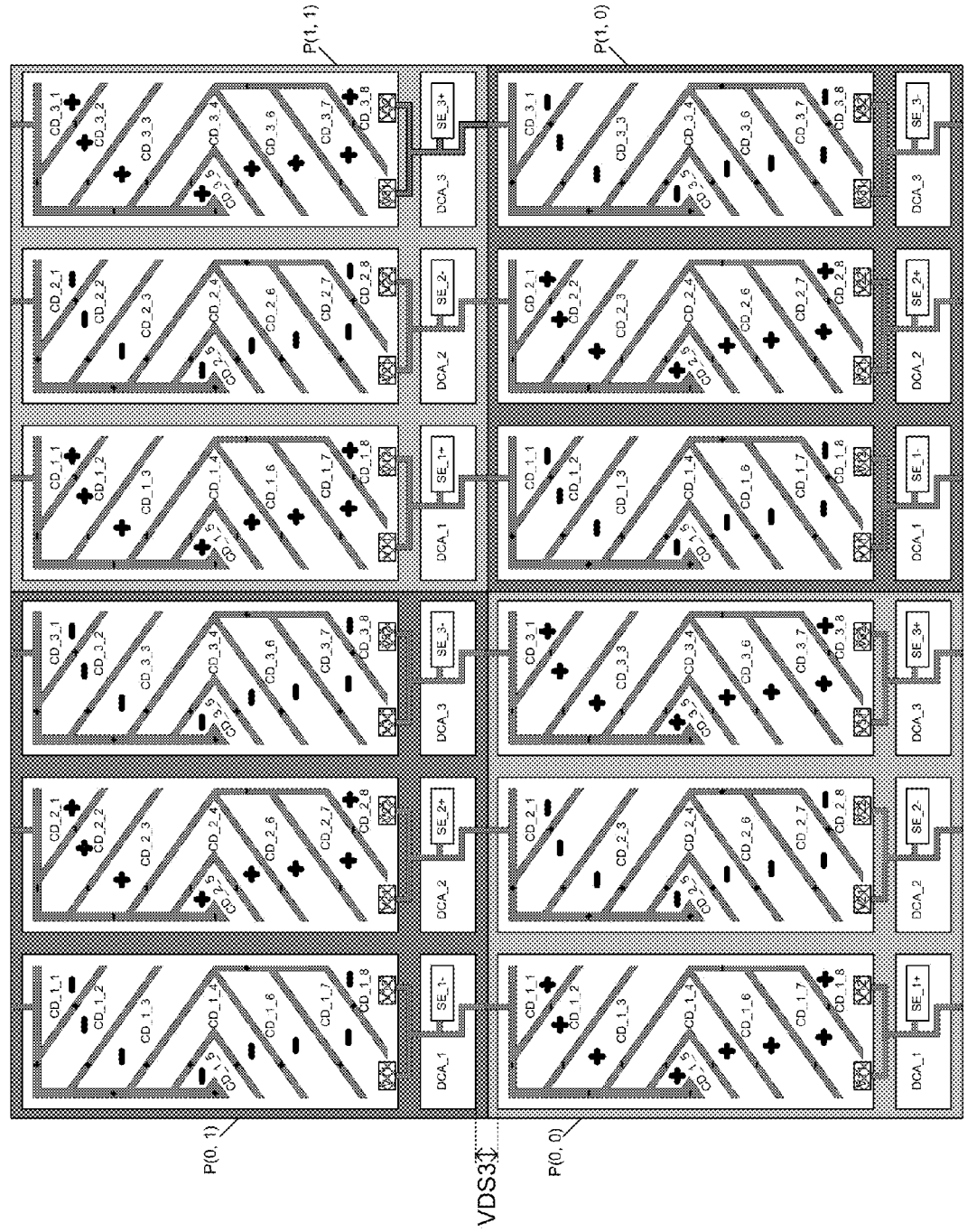

Pixels using pixel design 510 of FIGS. 5(a) and 5(b) can be used in displays using switching element point inversion driving schemes. FIG. 5(e) shows a portion of display 550 using pixels P(0, 0), P(1, 0), P(0, 1), and P(1, 1) of pixel design 510 with a switching element point inversion driving scheme. Display 550 could have thousands of rows with thousand of pixels on each row. The rows and columns would continue from the portion shown in FIG. 5(e) in the manner shown in FIG. 5(e). For clarity, the gate lines and source lines that control the switching elements are omitted in FIG. 5(e). To better illustrate each pixel, the area of each pixel is shaded; this shading is only for illustrative purposes in FIG. 5(e) and has no functional significance. In display 550 the pixels are arranged so that pixels in a row alternate dot polarity patterns (positive or negative) and pixels in a column also alternate between positive and negative dot polarity pattern. Thus, pixels P(0, 1) and P(1, 0) have positive dot polarity pattern and pixels P(0, 0) and P(1, 1) have the negative dot polarity pattern. However, at the next frame the pixels will switch dot polarity patterns. Thus in general a pixel P(x, y) has a first dot polarity pattern when x+y is even and a second dot polarity pattern when x+y is odd. Pixels on each row of pixels are vertically aligned and separated horizontally so that the right most color dots of a pixel are separated from the leftmost color dot of an adjacent pixel by a horizontal dot spacing HDS3. Pixels on a column of pixels are horizontally aligned and separated by a vertical dot spacing VDS3.

As stated above, the extra-planar fringe field amplifiers receive polarity from the switching elements of a second pixel. For example, the electrode of extra-planar fringe field amplifier EPFFA_1 of pixel P(0, 0) is coupled to switching elements SE_1 of pixel P(0, 1) via conductor 511 of pixel P(0, 0) and conductor 531 of pixel P(0, 1). Similarly, the electrode of extra-planar fringe field amplifier EPFFA_3 of pixel P(0, 0) is coupled to switching elements SE_3 of pixel P(0, 1) via conductor 513 of pixel P(0, 0) and conductor 533 of pixel P(0, 1). Furthermore, as explained above, the polarity of polarized components adjacent to a color dot having a first polarity would have a second polarity.

In a particular embodiment of the present invention, each color component has a width of 140 micrometers and a height of 420 micrometers. The various portions of the extra-planar fringe field amplifier have extra-planar fringe field amplifier width of 4 micrometers. The diagonal amplifying portions are placed at an angle of 45 degrees from the horizontal position, horizontal color component spacing HCCS1 is 4 micrometers, and amplifier depth spacing ADS is 0.45 micrometers.

Figure 5F:
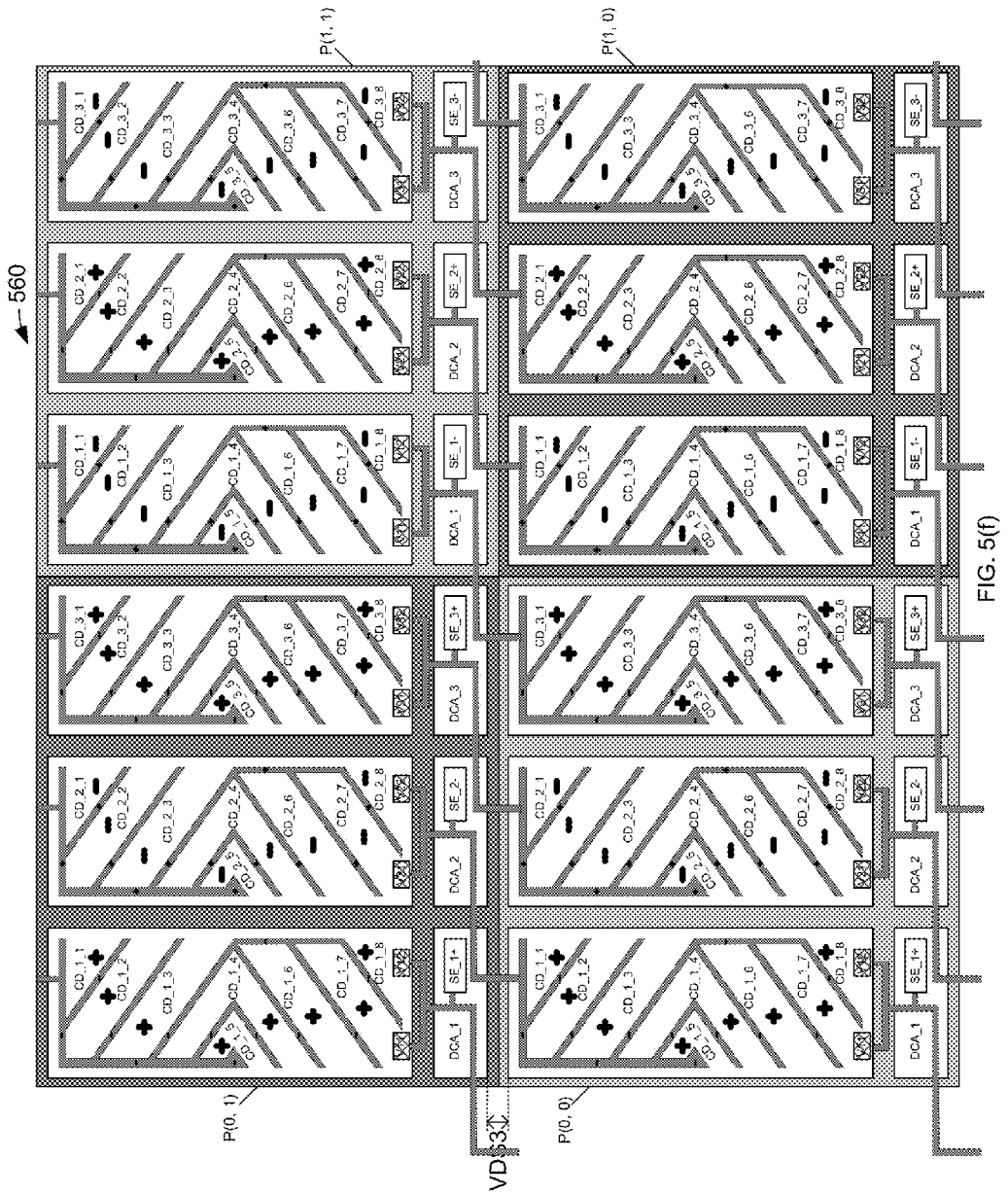

Pixels using pixel design 510 of FIGS. 5(a) and 5(b) can be used in displays using switching element column inversion driving schemes. FIG. 5(f) shows a portion of display 560 using pixels P(0, 0), P(1, 0), P(0, 1), and P(1, 1) of pixel design 510 with a switching element column inversion driving scheme. Display 560 could have thousands of rows with thousand of pixels on each row. The rows and columns would continue from the portion shown in FIG. 5(f) in the manner shown in FIG. 5(f). For clarity, the gate lines and source lines that control the switching elements are omitted in FIG. 5(f). To better illustrate each pixel, the area of each pixel is shaded; this shading is only for illustrative purposes in FIG. 5(f) and has no functional significance. In display 560 the pixels are arranged so that pixels in a row alternate dot polarity patterns (positive or negative) and pixels in a column have the same dot polarity pattern. Thus, pixels P(0, 1) and P(0, 0) have positive dot polarity pattern and pixels P(1, 0) and P(1, 1) have the negative dot polarity pattern. However, at the next frame the pixels will switch dot polarity patterns. Thus in general a pixel P(x, y) has a first dot polarity pattern when x is even and a second dot polarity pattern when x is odd. Pixels on each row of pixels are vertically aligned and separated horizontally so that the right most color dots of a pixel are separated from the leftmost color dot of an adjacent pixel by a horizontal dot spacing HDS3. Pixels on a column of pixels are horizontally aligned and separated by a vertical dot spacing VDS3.

As stated above, the extra-planar fringe field amplifiers receive polarity from the switching elements of a second pixel. For example, the electrode of extra-planar fringe field amplifier EPFFA_1 of pixel P(0, 0) is coupled to switching elements SE_1 of pixel P(0, 1) via conductor 511 of pixel P(0, 0) and conductor 531 of pixel P(0, 1). Similarly, the electrode of extra-planar fringe field amplifier EPFFA_3 of pixel P(0, 0) is coupled to switching elements SE_3 of pixel P(0, 1) via conductor 513 of pixel P(0, 0) and conductor 533 of pixel P(0, 1). Furthermore, as explained above, the polarity of polarized components adjacent to a color dot having a first polarity would have a second polarity.

Figure 6A:
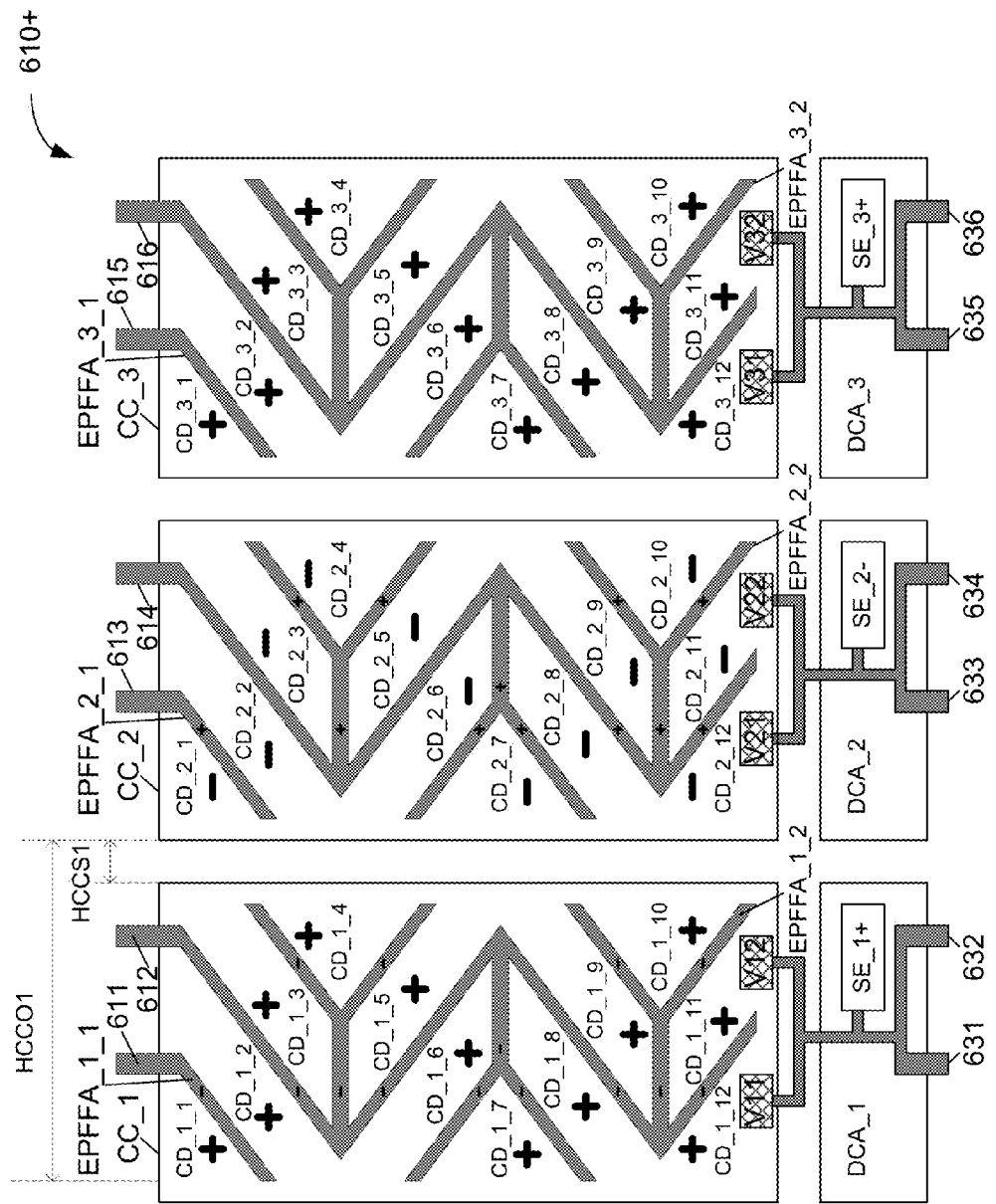
FIGS. 6(a)-6(e) illustrate a pixel design in accordance with one embodiment of the present invention.
Figure 6B:
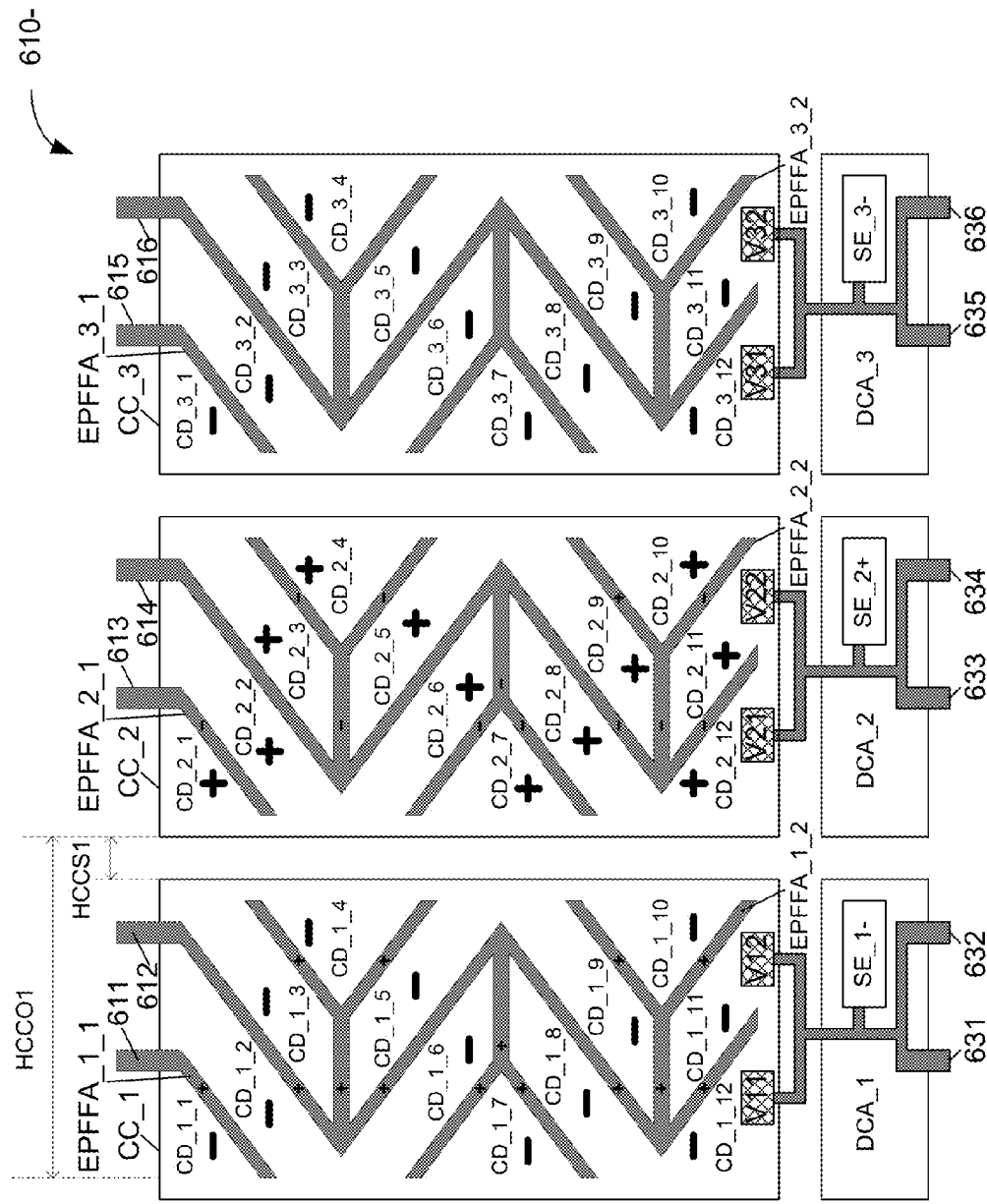

FIGS. 6(a) and 6(b) show different dot polarity patterns of a pixel design 610 that is often used in displays having a switching element point inversion driving scheme or switching element column inversion driving schemes. In actual operation a pixel will switch between a first dot polarity pattern and a second dot polarity pattern between each image frame. Specifically, in FIG. 6(a), pixel design 610 has a positive dot polarity pattern (and is thus labeled 610+) and in FIG. 6(b), pixel design 610 has a negative dot polarity pattern (and is thus labeled 610−). Furthermore, the polarity of each polarized component in the various pixel designs are indicated with "+" for positive polarity or "−" for negative polarity.

Pixel design 610 has three color components CC_1, CC_2 and CC_3. Each of the three color components includes twelve color dots. For clarity, the color dots are referenced as CD_X_Y, where X is a color component (from 1 to 3 in FIGS. 6(a)-6(b) and Y is a color dot number (from 1 to 12 in FIGS. 6(a)-6(b)). Unlike pixel design 410, the color dots of pixel design 610 do not have a rectangular shape and do not all have the same shape. Specifically, the color dots of pixel design 610 have triangular shapes or trapezoid shapes. Pixel design 610 also includes a switching element (referenced as SE_1, SE_2, and SE_3) for each color component and two polarized extra-planar fringe field amplifier for each color component (referenced as EPFFA_I_J, where I is the color component and J is the extra-planar fringe field amplifier number). Switching elements SE_1, SE_2, and SE_3 are arranged in a row. A device component area is shown around each of switching element SE_1, SE_2, and SE_3 and labeled DCA_1, DCA_2, and DCA_3, respectively.

First color component CC_1 of pixel design 610 has twelve color dots CD_1_1, CD_1_2, CD_1_3, CD_1_4, CD_1_5, CD_1_6, CD_1_7, CD_1_8, CD_1_9, CD_1_10, CD_1_11, and CD_1_12, which together form a rectangular shape for color component CC_1. In pixel design 610, the color dots are electrically coupled around the edge of color component CC_1. The color dots of color component CC_1 are separated from each other by portions of extra-planar fringe field amplifier EPFFA_1_1 and EPFFA_1_2, which are shown in greater detail in FIG. 6(c).

Figure 6C:
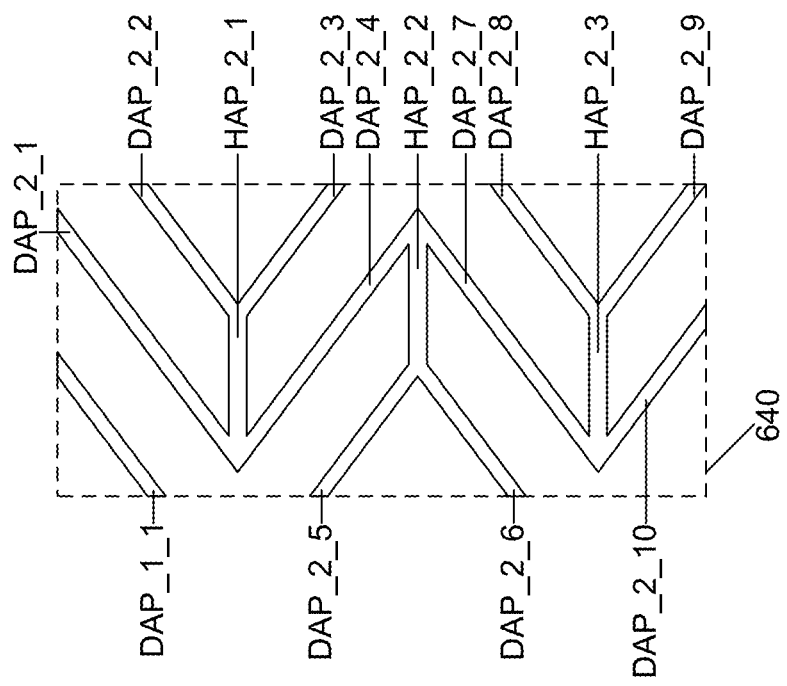

As shown in FIG. 6(c), extra-planar fringe field amplifiers EPFFA_1_1 has a single diagonal portion labeled DAP_1_1, where the first "1" refers to the extra-planar fringe field number (i.e. 1 or 2) and the second number enumerates amplifying portions within an extra-planar fringe field amplifier. Extra-planar fringe field amplifier EPFFA_1_2 includes a three horizontal amplifying portions HAP_2_1, HAP_2_2, HAP_2_3 and 10 diagonal amplifying portions DAP_2_1, DAP_2_2, DAP_2_3, DAP_2_4, DAP_2_5, DAP_2_6, DAP_2_7, DAP_2_8, DAP_2_9, and DAP_2_10. The various amplifying portions of extra-planar fringe field amplifiers EPFFA_1_1 and EPFFA_1_2 are bounded by a hypothetical rectangle 640, drawn with dotted lines. In the description that follows, the left side, top, bottom, and right side of rectangle 640 are used for descriptive purposes only.

Diagonal amplifying portion DAP_1_1 begins at the top of rectangle 640 about one-third of the width rectangle 640 from the top left corner of rectangle 640. Diagonal amplifying portion DAP_1_1 extends down and to the left and ends at the left side of rectangle 640. Diagonal amplifying portion DAP_2_1 begins at the top of rectangle 640 near the top right corner of rectangle 640 and extends down and to the left and ends near the left side of rectangle 640. Horizontal amplifying portion HAP_2_1 begins at the end of diagonal amplifying portion DAP_2_1 and extends to the right. Horizontal amplifying portion HAP_2_1 has a length that is approximately half the width of rectangle 640. Diagonal amplifying portion DAP_2_2 begins at the end of horizontal amplifying portion HAP_2_1. Diagonal amplifying portion DAP_2_2 extends up and to the right and ends at the right side of rectangle 640. Diagonal amplifying portion DAP_2_3 begins at the end of horizontal amplifying portion HAP_2_1. Diagonal amplifying portion DAP_2_3 extends down and to the right and ends at the right side of rectangle 640. Diagonal amplifying portion DAP_2_4 begins at the end of diagonal amplifying portion DAP_2_1. Diagonal amplifying portion DAP_2_4 extends down and to the right and ends near the right side of rectangle 640.

Horizontal amplifying portion HAP_2_2 begins at the end of diagonal amplifying portion DAP_2_4 and extends to the left. Horizontal amplifying portion HAP_2_2 has a length that is approximately half the width of rectangle 640. Diagonal amplifying portion DAP_2_5 begins at the end of horizontal amplifying portion HAP_2_2. Diagonal amplifying portion DAP_2_5 extends up and to the left and ends at the left side of rectangle 640. Diagonal amplifying portion DAP_2_6 begins at the end of horizontal amplifying portion HAP_2_2. Diagonal amplifying portion DAP_2_6 extends down and to the left and ends at the left side of rectangle 640. Diagonal amplifying portion DAP_2_7 begins at the end of diagonal amplifying portion DAP_2_4. Diagonal amplifying portion DAP_2_7 extends down and to the left and ends near the left side of rectangle 640.

Horizontal amplifying portion HAP_2_3 begins at the end of diagonal amplifying portion DAP_2_7 and extends to the right. Horizontal amplifying portion HAP_2_3 has a length that is approximately half the width of rectangle 640. Diagonal amplifying portion DAP_2_8 begins at the end of horizontal amplifying portion HAP_2_3. Diagonal amplifying portion DAP_2_8 extends up and to the right and ends at the right side of rectangle 640. Diagonal amplifying portion DAP_2_9 begins at the end of horizontal amplifying portion HAP_2_1. Diagonal amplifying portion DAP_2_9 extends down and to the right and ends at the right side of rectangle 640. Diagonal amplifying portion DAP_2_10 begins at the end of diagonal amplifying portion DAP_2_7. Diagonal amplifying portion DAP_2_10 extends down and to the right and ends at the bottom of rectangle 640. The various amplifying portions of extra-planar fringe field amplifiers EPFFA_1_1 and EPFFA_1_2 are placed in between or adjacent to the color dots of color component CC_1. However, extra-planar fringe field amplifier EPFFA_1 is on a different plane than the color dots.

Color dot CD_1_1 (FIG. 6(a)) has a triangular shape with a horizontal side, a vertical side, and a diagonal side. Color dot CD_1_1 is in the top left corner of color component CC_1. A section of diagonal amplifying portion DAP_1_1 of extra-planar fringe field amplifier EPFFA_1_1 runs along the diagonal side of color dot CD_1_1. Color dot CD_1_2 has a trapezoidal shape with a horizontal side, a vertical side, an upper diagonal side, and a lower diagonal side. Diagonal amplifying portion DAP_1_1 of extra-planar fringe field amplifier EPFFA_1_1 runs along the upper diagonal side of color dot CD_1_2, and diagonal amplifying portion DAP_2_1 of extra-planar fringe field amplifier EPFFA_1_2 runs along the lower diagonal side of color dot CD_1_2.

Color dot CD_1_3 has a trapezoidal shape with a vertical side, an upper diagonal side, a lower diagonal side, and a horizontal side. Diagonal amplifying portion DAP_2_1 of extra-planar fringe field amplifier EPFFA_1_2 runs along the upper diagonal side of color dot CD_1_3, diagonal amplifying portion DAP_2_2 of extra-planar fringe field amplifier EPFFA_1_2 runs along the lower diagonal side of color dot CD_1_3, and horizontal amplifying portion HAP_2_1 of extra-planar fringe field amplifier EPFFA_1_2 runs along the horizontal side of color dot CD_1_3. Color dot 1_4 has a triangular shape with a vertical side, an upper diagonal side, and a lower diagonal side. Diagonal amplifying portion DAP_2_2 of extra-planar fringe field amplifier EPFFA_1_2 runs along the upper diagonal side of color dot CD_1_4, and diagonal amplifying portion DAP_2_3 of extra-planar fringe field amplifier EPFFA_1_2 runs along the lower diagonal side of color dot CD_1_4. Color dot CD_1_5 has a trapezoidal shape with a vertical side, an upper diagonal side, a lower diagonal side, and a horizontal side. Horizontal amplifying portion HAP_2_1 of extra-planar fringe field amplifier EPFFA_1_2 runs along the horizontal side of color dot CD_1_5, diagonal amplifying portion DAP_2_3 of extra-planar fringe field amplifier EPFFA_1_2 runs along the upper diagonal side of color dot CD_1_5, and diagonal amplifying portion DAP_2_4 of extra-planar fringe field amplifier EPFFA_1_2 runs along the lower diagonal side of color dot CD_1_5.

Color dot CD_1_6 has a trapezoidal shape with a vertical side, an upper diagonal side, a lower diagonal side, and a horizontal side. Diagonal amplifying portion DAP_2_4 of extra-planar fringe field amplifier EPFFA_1_2 runs along the upper diagonal side of color dot CD_1_6, diagonal amplifying portion DAP_2_5 of extra-planar fringe field amplifier EPFFA_1_2 runs along the lower diagonal side of color dot CD_1_3, and horizontal amplifying portion HAP_2_2 of extra-planar fringe field amplifier EPFFA_1_2 runs along the horizontal side of color dot CD_1_6. Color dot 1_7 has a triangular shape with a vertical side, an upper diagonal side, and a lower diagonal side. Diagonal amplifying portion DAP_2_5 of extra-planar fringe field amplifier EPFFA_1_2 runs along the upper diagonal side of color dot CD_1_7, and diagonal amplifying portion DAP_2_6 of extra-planar fringe field amplifier EPFFA_1_2 runs along the lower diagonal side of color dot CD_1_7. Color dot CD_1_8 has a trapezoidal shape with a vertical side, an upper diagonal side, a lower diagonal side, and a horizontal side. Horizontal amplifying portion HAP_2_2 of extra-planar fringe field amplifier EPFFA_1_2 runs along the horizontal side of color dot CD_1_8, diagonal amplifying portion DAP_2_6 of extra-planar fringe field amplifier EPFFA_1_2 runs along the upper diagonal side of color dot CD_1_8, and diagonal amplifying portion DAP_2_7 of extra-planar fringe field amplifier EPFFA_1_2 runs along the lower diagonal side of color dot CD_1_7.

Color dot CD_1_9 has a trapezoidal shape with a vertical side, an upper diagonal side, a lower diagonal side, and a horizontal side. Diagonal amplifying portion DAP_2_7 of extra-planar fringe field amplifier EPFFA_1_2 runs along the upper diagonal side of color dot CD_1_9, diagonal amplifying portion DAP_2_8 of extra-planar fringe field amplifier EPFFA_1_2 runs along the lower diagonal side of color dot CD_1_9, and horizontal amplifying portion HAP_2_3 of extra-planar fringe field amplifier EPFFA_1_2 runs along the horizontal side of color dot CD_1_9. Color dot 1_10 has a triangular shape with a vertical side, an upper diagonal side, and a lower diagonal side. Diagonal amplifying portion DAP_2_8 of extra-planar fringe field amplifier EPFFA_1_2 runs along the upper diagonal side of color dot CD_1_10, and diagonal amplifying portion DAP_2_9 of extra-planar fringe field amplifier EPFFA_1_2 runs along the lower diagonal side of color dot CD_1_10. Color dot CD_1_11 has a parallelogram shape with an upper horizontal side, a lower horizontal, a left diagonal side, and a right diagonal side. Horizontal amplifying portion HAP_2_3 of extra-planar fringe field amplifier EPFFA_1_2 runs along the upper horizontal side of color dot CD_1_11, diagonal amplifying portion DAP_2_9 of extra-planar fringe field amplifier EPFFA_1_2 runs along the right diagonal side of color dot CD_1_11, and diagonal amplifying portion DAP_2_10 of extra-planar fringe field amplifier EPFFA_1_2 runs along the left diagonal side of color dot CD_1_11. Color dot CD_1_12 has a triangular shape with a horizontal side, a vertical side and a diagonal side. Diagonal amplifying portion DAP_2_10 of extra-planar fringe field amplifier EPFFA_1_2 runs along the diagonal side of color dot CD_1_12.

In pixel design 610, switching element SE_1 is located below color component CC_1. Switching element SE_1 is coupled to the electrodes of the color dots of color component CC_1 to control the voltage polarity and voltage magnitude of color dots CD_1_1, CD_1_2, CD_1_3, CD_1_4, CD_1_5, CD_1_6, CD_1_7, CD_1_8, CD_1_9, CD_1_10, CD_1_11, and CD_1_12. Specifically, for pixel design 610, switching element SE_1 is coupled to color component CC_1 using two vias V11 and V12 for better power distribution.

Similarly, second color component CC_2 of pixel design 610 has twelve color dots CD_2_1, CD_2_2, CD_2_3, CD_2_4, CD_2_5, CD_2_6, CD_2_7, CD_2_8, CD_2_9, CD_2_10, CD_2_11, and CD_2_12, which are arranged in the same manner as the color dots of color component CC_1. Extra-planar fringe field amplifiers EPFFA_2_1 and EPFFA_2_2 are used with color component CC_2 in the same manner as described above for extra-planar fringe field amplifiers EPFFA_1_1 and EPFFA_1_2 with color component CC_1. A switching element SE_2 within a device component area DCA_2, which is located below color component CC_2, is coupled to color component CC_2 using vias V21 and V22. Second color component CC_2 is vertically aligned with first color component CC_1 and separated from color component CC_1 by horizontal color component spacing HCCS1, thus color components CC_1 and CC_2 are horizontally offset by a horizontal color component offset HCCO1.

Furthermore, color component CC_3 of pixel design 610 has twelve color dots CD_3_1, CD_3_2, CD_3_3, CD_3_4, CD_3_5, CD_3_6, CD_3_7, CD_3_8, CD_3_9, CD_3_10, CD_3_11, and CD_3_12, which are arranged in the same manner as the color dots of color component CC_1. Extra-planar fringe field amplifiers EPFFA_3_1 and EPFFA_3_2 are used with color component CC_3 in the same manner as described above for extra-planar fringe field amplifiers EPFFA_1_1 and EPFFA_1_2 with color component CC_1. A switching element SE_3 within a device component area DCA_3, which is located below color component CC_2, is coupled to color component CC_3 using vias V31 and V32. Third color component CC_3 is vertically aligned with second color component CC_2 and separated from color component CC_2 by horizontal color component spacing HCCS1, thus color components CC_3 and CC_2 are horizontally offset by a horizontal color component offset HCCO1.

Although it appears from FIGS. 6(a) and 6(b) that the color dots are touching the extra-planar fringe field amplifiers, the extra-planar fringe field amplifiers actually lie in a different plane in the same manner as the extra-planar fringe field amplifiers in pixel design 510 (FIGS. 5(a)-5(d)).

Therefore, in the same manner as described above with respect to pixel design 510, diagonal amplifying portion DAP_1_1 of extra-planar fringe field amplifier EPFFA_1_1 can be described as diagonally adjacent to color dot CD_1_1 and diagonally adjacent to color dot CD_1_2 but on a different plane relative to color dots CD_1_1 and CD_1_2. Diagonal amplifying portion DAP_2_1 of extra-planar fringe field amplifier EPFFA_1_2 can also be described as diagonally in between color dots CD_1_2 and CD_1_3 but on a lower plane relative to color dots CD_1_2 and CD_1_3. Similarly, diagonal amplifying portions DAP_2_2, DAP_2_3, DAP_2_4, DAP_2_5, DAP_2_6, DAP_2_7, DAP_2_8, DAP_2_9, and DAP_2_10 of extra-planar fringe field amplifiers EPFFA_1_2 are diagonally in between color dots CD_1_3 and CD_1_4, color dots, CD_1_4 and CD_1_5, color dots CD_1_5 and CD_1_6, color dots CD_1_6 and CD_1_7, color dots CD_1_7 and CD_1_8, color dots CD_1_8 and CD_1_9, color dots CD_1_9 and CD_1_10, color dots CD_1_10 and CD_1_11, and color dots CD_1_11 and CD_1_12, respectively, and on a different plane than the color dots. Similarly, horizontal amplifying portions HAP_2_1, HAP_2_2, and HAP_2_3 are horizontally in between color dots CD_1_3 and CD_1_5, color dots CD_1_6 and CD_1_8, and color dots CD_1_9 and CD_1_11, respectively, and on a different plane than the color dots.

Pixel design 610 is designed so that the extra-planar fringe field amplifiers can receive polarity from an adjacent pixel. Specifically, a first conductor is coupled to each extra-planar fringe field amplifier to receive polarity from the pixel above the current pixel and a second conductor for each extra-planar fringe field amplifier is coupled to the switching element to provide polarity to each extra-planar fringe field amplifier of the pixel below the current pixel. Specifically, conductor 611, which is coupled to extra-planar fringe field amplifier EPFFA_1_1, extends upward to connect to the equivalent conductor of conductor 631 of a pixel above the current pixel to receive polarity. Conductor 631, which is coupled to switching element SE_1, extends downward to connect to the equivalent conductor of conductor 611 in the pixel below the current pixel. Conductors 612 and 632 serve the same purpose for extra-planar fringe field amplifier EPFFA_1_2. Similarly, conductors 613 and 633 serve the same purpose for extra-planar fringe field amplifier EPFFA_2_1; conductors 614 and 634 serve the same purpose for extra-planar fringe field amplifier EPFFA_2_2; conductors 615 and 635 serve the same purpose for extra-planar fringe field amplifier EPFFA_3_1; and conductors 616 and 636 serve the same purpose for extra-planar fringe field amplifier EPFFA_3_2.

The polarities of the color dots, the extra-planar fringe field amplifiers, and switching elements are shown using "+" and "−" signs. Thus, in FIG. 6(a), which shows the positive dot polarity pattern of pixel design 610+, switching elements SE_1 and SE_3; color dots CD_1_1, CD_1_2, CD_1_3, CD_1_4, CD_1_5, CD_1_6, CD_1_7, CD_1_8, CD_1_9, CD_1_10, CD_1_11, CD_1_12, CD_3_1, CD_3_2, CD_3_3, CD_3_4, CD_3_5, CD_3_6, CD_3_7, CD_3_8, CD_3_9, CD_3_10, CD_3_11, and CD_3_12; and extra-planar fringe field amplifiers EPFFA_2_1 and EPFFA_2_2 have positive polarity. However, switching element SE_2; color dots CD_2_1, CD_2_2, CD_2_3, CD_2_4, CD_2_5, CD_2_6, CD_2_7, CD_2_8, CD_2_9, CD_2_10, CD_2_11, CD_2_12; and extra-planar fringe field amplifiers EPFFA_1_1, EPFAA_1_2, EPFFA_3_1, and EPFFA_3_2 have negative polarity.

FIG. 6(b) shows pixel design 610 with the negative dot polarity pattern. For the negative dot polarity pattern, switching elements SE_1 and SE_3; color dots CD_1_1, CD_1_2, CD_1_3, CD_1_4, CD_1_5, CD_1_6, CD_1_7, CD_1_8, CD_1_9, CD_1_10, CD_1_11, CD_1_12, CD_3_1, CD_3_2, CD_3_3, CD_3_4, CD_3_5, CD_3_6, CD_3_7, CD_3_8, CD_3_9, CD_3_10, CD_3_11, and CD_3_12; and extra-planar fringe field amplifiers EPFFA_2_1 and EPFFA_2_2 have negative polarity. However, switching element SE_2; color dots CD_2_1, CD_2_2, CD_2_3, CD_2_4, CD_2_5, CD_2_6, CD_2_7, CD_2_8, CD_2_9, CD_2_10, CD_2_11, CD_2_12; and extra-planar fringe field amplifiers EPFFA_1_1, EPFAA_1_2, EPFFA_3_1, and EPFFA_3_2 have positive polarity.

As explained above fringe fields in each of the color dots are amplified if adjacent components have opposite polarities. Pixel design 610 makes use of the extra-planar fringe field amplifiers to enhance and stabilize the formation of multiple domains in the liquid crystal structure. In general, the polarities of the polarized components are assigned so that a color dot of a first polarity has neighboring polarized components of the second polarity. For example for the positive dot polarity pattern of pixel design 610 (FIG. 6(a)), color dot CD_1_3 has positive polarity. However the neighboring polarized components (horizontal amplifying portion HAP_2_1, diagonal amplifying portions DAP_2_1, and diagonal amplifying portion DAP_2_2 of extra-planar fringe field amplifier EPFFA_1_2) have negative polarity. Thus, the fringe field of color dot CD_1_3 is amplified. However as explained above, some embodiments of the present invention may use neutral polarity for the extra-planar fringe field amplifying portions.

Figure 6D:
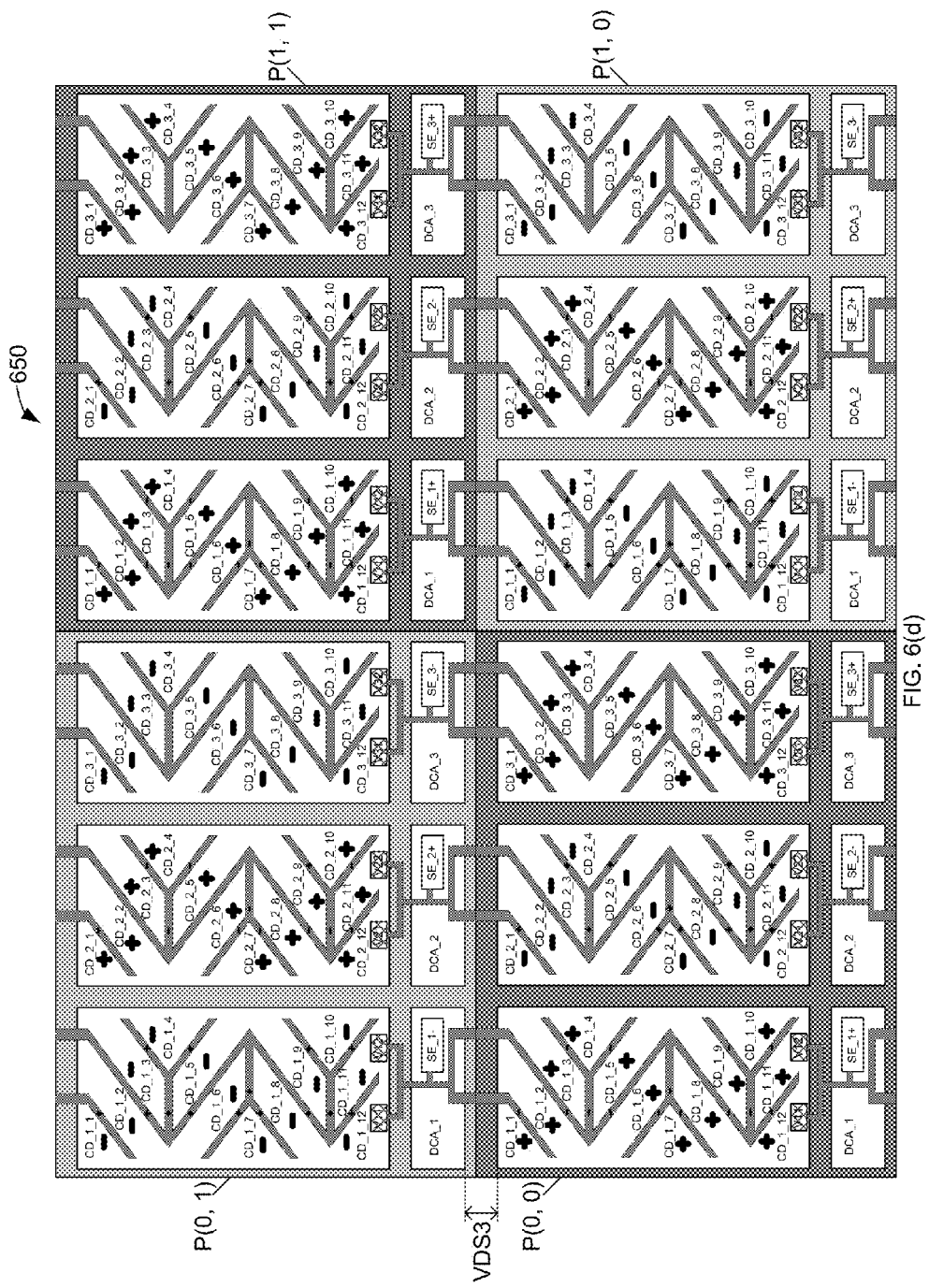

Pixels using pixel design 610 of FIGS. 6(a) and 6(b) can be used in displays using switching element point inversion driving schemes. FIG. 6(d) shows a portion of display 650 using pixels P(0, 0), P(1, 0), P(0, 1), and P(1, 1) of pixel design 610 with a switching element point inversion driving scheme. Display 650 could have thousands of rows with thousand of pixels on each row. The rows and columns would continue from the portion shown in FIG. 6(d) in the manner shown in FIG. 6(d). For clarity, the gate lines and source lines that control the switching elements are omitted in FIG. 6(d). To better illustrate each pixel, the area of each pixel is shaded; this shading is only for illustrative purposes in FIG. 6(d) and has no functional significance. In display 650 the pixels are arranged so that pixels in a row alternate dot polarity patterns (positive or negative) and pixels in a column also alternate between positive and negative dot polarity pattern. Thus, pixels P(0, 1) and P(1, 0) have positive dot polarity pattern and pixels P(0, 0) and P(1, 1) have the negative dot polarity pattern. However, at the next frame the pixels will switch dot polarity patterns. Thus in general a pixel P(x, y) has a first dot polarity pattern when x+y is even and a second dot polarity pattern when x+y is odd. Pixels on each row of pixels are vertically aligned and separated horizontally so that the right most color dots of a pixel are separated from the leftmost color dot of an adjacent pixel by a horizontal dot spacing HDS3. Pixels on a column of pixels are horizontally aligned and separated by a vertical dot spacing VDS3.

As stated above, the extra-planar fringe field amplifiers receive polarity from the switching elements of a second pixel. For example, the electrode of extra-planar fringe field amplifier EPFFA_1_2 of pixel P(0, 0) is coupled to switching elements SE_1 of pixel P(0, 1) via conductor 612 of pixel P(0, 0) and conductor 632 of pixel P(0, 1). Similarly, the electrode of extra-planar fringe field amplifier EPFFA_3_1 of pixel P(0, 0) is coupled to switching elements SE_3 of pixel P(0, 1) via conductor 615 of pixel P(0, 0) and conductor 635 of pixel P(0, 1). Furthermore, as explained above, the polarity of polarized components adjacent to a color dot having a first polarity would have a second polarity.

In a particular embodiment of the present invention, each color component has a width of 140 micrometers and a height of 420 micrometers. The various portions of the extra-planar fringe field amplifier have extra-planar fringe field amplifier width of 4 micrometers. The diagonal amplifying portions are placed at an angle of 45 degrees from the horizontal position, horizontal color component spacing HCCS1 is 4 micrometers, and amplifier depth spacing ADS is 0.45 micrometers.

Figure 6E:
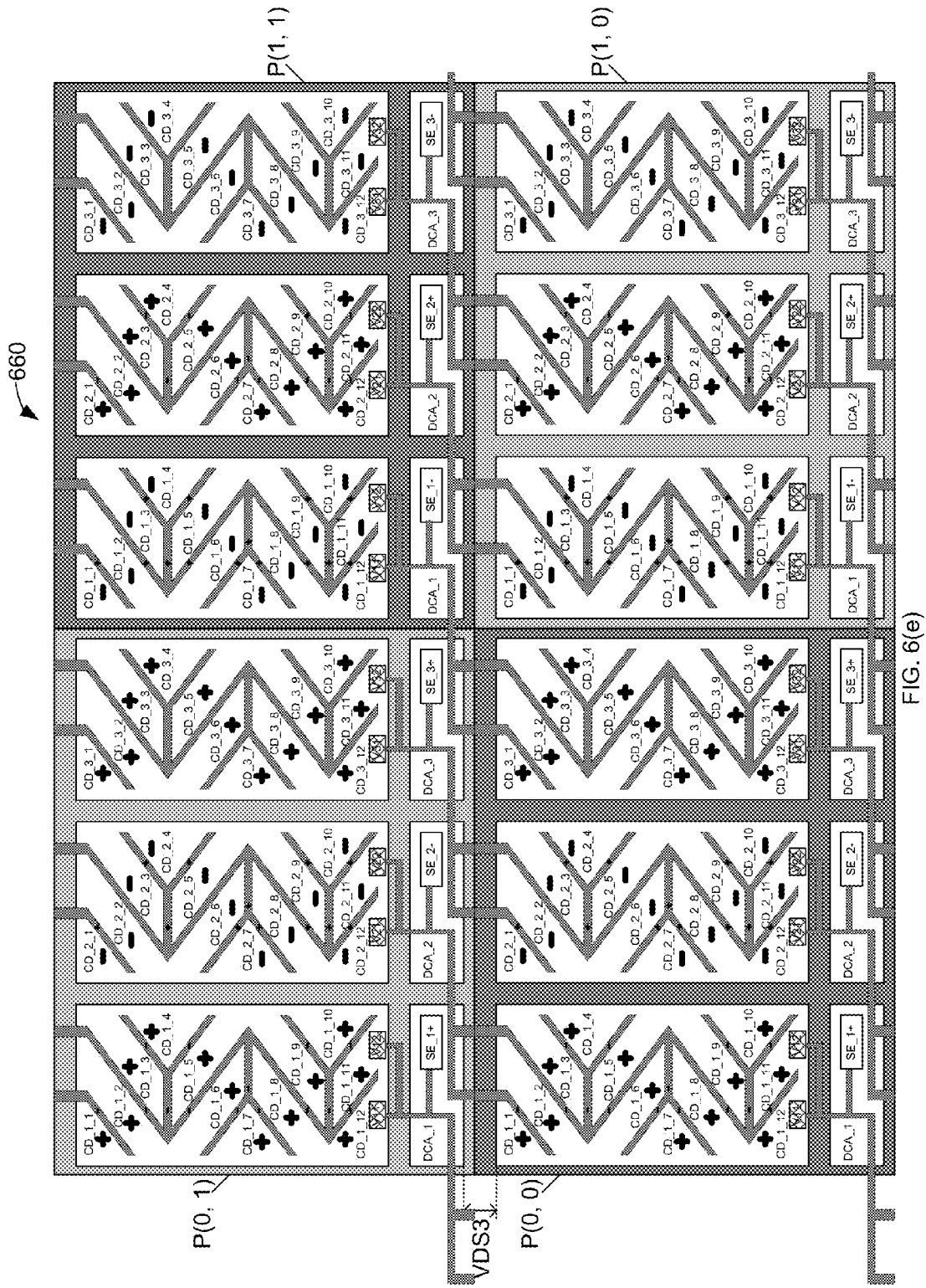

Pixels using pixel design 610 of FIGS. 6(a) and 6(b) can be used in displays using switching element column inversion driving schemes. FIG. 6(e) shows a portion of display 660 using pixels P(0, 0), P(1, 0), P(0, 1), and P(1, 1) of pixel design 610 with a switching element column inversion driving scheme. Display 660 could have thousands of rows with thousand of pixels on each row. The rows and columns would continue from the portion shown in FIG. 6(e) in the manner shown in FIG. 6(e). For clarity, the gate lines and source lines that control the switching elements are omitted in FIG. 6(e). To better illustrate each pixel, the area of each pixel is shaded; this shading is only for illustrative purposes in FIG. 6(e) and has no functional significance. In display 660 the pixels are arranged so that pixels in a row alternate dot polarity patterns (positive or negative) and pixels in a column have the same dot polarity pattern. Thus, pixels P(0, 1) and P(0, 0) have positive dot polarity pattern and pixels P(1, 0) and P(1, 1) have the negative dot polarity pattern. However, at the next frame the pixels will switch dot polarity patterns. Thus in general a pixel P(x, y) has a first dot polarity pattern when x is even and a second dot polarity pattern when x is odd. Pixels on each row of pixels are vertically aligned and separated horizontally so that the right most color dots of a pixel are separated from the leftmost color dot of an adjacent pixel by a horizontal dot spacing HDS3. Pixels on a column of pixels are horizontally aligned and separated by a vertical dot spacing VDS3.

As stated above, the extra-planar fringe field amplifiers receive polarity from the switching elements of a second pixel. For example, the electrode of extra-planar fringe field amplifier EPFFA_1_2 of pixel P(0, 0) is coupled to switching elements SE_1 of pixel P(0, 1) via conductor 612 of pixel P(0, 0) and conductor 632 of pixel P(0, 1). Similarly, the electrode of extra-planar fringe field amplifier EPFFA_3_1 of pixel P(0, 0) is coupled to switching elements SE_3 of pixel P(0, 1) via conductor 615 of pixel P(0, 0) and conductor 635 of pixel P(0, 1). Furthermore, as explained above, the polarity of polarized components adjacent to a color dot having a first polarity would have a second polarity.

Figure 7A:
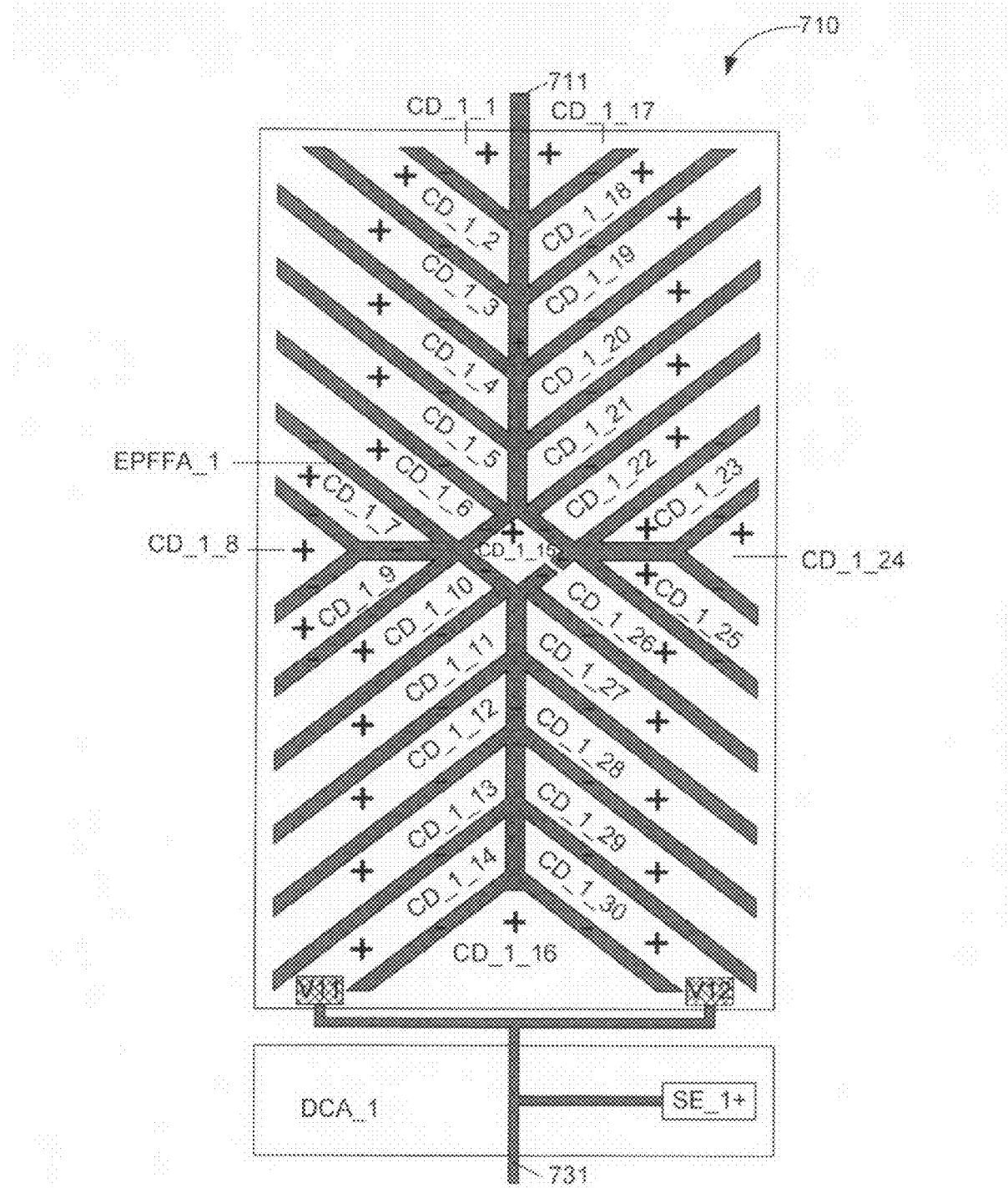
FIGS. 7(a)-7(c) illustrate a pixel design in accordance with one embodiment of the present invention.
Figure 7B:
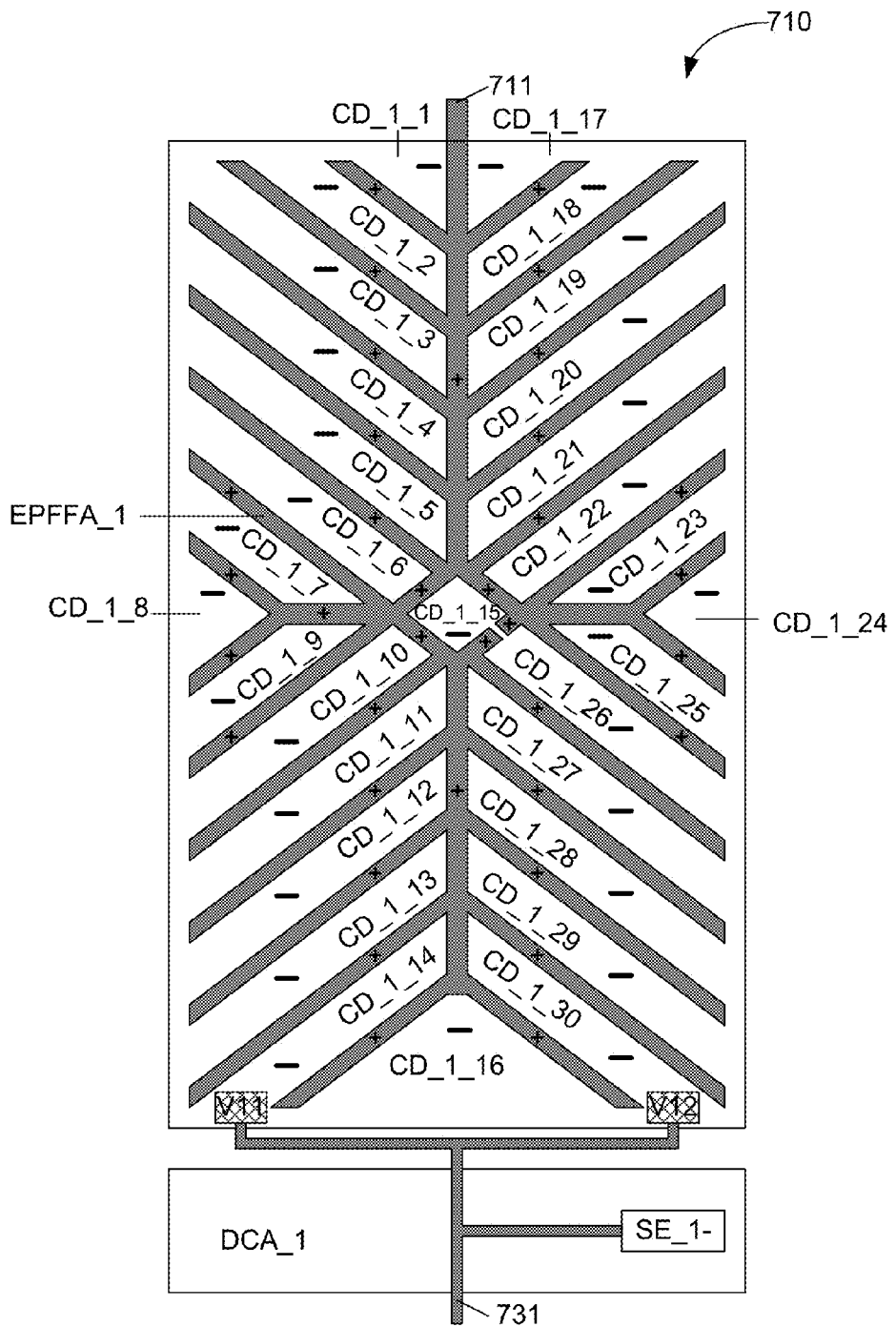

FIGS. 7(a) and 7(b) show different dot polarity patterns of a portion of a pixel design 710 that is often used in displays having a switching element point inversion driving scheme and switching element column inversion driving scheme. Specifically, only the first color component of pixel design 710 is shown due to space constraints. In actual operation a pixel will switch between a first dot polarity pattern and a second dot polarity pattern between each image frame. Specifically, in FIG. 7(a), pixel design 710 has a positive dot polarity pattern (and is thus labeled 710+) and in FIG. 7(b), pixel design 710 has a negative dot polarity pattern (and is thus labeled 710−). Furthermore, the polarity of each polarized component in the various pixel designs are indicated with "+" for positive polarity or "−" for negative polarity.

Pixel design 710 has three color components CC_1, CC_2 and CC_3. However only color component CC_1 is illustrated in FIGS. 7(a) and 7(b) due to space constraints. Color components CC_1, CC_2, and CC_3 have the same physical layout. But may have different polarity as described below. Each of the three color components includes thirty color dots. For clarity, the color dots are referenced as CD_X_Y, where X is a color component and Y is a color dot number. Unlike pixel design 410, the color dots of pixel design 710 do not have a rectangular shape and do not all have the same shape. Specifically, the color dots of pixel design 710 have triangular shapes, trapezoid shapes, parallelogram shape, and other geometrical shapes (see below). Pixel design 710 also includes a switching element for each color component (referenced as SE_1, SE_2, and SE_3, however only SE_1 is shown) and a polarized extra-planar fringe field amplifier for each color component (referenced as EPFFA_I, where I is the color component). Switching elements SE_1, SE_2, and SE_3 are arranged in a row. A device component area is surrounds each switching element SE_1, SE_2, and SE_3. Device component DCA_1 is shown in FIG. 7(a).

First color component CC_1 of pixel design 710 has thirty color dots CD_1_1, CD_1_2, CD_1_3, CD_1_4, CD_1_5, CD_1_6, CD_1_7, CD_1_8, CD_1_9, CD_1_10, CD_1_11, CD_1_12, CD_1_13, CD_1_14, CD_1_15, CD_1_16, CD_1_17, CD_1_18, CD_1_19, CD_1_20, CD_1_21, CD_1_22, CD_1_23, CD_1_24, CD_1_25, CD_1_26, CD_1_27, CD_1_28, CD_1_29, and CD_1_30, which together form a rectangular shape for color component CC_1. In pixel design 710, the color dots are electrically coupled around the edge of color component CC_1. The color dots of color component CC_1 are separated from each other by portions of extra-planar fringe field amplifier EPFFA_1, which is shown in greater detail in FIG. 7(c). The color dots are coupled to a switching element SE_1 using vias V11 and V12. Pixel design 710 also include a conductor 711 and 731 that are used to polarize extra planar fringe field EPFFA_1 as explained below.

Figure 7C:
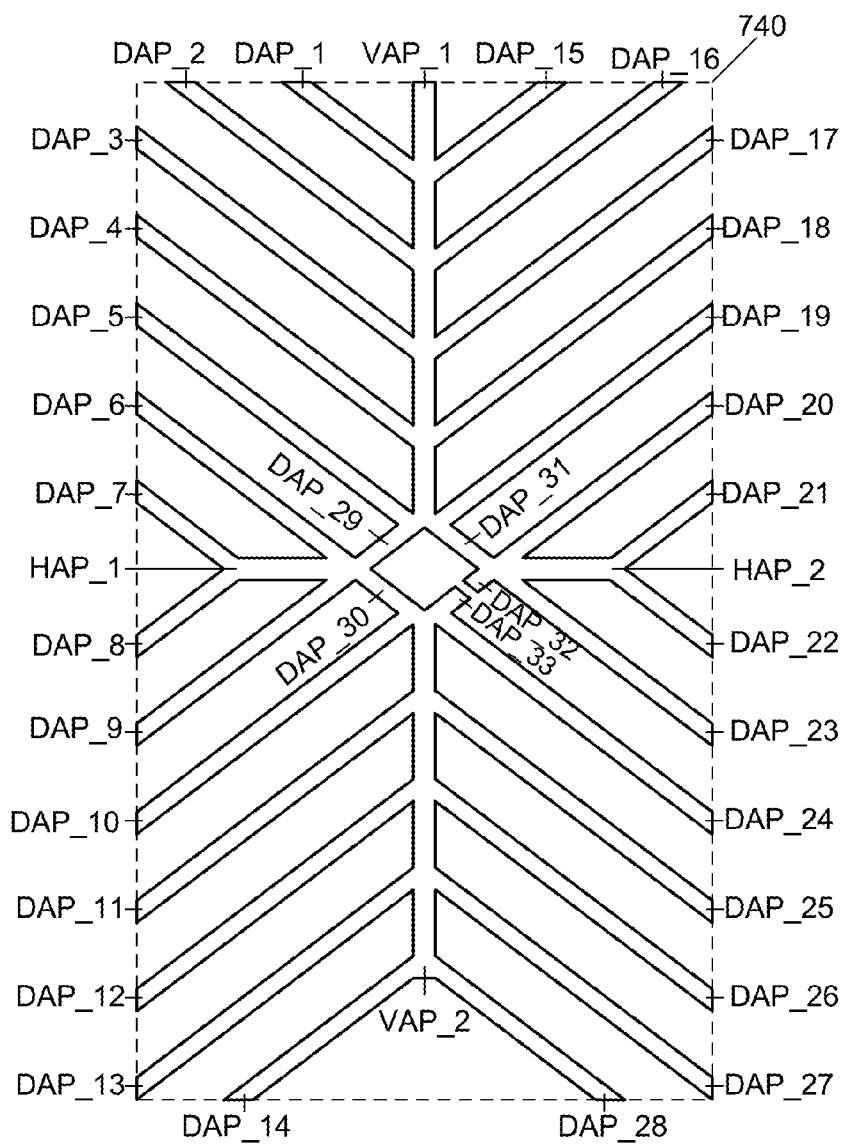

As shown in FIG. 7(c), extra-planar fringe field amplifier EPFFA_1 includes two vertical amplifying portions VAP_1 and VAP_2, two horizontal amplifying portions HAP_1, HAP_2, HAP_3 and thirty-three diagonal amplifying portions DAP_1, DAP_2, DAP_3, DAP_4, DAP_5, DAP_6, DAP_7, DAP_8, DAP_9, DAP_10, DAP_11, DAP_12, DAP_13, DAP_14, DAP_15, DAP_16, DAP_17, DAP_18, DAP_19, DAP_20, DAP_21, DAP_22, DAP_23, DAP_24, DAP_25, DAP_26, DAP_27, DAP_28, DAP_29, DAP_30, DAP_31, DAP_32, and DAP_33. The various amplifying portions of extra-planar fringe field amplifiers EPFFA_1 are bounded by a hypothetical rectangle 740, drawn with dotted lines. In the description that follows, the left side, top, bottom, and right side of rectangle 740 are used for descriptive purposes only.

Vertical amplifying portion VAP_1 begins at the center of the top side of rectangle 740 and extends down to near the center of rectangle 740. Vertical amplifying portion VAP_2, which is horizontally aligned with vertical amplifying portion VAP_1, begins below the center of rectangle 740 and extends downwards towards the center of the bottom side of rectangle 740. Vertical amplifying portions VAP_1 and VAP_2 are coupled by diagonal amplifying portions DAP_29 and DAP_30. Specifically, diagonal amplifying portion DAP_29 begins at the bottom of vertical amplifying portion VAP_1 and extends down and to the left a short distance. Diagonal amplifying portion DAP_30 begins at the lower end of diagonal amplifying portion DAP_29 and extends down and to the right and ends at the top of vertical amplifying portion VAP_2. A diagonal amplifying portion DAP_31 begins at the bottom of vertical amplifying portion VAP_1 and extends down and to the right. Diagonal amplifying portion DAP_31 has the same length as diagonal amplifying portions DAP_29 and DAP_30 and is parallel to diagonal amplifying portion DAP_30. Diagonal amplifying portions DAP_32 begins at the end of diagonal amplifying portion DAP_31 and extends down and to the right for a short distance. A diagonal amplifying portion DAP_33 begins at the top of vertical amplifying portion VAP_2 and extends up and to the right towards the end of diagonal amplifying portion DAP_32 but does not meet the end of diagonal amplifying portion DAP_32. The gap between diagonal amplifying portion DAP_32 and diagonal amplifying portion DAP_33 allows color dot CD_1_15 to be electrically coupled to color dot CD_1_26 (See FIG. 7(a)).

Extra-planar fringe field amplifier also includes a first horizontal amplifying portion HAP_1 and a second horizontal amplifying portion HAP_2. Horizontal amplifying portion HAP_1 begins at the end of diagonal amplifying portion DAP_29 and extends to the left and ends prior to the left side of rectangle 740. Conversely, horizontal amplifying portion HAP_2 begins at the end of diagonal amplifying portion DAP_31 and extends to the right and ends prior to the right side of rectangle 740.

Extra-planar fringe field amplifier also includes a multitude of diagonal amplifying portions that fan out from vertical amplifying portion VAP_1 and VAP_2 and horizontal amplifying portions HAP_1 and HAP_2. Diagonal amplifying portions DAP_1, DAP_2, DAP_3, DAP_4, DAP_5, DAP_15, DAP_16, DAP_17, DAP_18, and DAP_19 begin on vertical amplifying portion VAP_1 and extends to an edge of rectangle 740. For clarity, define a length L_1 that is approximately equal to one-fifth the length of vertical amplifying portion VAP_1. Diagonal amplifying portion DAP_1 begins on vertical amplifying portion VAP_1 about length L_1 from the top side of rectangle 740 and extends up and to the left and ends at the top side of rectangle 740. Diagonal amplifying portion DAP_2 begins on vertical amplifying portion VAP_1 about two times length L_1 from the top side of rectangle 740 and extends up and to the left and ends at the top side of rectangle 740. Diagonal amplifying portion DAP_3 begins on vertical amplifying portion VAP_1 about three times length L_1 from the top side of rectangle 740 and extends up and to the left and ends at the left side of rectangle 740. Diagonal amplifying portion DAP_4 begins on vertical amplifying portion VAP_1 about four times length L_1 from the top side of rectangle 740 and extends up and to the left and ends at the left side of rectangle 740. Diagonal amplifying portion DAP_5 begins at the end of vertical amplifying portion VAP_1 and extends up and to the left and ends at the left side of rectangle 740.

Diagonal amplifying portion DAP_15 begins on vertical amplifying portion VAP_1 about length L_1 from the top side of rectangle 740 and extends up and to the right and ends at the top side of rectangle 740. Diagonal amplifying portion DAP_16 begins on vertical amplifying portion VAP_1 about two times length L_1 from the top side of rectangle 740 and extends up and to the right and ends at the top side of rectangle 740. Diagonal amplifying portion DAP_17 begins on vertical amplifying portion VAP_1 about three times length L_1 from the top side of rectangle 740 and extends up and to the right and ends at the right side of rectangle 740. Diagonal amplifying portion DAP_18 begins on vertical amplifying portion VAP_1 about four times length L_1 from the top side of rectangle 740 and extends up and to the right and ends at the right side of rectangle 740. Diagonal amplifying portion DAP_19 begins at the end of vertical amplifying portion VAP_1 and extends up and to the right and ends at the right side of rectangle 740.

Diagonal amplifying portions DAP_6, DAP_7, DAP_8, and DAP_9 begin on horizontal amplifying portion HAP_1 and extends to an edge of rectangle 740. Specifically, Diagonal amplifying portion DAP_6 begins at the right end of horizontal amplifying portion HAP_1 and extends up and to the left and ends at the left side of rectangle 740. Diagonal amplifying portion DAP_7 begins at the left end of horizontal amplifying portion HAP_1 and extends up and to the left and ends at the left side of rectangle 740. Diagonal amplifying portion DAP_8 begins at the left end of horizontal amplifying portion HAP_1 and extends down and to the left and ends at the left side of rectangle 740. Diagonal amplifying portion DAP_9 begins at the right end of horizontal amplifying portion HAP_1 and extends down and to the left and ends at the left side of rectangle 740.

Diagonal amplifying portions DAP_10, DAP_11, DAP_12, DAP_13, DAP_14, DAP_24, DAP_25, DAP_26, DAP_27, and DAP_28 begin on vertical amplifying portion VAP_2 and extends to an edge of rectangle 740. For clarity define a length L_2 that is approximately one-quarter of the length of vertical amplifying portion VAP_2. Diagonal amplifying portion DAP_10 begins at the top on vertical amplifying portion VAP_2 extends down and to the left and ends at the left side of rectangle 740. Diagonal amplifying portion DAP_11 begins on vertical amplifying portion VAP_2 about length L_2 from the top of vertical amplifying portion VAP_2 and extends down and to the left and ends at the left side of rectangle 740. Diagonal amplifying portion DAP_12 begins at the middle of vertical amplifying portion VAP_2 and extends down and to the left and ends at the left side of rectangle 740. Diagonal amplifying portion DAP_13 begins on vertical amplifying portion VAP_1 about three times length L_2 from the top vertical amplifying portion VAP_2 and extends down and to the left and ends at bottom left corner of rectangle 740. Diagonal amplifying portion DAP_14 begins at the bottom of vertical amplifying portion VAP_2 and extends down and to the left and ends at the bottom side of rectangle 740.

Diagonal amplifying portion DAP_24 begins at the top on vertical amplifying portion VAP_2 extends down and to the right and ends at the right side of rectangle 740. Diagonal amplifying portion DAP_25 begins on vertical amplifying portion VAP_2 about length L_2 from the top of vertical amplifying portion VAP_2 and extends down and to the right and ends at the right side of rectangle 740. Diagonal amplifying portion DAP_26 begins at the middle of vertical amplifying portion VAP_2 and extends down and to the right and ends at the right side of rectangle 740. Diagonal amplifying portion DAP_27 begins on vertical amplifying portion VAP_1 about three times length L_2 from the top vertical amplifying portion VAP_2 and extends down and to the right and ends at bottom right corner of rectangle 740. Diagonal amplifying portion DAP_28 begins at the bottom of vertical amplifying portion VAP_2 and extends down and to the right and ends at the bottom side of rectangle 740.

Diagonal amplifying portions DAP_20, DAP_21, DAP_22, and DAP_23 begin on horizontal amplifying portion HAP_2 and extends to an edge of rectangle 740. Specifically, Diagonal amplifying portion DAP_20 begins at the left end of horizontal amplifying portion HAP_2 and extends up and to the right and ends at the right side of rectangle 740. Diagonal amplifying portion DAP_21 begins at the right end of horizontal amplifying portion HAP_2 and extends up and to the right and ends at the right side of rectangle 740. Diagonal amplifying portion DAP_22 begins at the right end of horizontal amplifying portion HAP_2 and extends down and to the right and ends at the right side of rectangle 740. Diagonal amplifying portion DAP_23 begins at the left end of horizontal amplifying portion HAP_2 and extends down and to the right and ends at the right side of rectangle 740.

The various amplifying portions of extra-planar fringe field amplifiers EPFFA_1 are placed in between or adjacent to the color dots of color component CC_1. However, extra-planar fringe field amplifier EPFFA_1 is on a different plane than the color dots. Color dot CD_1_1 (FIG. 7(a)) has a triangular shape with a horizontal side, a vertical side, and a diagonal side. Color dot CD_1_1 is near the middle of the top side of color component CC_1. Diagonal amplifying portion DAP_1 of extra-planar fringe field amplifier EPFFA_1 runs along the diagonal side of color dot CD_1_1 and a portion of vertical amplifying portion VAP_1 runs along the vertical side of color dot CD_1_1. Color dot CD_1_2 has a trapezoidal shape with a horizontal side, a vertical side, an upper diagonal side, and a lower diagonal side. Diagonal amplifying portion DAP_1 of extra-planar fringe field amplifier EPFFA_1 runs along the upper diagonal side of color dot CD_1_2, diagonal amplifying portion DAP_2 of extra-planar fringe field amplifier EPFFA_1 runs along the lower diagonal side of color dot CD_1_2, and a portion of vertical amplifying portion VAP_1 of extra-planar fringe field amplifier EPFFA_1 runs along the vertical side of color dot CD_1_2. Color dot CD_1_3 has a mostly trapezoidal shape, however color dot CD_1_3 includes the top left corner of color component CC_1 so color dot CD_1_3 is technically a pentagonal shape. Color dot CD_1_3 includes a horizontal side, a left vertical side, a right vertical side, an upper diagonal side, and a lower diagonal side. Diagonal amplifying portion DAP_2 of extra-planar fringe field amplifier EPFFA_1 runs along the upper diagonal side of color dot CD_1_3, diagonal amplifying portion DAP_3 of extra-planar fringe field amplifier EPFFA_1 runs along the lower diagonal side of color dot CD_1_3, and a portion of vertical amplifying portion VAP_1 of extra-planar fringe field amplifier EPFFA_1 runs along the vertical side of color dot CD_1_3. Color dot CD_1_4 has a parallelogram shape with a left vertical side, a right vertical side, an upper diagonal side, and a lower diagonal side. Diagonal amplifying portion DAP_3 of extra-planar fringe field amplifier EPFFA_1 runs along the upper diagonal side of color dot CD_1_4, diagonal amplifying portion DAP_4 of extra-planar fringe field amplifier EPFFA_1 runs along the lower diagonal side of color dot CD_1_4, and a portion of vertical amplifying portion VAP_1 of extra-planar fringe field amplifier EPFFA_1 runs along the right vertical side of color dot CD_1_4. Color dot CD_1_5 has a parallelogram shape with a left vertical side, a right vertical side, an upper diagonal side, and a lower diagonal side. Diagonal amplifying portion DAP_4 of extra-planar fringe field amplifier EPFFA_1 runs along the upper diagonal side of color dot CD_1_5, diagonal amplifying portion DAP_5 of extra-planar fringe field amplifier EPFFA_1 runs along the lower diagonal side of color dot CD_1_5, and a portion of vertical amplifying portion VAP_1 of extra-planar fringe field amplifier EPFFA_1 runs along the right vertical side of color dot CD_1_5.

Color dot CD_1_6 has a quadrilateral shape with a left vertical side, a short diagonal side, an upper long diagonal side, and a lower long diagonal side. Diagonal amplifying portion DAP_5 of extra-planar fringe field amplifier EPFFA_1 runs along the upper long diagonal side of color dot CD_1_6, diagonal amplifying portion DAP_6 of extra-planar fringe field amplifier EPFFA_1 runs along the lower long diagonal side of color dot CD_1_6, and a diagonal amplifying portion DAP_29 of extra-planar fringe field amplifier EPFFA_1 runs along the short diagonal side of color dot CD_1_6. Color dot CD_1_7 has a trapezoid shape with a left vertical side, a horizontal side, an upper diagonal side, and a lower diagonal side. Diagonal amplifying portion DAP_6 of extra-planar fringe field amplifier EPFFA_1 runs along the upper diagonal side of color dot CD_1_7, diagonal amplifying portion DAP_7 of extra-planar fringe field amplifier EPFFA_1 runs along the lower diagonal side of color dot CD_1_7, and a horizontal amplifying portion HAP_1 of extra-planar fringe field amplifier EPFFA_1 runs along the horizontal side of color dot CD_1_7. Color dot CD_1_8 has a triangular shape with a vertical side, an upper diagonal side, and a lower diagonal side. Diagonal amplifying portion DAP_7 of extra-planar fringe field amplifier EPFFA_1 runs along the upper diagonal side of color dot CD_1_8 and diagonal amplifying portion DAP_8 of extra-planar fringe field amplifier EPFFA_1 runs along the lower diagonal side of color dot CD_1_8. Color dot CD_1_9 has a trapezoidal shape with a vertical side, a horizontal side, an upper diagonal side, and a lower diagonal side. Diagonal amplifying portion DAP_8 of extra-planar fringe field amplifier EPFFA_1 runs along the upper diagonal side of color dot CD_1_9, diagonal amplifying portion DAP_9 of extra-planar fringe field amplifier EPFFA_1 runs along the lower diagonal side of color dot CD_1_9, and a horizontal amplifying portion HAP_1 of extra-planar fringe field amplifier EPFFA_1 runs along the horizontal side of color dot CD_1_9. Color dot CD_1_10 has a quadrilateral shape with a vertical side, a short diagonal side, an upper long diagonal side, and a lower long diagonal side. Diagonal amplifying portion DAP_9 of extra-planar fringe field amplifier EPFFA_1 runs along the upper long diagonal side of color dot CD_1_10, diagonal amplifying portion DAP_10 of extra-planar fringe field amplifier EPFFA_1 runs along the lower long diagonal side of color dot CD_1_10, and a diagonal amplifying portion DAP_30 of extra-planar fringe field amplifier EPFFA_1 runs along the short diagonal side of color dot CD_1_10.

Color dot CD_1_11 has a parallelogram shape with a left vertical side, a right vertical side, an upper diagonal side, and a lower diagonal side. Diagonal amplifying portion DAP_10 of extra-planar fringe field amplifier EPFFA_1 runs along the upper diagonal side of color dot CD_1_11, diagonal amplifying portion DAP_11 of extra-planar fringe field amplifier EPFFA_1 runs along the lower diagonal side of color dot CD_1_11, and a portion of vertical amplifying portion VAP_2 of extra-planar fringe field amplifier EPFFA_1 runs along the right vertical side of color dot CD_1_11. Color dot CD_1_12 has a parallelogram shape with a left vertical side, a right vertical side, an upper diagonal side, and a lower diagonal side. Diagonal amplifying portion DAP_11 of extra-planar fringe field amplifier EPFFA_1 runs along the upper diagonal side of color dot CD_1_12, diagonal amplifying portion DAP_12 of extra-planar fringe field amplifier EPFFA_1 runs along the lower diagonal side of color dot CD_1_12, and a portion of vertical amplifying portion VAP_2 of extra-planar fringe field amplifier EPFFA_1 runs along the right vertical side of color dot CD_1_12. Color dot CD_1_13 has a parallelogram shape with a left vertical side, a right vertical side, an upper diagonal side, and a lower diagonal side. Diagonal amplifying portion DAP_12 of extra-planar fringe field amplifier EPFFA_1 runs along the upper diagonal side of color dot CD_1_13, diagonal amplifying portion DAP_13 of extra-planar fringe field amplifier EPFFA_1 runs along the lower diagonal side of color dot CD_1_13, and a portion of vertical amplifying portion VAP_2 of extra-planar fringe field amplifier EPFFA_1 runs along the right vertical side of color dot CD_1_13. Color dot CD_1_14 has a trapezoidal shape with a horizontal side, a vertical side, an upper diagonal side, and a lower diagonal side. Diagonal amplifying portion DAP_13 of extra-planar fringe field amplifier EPFFA_1 runs along the upper diagonal side of color dot CD_1_14, diagonal amplifying portion DAP_14 of extra-planar fringe field amplifier EPFFA_1 runs along the lower diagonal side of color dot CD_1_14, and a portion of vertical amplifying portion VAP_2 of extra-planar fringe field amplifier EPFFA_1 runs along the vertical side of color dot CD_1_14.

Color dot CD_1_15 has a diamond shape with a left upper diagonal side, a right upper diagonal side, a left lower diagonal side, and a right lower diagonal side. Diagonal amplifying portion DAP_29 of extra-planar fringe field amplifier EPFFA_1 runs along the left upper diagonal side of color dot CD_1_15, diagonal amplifying portion DAP_30 of extra-planar fringe field amplifier EPFFA_1 runs along the left lower diagonal side of color dot CD_1_15, diagonal amplifying portion DAP_31 of extra-planar fringe field amplifier EPFFA_1 runs along the right upper diagonal side of color dot CD_1_15, and diagonal amplifying portions DAP_32 and DAP_33 of extra-planar fringe field amplifier EPFFA_1 runs along the right lower diagonal side of color dot CD_1_15. Color dot CD_1_16 has a triangular shape with a vertical side, a left diagonal side, and a right diagonal side. Diagonal amplifying portion DAP_14 of extra-planar fringe field amplifier EPFFA_1 runs along the left diagonal side of color dot CD_1_16, and diagonal amplifying portion DAP_28 of extra-planar fringe field amplifier EPFFA_1 runs along the right diagonal side of color dot CD_1_16.

Color dot CD_1_17 has a triangular shape with a horizontal side, a vertical side, and a diagonal side. Color dot CD_1_17 is near the middle of the top side of color component CC_1. Diagonal amplifying portion DAP_15 of extra-planar fringe field amplifier EPFFA_1 runs along the diagonal side of color dot CD_1_17 and a portion of vertical amplifying portion VAP_1 runs along the vertical side of color dot CD_1_17. Color dot CD_1_18 has a trapezoidal shape with a horizontal side, a vertical side, an upper diagonal side, and a lower diagonal side. Diagonal amplifying portion DAP_15 of extra-planar fringe field amplifier EPFFA_1 runs along the upper diagonal side of color dot CD_1_18, diagonal amplifying portion DAP_16 of extra-planar fringe field amplifier EPFFA_1 runs along the lower diagonal side of color dot CD_1_18, and a portion of vertical amplifying portion VAP_1 of extra-planar fringe field amplifier EPFFA_1 runs along the vertical side of color dot CD_1_18. Color dot CD_1_19 has a mostly trapezoidal shape, however color dot CD_1_19 includes the top right corner of color component CC_1 so color dot CD_1_19 is technically a pentagonal shape. Color dot CD_1_19 includes a horizontal side, a right vertical side, a left vertical side, an upper diagonal side, and a lower diagonal side. Diagonal amplifying portion DAP_16 of extra-planar fringe field amplifier EPFFA_1 runs along the upper diagonal side of color dot CD_1_19, diagonal amplifying portion DAP_17 of extra-planar fringe field amplifier EPFFA_1 runs along the lower diagonal side of color dot CD_1_19, and a portion of vertical amplifying portion VAP_1 of extra-planar fringe field amplifier EPFFA_1 runs along the vertical side of color dot CD_1_19. Color dot CD_1_20 has a parallelogram shape with a left vertical side, a right vertical side, an upper diagonal side, and a lower diagonal side. Diagonal amplifying portion DAP_17 of extra-planar fringe field amplifier EPFFA_1 runs along the upper diagonal side of color dot CD_1_20, diagonal amplifying portion DAP_18 of extra-planar fringe field amplifier EPFFA_1 runs along the lower diagonal side of color dot CD_1_20, and a portion of vertical amplifying portion VAP_1 of extra-planar fringe field amplifier EPFFA_1 runs along the left vertical side of color dot CD_1_20. Color dot CD_1_21 has a parallelogram shape with a left vertical side, a right vertical side, an upper diagonal side, and a lower diagonal side. Diagonal amplifying portion DAP_18 of extra-planar fringe field amplifier EPFFA_1 runs along the upper diagonal side of color dot CD_1_21, diagonal amplifying portion DAP_19 of extra-planar fringe field amplifier EPFFA_1 runs along the lower diagonal side of color dot CD_1_21, and a portion of vertical amplifying portion VAP_1 of extra-planar fringe field amplifier EPFFA_1 runs along the left vertical side of color dot CD_1_21.

Color dot CD_1_22 has a quadrilateral shape with a right vertical side, a short diagonal side, an upper long diagonal side, and a lower long diagonal side. Diagonal amplifying portion DAP_19 of extra-planar fringe field amplifier EPFFA_1 runs along the upper long diagonal side of color dot CD_1_22, diagonal amplifying portion DAP_20 of extra-planar fringe field amplifier EPFFA_1 runs along the lower long diagonal side of color dot CD_1_22, and diagonal amplifying portion DAP_31 of extra-planar fringe field amplifier EPFFA_1 runs along the short diagonal side of color dot CD_1_22. Color dot CD_1_23 has a trapezoid shape with a right vertical side, a horizontal side, an upper diagonal side, and a lower diagonal side. Diagonal amplifying portion DAP_20 of extra-planar fringe field amplifier EPFFA_1 runs along the upper diagonal side of color dot CD_1_23, diagonal amplifying portion DAP_21 of extra-planar fringe field amplifier EPFFA_1 runs along the lower diagonal side of color dot CD_1_23, and horizontal amplifying portion HAP_2 of extra-planar fringe field amplifier EPFFA_1 runs along the horizontal side of color dot CD_1_23. Color dot CD_1_24 has a triangular shape with a vertical side, an upper diagonal side, and a lower diagonal side. Diagonal amplifying portion DAP_21 of extra-planar fringe field amplifier EPFFA_1 runs along the upper diagonal side of color dot CD_1_24 and diagonal amplifying portion DAP_22 of extra-planar fringe field amplifier EPFFA_1 runs along the lower diagonal side of color dot CD_1_24. Color dot CD_1_25 has a trapezoidal shape with a vertical side, a horizontal side, an upper diagonal side, and a lower diagonal side. Diagonal amplifying portion DAP_22 of extra-planar fringe field amplifier EPFFA_1 runs along the upper diagonal side of color dot CD_1_25, diagonal amplifying portion DAP_23 of extra-planar fringe field amplifier EPFFA_1 runs along the lower diagonal side of color dot CD_1_25, and horizontal amplifying portion HAP_2 of extra-planar fringe field amplifier EPFFA_1 runs along the horizontal side of color dot CD_1_25. Color dot CD_1_26 has a quadrilateral shape with a vertical side, a short diagonal side, an upper long diagonal side, and a lower long diagonal side. Diagonal amplifying portion DAP_23 of extra-planar fringe field amplifier EPFFA_1 runs along the upper long diagonal side of color dot CD_1_26, diagonal amplifying portion DAP_24 of extra-planar fringe field amplifier EPFFA_1 runs along the lower long diagonal side of color dot CD_1_26, and a diagonal amplifying portions DAP_32 and DAP_33 of extra-planar fringe field amplifier EPFFA_1 runs along the short diagonal side of color dot CD_1_26.

Color dot CD_1_27 has a parallelogram shape with a left vertical side, a right vertical side, an upper diagonal side, and a lower diagonal side. Diagonal amplifying portion DAP_24 of extra-planar fringe field amplifier EPFFA_1 runs along the upper diagonal side of color dot CD_1_27, diagonal amplifying portion DAP_25 of extra-planar fringe field amplifier EPFFA_1 runs along the lower diagonal side of color dot CD_1_27, and a portion of vertical amplifying portion VAP_2 of extra-planar fringe field amplifier EPFFA_1 runs along the left vertical side of color dot CD_1_27. Color dot CD_1_28 has a parallelogram shape with a left vertical side, a right vertical side, an upper diagonal side, and a lower diagonal side. Diagonal amplifying portion DAP_25 of extra-planar fringe field amplifier EPFFA_1 runs along the upper diagonal side of color dot CD_1_28, diagonal amplifying portion DAP_26 of extra-planar fringe field amplifier EPFFA_1 runs along the lower diagonal side of color dot CD_1_28, and a portion of vertical amplifying portion VAP_2 of extra-planar fringe field amplifier EPFFA_1 runs along the left vertical side of color dot CD_1_28. Color dot CD_1_29 has a parallelogram shape with a left vertical side, a right vertical side, an upper diagonal side, and a lower diagonal side. Diagonal amplifying portion DAP_26 of extra-planar fringe field amplifier EPFFA_1 runs along the upper diagonal side of color dot CD_1_29, diagonal amplifying portion DAP_27 of extra-planar fringe field amplifier EPFFA_1 runs along the lower diagonal side of color dot CD_1_29, and a portion of vertical amplifying portion VAP_2 of extra-planar fringe field amplifier EPFFA_1 runs along the left vertical side of color dot CD_1_29. Color dot CD_1_30 has a trapezoidal shape with a horizontal side, a vertical side, an upper diagonal side, and a lower diagonal side. Diagonal amplifying portion DAP_27 of extra-planar fringe field amplifier EPFFA_1 runs along the upper diagonal side of color dot CD_1_30, diagonal amplifying portion DAP_28 of extra-planar fringe field amplifier EPFFA_1 runs along the lower diagonal side of color dot CD_1_30, and a portion of vertical amplifying portion VAP_2 of extra-planar fringe field amplifier EPFFA_1 runs along the vertical side of color dot CD_1_30.

In pixel design 710, switching element SE_1 is located below color component CC_1. Switching element SE_1 is coupled to the electrodes of the color dots of color component CC_1 to control the voltage polarity and voltage magnitude of color dots CD_1_1, CD_1_2, CD_1_3, CD_1_4, CD_1_5, CD_1_6, CD_1_7, CD_1_8, CD_1_9, CD_1_10, CD_1_11, CD_1_12, CD_1_13, CD_1_14, CD_1_15, CD_1_16, CD_1_17, CD_1_18, CD_1_19, CD_1_20, CD_1_21, CD_1_22, CD_1_23, CD_1_24, CD_1_25, CD_1_26, CD_1_27, CD_1_28, CD_1_29, CD_1_30. Specifically, for pixel design 710, switching element SE_1 is coupled to color component CC_1 using two vias V11 and V12 for better power distribution. Via V11 is located near the bottom left corner of color component CC_1 and Via V12 is located near the bottom right corner of color component Although it appears from FIGS. 7(a) and 7(b) that the color dots are touching the extra-planar fringe field amplifiers, the extra-planar fringe field amplifiers actually lie in a different plane in the same manner as the extra-planar fringe field amplifiers in pixel design 510 (FIGS. 5(a)-5(d)).

Therefore, in the same manner as described above with respect to pixel design 510, diagonal amplifying portion DAP_1 of extra-planar fringe field amplifier EPFFA_1 can be described as diagonally adjacent to color dot CD_1_1 and diagonally adjacent to color dot CD_1_2 but on a different plane relative to color dots CD_1_1 and CD_1_2. Similarly, diagonal amplifying portion DAP_N, is diagonally adjacent to color dots CD_1_N and color dots CD_1_(N+1) but on a different plane relative to the color dots, for N=1 to 13. Similarly, diagonal amplifying portion DAP_M, is diagonally adjacent to color dots CD_1_(M+2) and color dots CD_1_(M+3) but on a different plane relative to the color dots, for N=15 to 27. Diagonal amplifying portion DAP_14 of extra-planar fringe field amplifier EPFFA_1 can be described as diagonally adjacent to color dots CD_1_14 and CD_1_16 but on a different plane relative to color dots CD_1_14 and CD_1_16. Diagonal amplifying portion DAP_28 of extra-planar fringe field amplifier EPFFA_1 can be described as diagonally adjacent to color dots CD_1_30 and CD_1_16 but on a different plane relative to color dots CD_1_30 and CD_1_16. Diagonal amplifying portion DAP_29 of extra-planar fringe field amplifier EPFFA_1 can be described as diagonally adjacent to color dots CD_1_6 and CD_1_15 but on a different plane relative to color dots CD_1_6 and CD_1_15. Diagonal amplifying portion DAP_30 of extra-planar fringe field amplifier EPFFA_1 can be described as diagonally adjacent to color dots CD_1_10 and CD_1_15 but on a different plane relative to color dots CD_1_10 and CD_1_15. Diagonal amplifying portion DAP_31 of extra-planar fringe field amplifier EPFFA_1 can be described as diagonally adjacent to color dots CD_1_22 and CD_1_15 but on a different plane relative to color dots CD_1_22 and CD_1_15. Diagonal amplifying portions DAP_32 and DAP_33 of extra-planar fringe field amplifier EPFFA_1 can be described as diagonally adjacent to color dots CD_1_26 and CD_1_15 but on a different plane relative to color dots CD_1_26 and CD_1_15. The diagonal amplifying portion can also be described as being diagonally in between the color dots. For example, diagonal amplifying portion DAP_1 is diagonally in between color dot CD_1_1 and CD_1_2.

Horizontal amplifying portion HAP_1 of extra-planar fringe field amplifier EPFFA_1 is vertically adjacent to color dots CD_1_7 and CD_1_9 and also vertically in between color dots CD_1_7 and CD_1_9. That is one color dot (CD_1_7) is above horizontal amplifying portion HAP_1 and the other color dot (CD_1_9) is below horizontal amplifying portion HAP_1. However, horizontal amplifying portion HAP_1 of extra-planar fringe field amplifier EPFFA_1 is on a different plane than the color dots. Similarly, Horizontal amplifying portion HAP_2 of extra-planar fringe field amplifier EPFFA_1 is vertically adjacent to color dots CD_1_7 and CD_1_9 and also vertically in between color dots CD_1_23 and CD_1_25. That is one color dot (CD_1_23) is above horizontal amplifying portion HAP_2 and the other color dot (CD_1_25) is below horizontal amplifying portion HAP_2. However, horizontal amplifying portion HAP_2 of extra-planar fringe field amplifier EPFFA_1 is on a different plane than the color dots.

Portions of vertical amplifying portion VAP_1 of extra-planar fringe field amplifier EPFFA_1 are horizontally adjacent to and horizontally in between color dots CD_1_1 and CD_1_17, color dots CD_1_2 and CD_1_18, color dots CD_1_3 and CD_1_19, color dots CD_1_4 and CD_20, color dots CD_1_5 and CD_1_21. However, vertically amplifying portion VAP_1 of extra-planar fringe field amplifier EPFFA_1 is on a different plane than the color dots. Similarly, portions of vertical amplifying portion VAP_2 of extra-planar fringe field amplifier EPFFA_1 are horizontally adjacent to and horizontally in between color dots CD_1_11 and CD_1_27, color dots CD_1_12 and CD_1_28, color dots CD_1_13 and CD_1_29, color dots CD_1_14 and CD_1_30. However, vertically amplifying portion VAP_2 of extra-planar fringe field amplifier EPFFA_1 is on a different plane than the color dots.

Pixel design 710 also includes a second color component CC_2 and a third color component CC_3, which are not shown in FIG. 7(a) due to space constraints. However color component CC_2 and color component CC_3 have the same physical layout as color component CC_1. Accordingly, color components CC_2 and CC_3, each have 30 color dots and an extra-planar fringe field amplifier arranged in the manner described above with respect to color component CC_1. Furthermore, pixel design 710 also includes a second switching element SE_2 and a third switching element SE_3. Switching element SE_2 is coupled to the color dots of color component CC_2 using two vias (V21 and V22) in the same manner as switching element SE_1 is coupled to the color dots of color component CC_1. Similarly, switching element SE_3 is coupled to the color dots of color component CC_3 using two vias (V31 and V32) in the same manner as switching element SE_1 is coupled to the color dots of color component CC_1. Second color component CC_2 is vertically aligned with color component CC_1 and separated from color component CC_1 by a horizontal color component spacing HCCS1. Similarly, color component CC_3 is vertically aligned with color component CC_1 and color component CC_2. Color component CC_3 is separated from color component CC_2 by horizontal color component spacing HCCS1.

Pixel design 710 is designed so that the extra-planar fringe field amplifiers can receive polarity from an adjacent pixel. Specifically, a first conductor is coupled to each extra-planar fringe field amplifier to receive polarity from the pixel above the current pixel and a second conductor for each extra-planar fringe field amplifier is coupled to the switching element to provide polarity to each extra-planar fringe field amplifier of the pixel below the current pixel. Specifically, conductor 711, which is coupled to extra-planar fringe field amplifier EPFFA_1_1, extends upward to connect to the equivalent conductor of conductor 731 of a pixel above the current pixel to receive polarity. Conductor 731, which is coupled to switching element SE_1, extends downward to connect to the equivalent conductor of conductor 711 in the pixel below the current pixel. Similar conductors are used for extra-planar fringe field amplifiers in color components CC_2 and CC_3.

The polarities of the color dots, the extra-planar fringe field amplifiers, and switching elements are shown using "+" and "−" signs. Thus, in FIG. 7(a), which shows the positive dot polarity pattern of pixel design 710+, switching elements SE_1 and SE_3 (not shown); The color dots of color component CC_1 (i.e. CD_1_1, CD_1_2, CD_1_3, CD_1_4, CD_1_5, CD_1_6, CD_1_7, CD_1_8, CD_1_9, CD_1_10, CD_1_11, CD_1_12, CD_1_13, CD_1_14, CD_1_15, CD_1_16, CD_1_17, CD_1_18, CD_1_19, CD_1_20, CD_1_21, CD_1_22, CD_1_23, CD_1_24, CD_1_25, CD_1_26, CD_1_27, CD_1_28, CD_1_29, CD_1_30) and color component CC_3 (not shown), and extra-planar fringe field amplifiers EPFFA_2 of color component CC_2 (not shown) have positive polarity. However, switching element SE_2 (not shown); color dots of color component CC_2 (not shown), extra-planar fringe field amplifiers EPFFA_1 of color component CC_1 and extra-planar fringe field amplifiers EPFFA_3 of color component CC_3 (not shown) have negative polarity.

FIG. 7(b) shows pixel design 710 with the negative dot polarity pattern. For the negative dot polarity pattern, switching elements SE_1 and SE_3 (not shown); The color dots of color component CC_1 (i.e. CD_1_1, CD_1_2, CD_1_3, CD_1_4, CD_1_5, CD_1_6, CD_1_7, CD_1_8, CD_1_9, CD_1_10, CD_1_11, CD_1_12, CD_1_13, CD_1_14, CD_1_15, CD_1_16, CD_1_17, CD_1_18, CD_1_19, CD_1_20, CD_1_21, CD_1_22, CD_1_23, CD_1_24, CD_1_25, CD_1_26, CD_1_27, CD_1_28, CD_1_29, CD_1_30) and color component CC_3 (not shown), and extra-planar fringe field amplifiers EPFFA_2 of color component CC_2 (not shown) have negative polarity. However, switching element SE_2 (not shown); color dots of color component CC_2 (not shown), extra-planar fringe field amplifiers EPFFA_1 of color component CC_1 and extra-planar fringe field amplifiers EPFFA_3 of color component CC_3 (not shown) have positive polarity.

As explained above fringe fields in each of the color dots are amplified if adjacent components have opposite polarities. Pixel design 710 makes use of the extra-planar fringe field amplifiers to enhance and stabilize the formation of multiple domains in the liquid crystal structure. In general, the polarities of the polarized components are assigned so that a color dot of a first polarity has neighboring polarized components of the second polarity. For example for the positive dot polarity pattern of pixel design 710 (FIG. 7(a)), color dot CD_1_3 has positive polarity. However the neighboring polarized components (vertical amplifying portion VAP_1, diagonal amplifying portions DAP_2, and diagonal amplifying portion DAP_3 of extra-planar fringe field amplifier EPFFA_1) have negative polarity. Thus, the fringe field of color dot CD_1_3 is amplified. However as explained above, some embodiments of the present invention may use neutral polarity on the extra-planar fringe field amplifiers to achieve some degree of amplification of the fringe fields of the color dots.

Pixels using pixel design 710 of FIGS. 7(a) and 7(b) can be used in displays using switching element point inversion driving schemes. In a display using pixel design 710 and a switching element point inversion driving scheme, the pixels are arranged so that pixels in a row alternate dot polarity patterns (positive or negative) and pixels in a column also alternate between positive and negative dot polarity pattern. Thus in general a pixel P(x, y) has a first dot polarity pattern when x+y is even and a second dot polarity pattern when x+y is odd. Thus, the display would have a similar layout to display 550 or 650 but using pixel design 710 instead of 510 and 610, respectively.

Pixels using pixel design 710 of FIGS. 7(a) and 7(b) can also be used in displays using switching element column inversion driving schemes. In a display using pixel design 710 and a switching element column inversion driving scheme, the pixels are arranged so that pixels in a row alternate dot polarity patterns (positive or negative) and pixels in a column also have the same dot polarity pattern. Thus in general a pixel P(x, y) has a first dot polarity pattern when x is even and a second dot polarity pattern when x is odd. Thus, the display would have a similar layout to display 560 or 660 but using pixel design 710 instead of 510 and 610, respectively.

In a particular embodiment of the present invention, each color component has a width of 140 micrometers and a height of 420 micrometers. The various portions of the extra-planar fringe field amplifier have extra-planar fringe field amplifier width of 4 micrometers. The diagonal amplifying portions are placed at an angle of 45 degrees from the horizontal position, horizontal color component spacing HCCS1 is 30 micrometers, and amplifier depth spacing ADS is 0.45 micrometers.

Figure 8A:
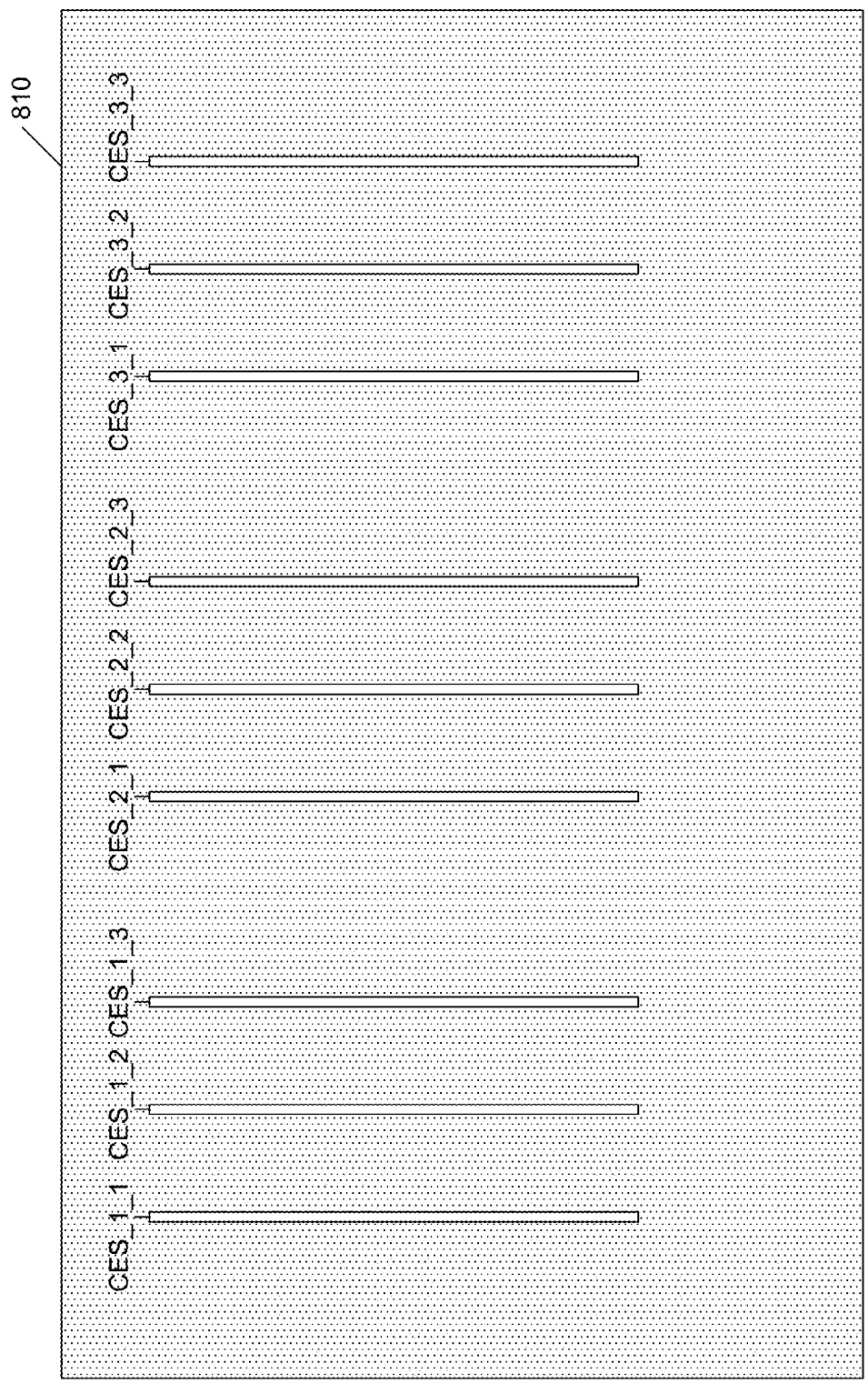
FIGS. 8(a)-8(c) illustrate a pixel design in accordance with one embodiment of the present invention.

The performance of pixel designs 410, 510, 610, and 710 can be further enhanced using a sliced common electrode. As explained above with respect to FIG. 3(a)-3(b), each color component electrode has a corresponding common electrode on the common electrode substrate. In most embodiments of the present invention, the common electrode is approximately the size of the display is shared by all pixels. However in some embodiments, each pixel or even each color component can have a corresponding common electrode. In accordance with some embodiments of the present invention, the common electrode is sliced in the area above color dots to further enhance the fringe fields which would provide better multi-domain performance. FIGS. 8(a)-8(d) illustrate a sliced common electrode on the common electrode substrate in a pixel design 810-SCE. The components of pixel design 810-SCE on the switching element substrate are identical to pixel design 410 as illustrated in FIGS. 4(a)-4(d). Specifically, FIG. 8(a) shows the area a portion of a common electrode 810 for pixel design 810-SCE. Common electrode 810 includes nine common electrode slices CES_1_1, CES_1_2, CES_1_3, CES_2_1, CES_2_2, CES_2_3, CES_3_1, CES_3_2, and CES_3_3. For clarity common electrode 810 is drawn with a slight shading and the common electrode slices are drawn with no shading because the common electrode slices are areas where common electrode 810 are "sliced out". Generally, common electrode slices are formed using conventional photoresist patterning and etching techniques.

Figure 8B:
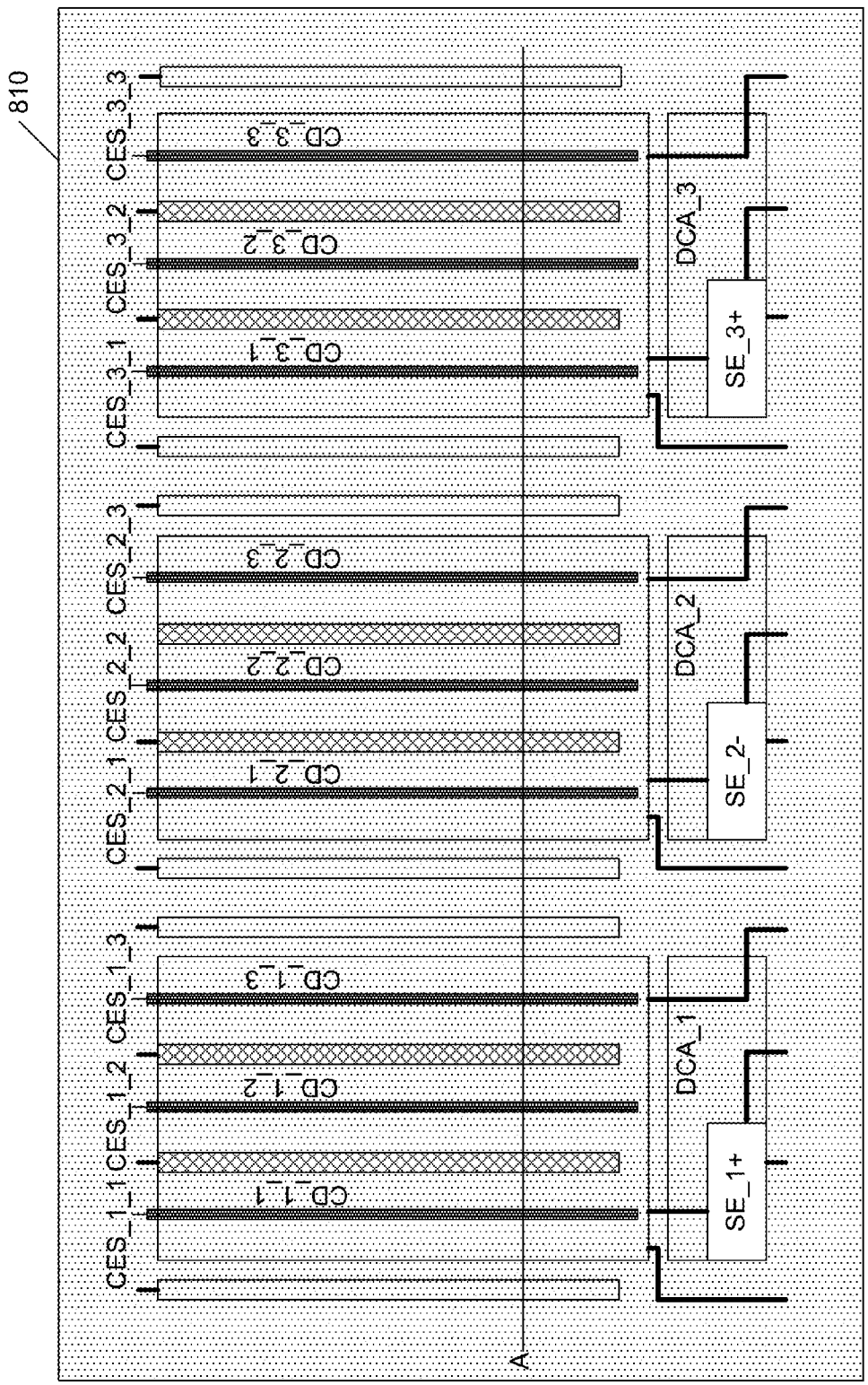

Each common electrode CES_X_Y has a corresponding color dot CD_X_Y. In general, the common electrode slice should bisect the corresponding color dot. Furthermore, the common electrode slice should extend in the same direction as the longest fringe field amplifying component (i.e. associated dots, extra-planar fringe field amplifiers, fringe field amplifying regions, etc.) bordering the color dot. Thus, in FIG. 8(a) common electrode slices CES_1_1, CES_1_2, CES_1_3, CES_2_1, CES_2_2, CES_2_3, CES_3_1, CES_3_2, and CES_3_3 are vertical slices that run the vertical length of the corresponding color dots. FIG. 8(b) superimposes common electrode 810 and the common electrode slices over color dots and other components of pixel design 810-SCE. Furthermore, in FIG. 8(b), the common electrode slices are darkly shaded to more clearly illustrate the positioning of the common electrode slices. As illustrated in FIG. 8(b), common electrode slice CES_1_1, bisects color dot CD_1_1 and runs in the same direction as extra-planar fringe field amplifier EPFFA_1_1 (see FIG. 4(a)). Furthermore common electrode slices CES_1_2, CES_1_3, CES_2_1, CES_2_2, CES_2_3, CES_3_1, CES_3_2, and CES_3_3 vertically bisects color dot CD_1_2, CD_1_3, CD_2_1, CD_2_2, CD_2_3, CD_3_1, CD_3_2, and CD_3_3, respectively.

Figure 8C:
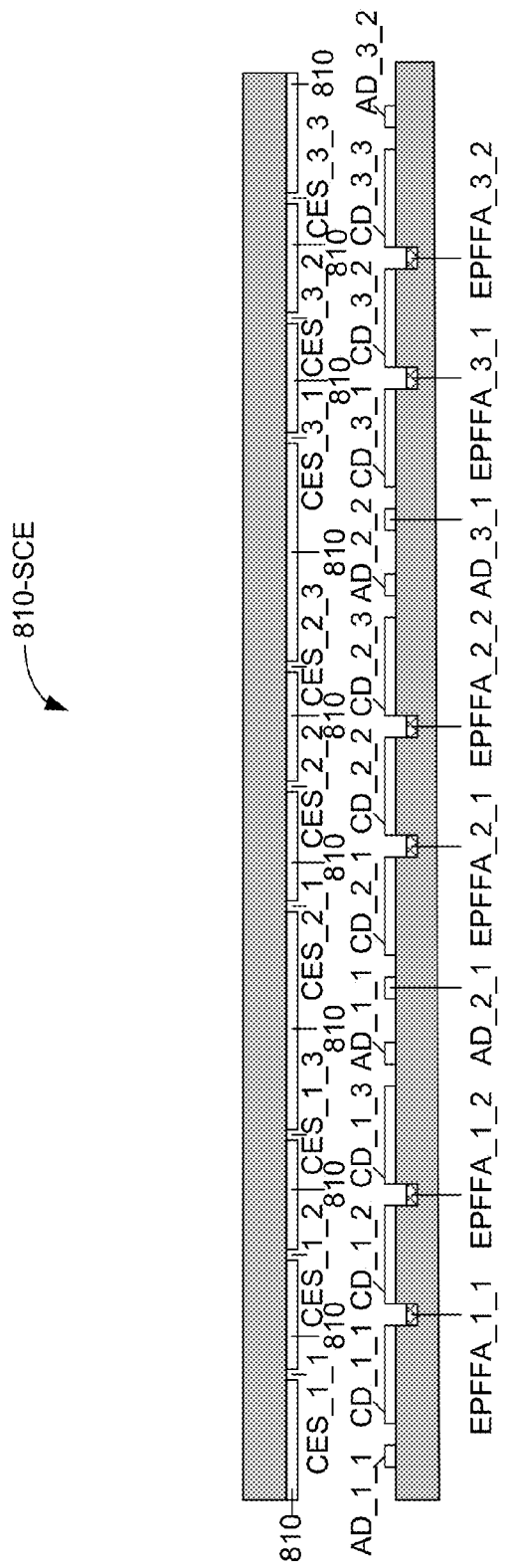

FIG. 8(c) shows a cross section of pixel design 410-SCE taken at the A-A' cut. Specifically, FIG. 8(c) shows cross section of associated dots AD_1_1, AD_1_2, AD_2_1, AD_2_2, AD_3_1, and AD_3_3, color dots CD_1_1, CD_1_2, CD_1_3, CD_2_1, CD_2_2, CD_2_3, CD_3_1, CD_3_2, and CD_3_3, and extra-planar fringe field amplifiers EPFFA_1_1, EPFFA_1_2, EPFFA_2_1, EPFFA_2_2, EPFFA_3_1, and EPFFA_3_2. The associated dots and color dots are in a first plane and the extra-planar fringe field amplifiers are in a second plane. Specifically, the extra-planar fringe field amplifiers of pixel design 410-SCE are on a lower plane than the associated dots and the color dots. More specifically, the top of the extra planar fringe field amplifiers are separated from bottom of the color dots by an amplifier depth spacing ADS. FIG. 8(c) also shows the common electrode substrate of pixel design 810-SCE. The cross sectional view shows eight separated portions of common electrode 810. Specifically, each portion is separated due to a common electrode slice. In particular electrode slices CES_1_1, CES_1_2, CES_1_3, CES_2_1, CES_2_2, CES_2_3, CES_3_1, CES_3_2, and CES_3_3 are centered over color dot CD_1_1, CD_1_2, CD_1_3, CD_2_1, CD_2_2, CD_2_3, CD_3_1, CD_3_2, and CD_3_3, respectively. The common electrode slices are used the enhance liquid crystal domains. Specifically, the domains of the liquid crystals may be disturbed by interference fields or high voltages. The disturbance may cause asymmetry in the domains. A common electrode slice in the middle of a color dot enhances the stability of the liquid crystal domains.

Figure 9:
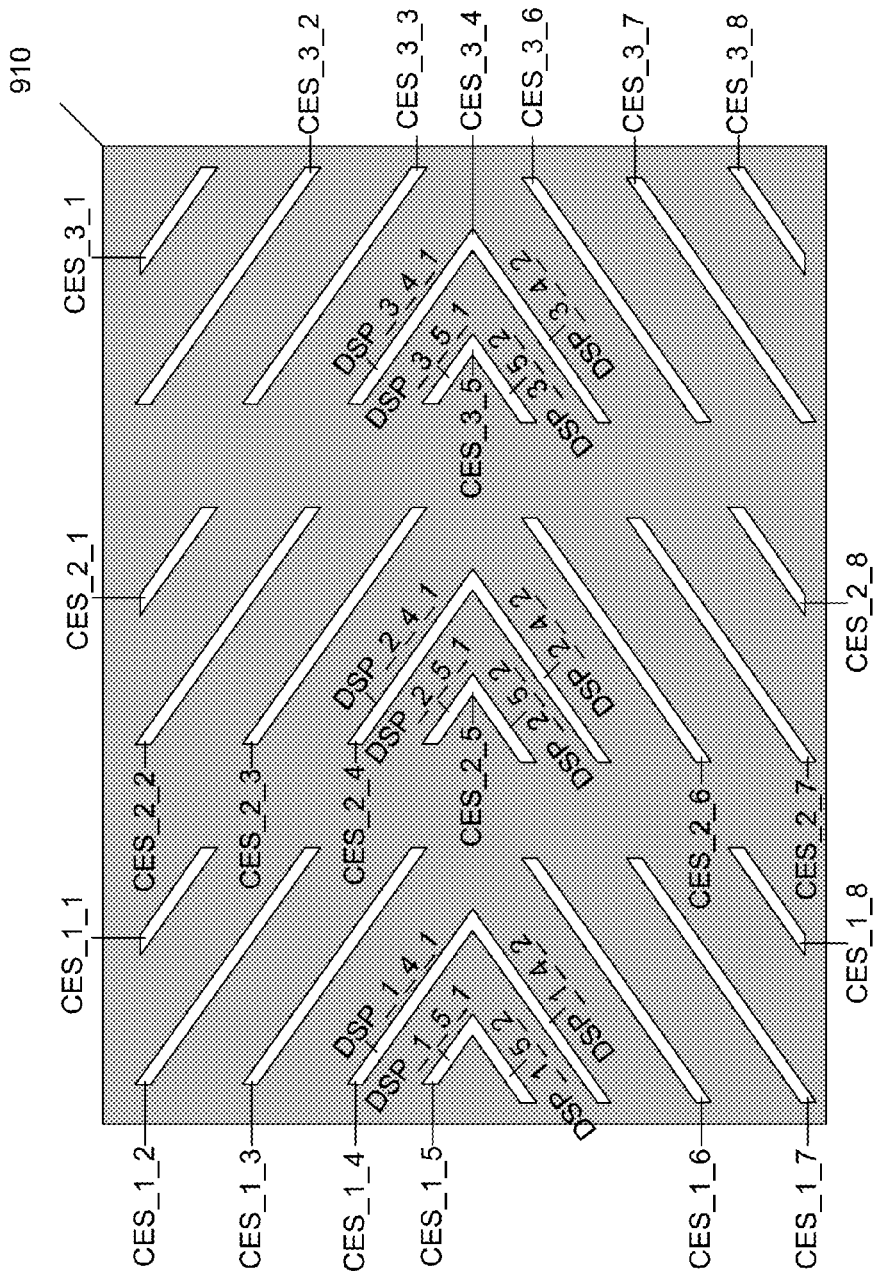
FIG. 9 illustrates a sliced common electrode in accordance with one embodiment of the present invention.

FIG. 9 shows a sliced common electrode 910 that can be used with pixel design 510 to further enhance the liquid crystal domains. Specifically sliced common electrode 910 includes a common electrode slice for each color dot of pixel design 510. The common electrode slices are centered over the corresponding color dots. Specifically, common electrode 910 includes common electrode slices CES_1_1, CES_1_2, CES_1_3, CES_1_4, CES_1_5, CES_1_6, CES_1_7, CES_1_8, CES_2_1, CES_2_2, CES_2_3, CES_2_4, CES_2_5, CES_2_6, CES_2_7, CES_2_8, CES_3_1, CES_3_2, CES_3_3, CES_3_4, CES_3_5, CES_3_6, CES_3_7, and CES_3_8. Common electrode slice CES_1_1, which is to be centered over color dot CD_1_1 of pixel design 510, is a short diagonal slice that goes down and to the right. Common electrode slice CES_1_2, which is to be centered over color dot CD_1_2, is a long diagonal slice that goes down and to the right. Common electrode slice CES_1_3, which is to be centered over color dot CD_1_3, is a long diagonal slice that goes down and to the right. Common electrode slice CES_1_4, which is to be centered over color dot CD_1_4, is a large V-shaped slice that has a first diagonal slice portion DSP_1_4_1 that goes down and to the right and a second diagonal slice portion DSP_1_4_2 that goes down and to the left. Common electrode slice CES_1_5, which is to be centered over color dot CD_1_5, is a small V-shaped slice that has a first diagonal slice portion DSP_1_5_1 that goes down and to the right and a second diagonal slice portion DSP_1_5_2 that goes down and to the left. Common electrode slice CES_1_6, which is to be centered over color dot CD_1_6, is a long diagonal slice that goes down and to the left. Common electrode slice CES_1_7, which is to be centered over color dot CD_1_7, is a long diagonal slice that goes down and to the left. Common electrode slice CES_1_8, which is to be centered over color dot CD_1_8, is a short diagonal slice that goes down and to the left.

Common electrode slice CES_2_1, which is to be centered over color dot CD_2_1 of pixel design 510, is a short diagonal slice that goes down and to the right. Common electrode slice CES_2_2, which is to be centered over color dot CD_2_2, is a long diagonal slice that goes down and to the right. Common electrode slice CES_2_3, which is to be centered over color dot CD_2_3, is a long diagonal slice that goes down and to the right. Common electrode slice CES_2_4, which is to be centered over color dot CD_2_4, is a large V-shaped slice that has a first diagonal slice portion DSP_2_4_1 that goes down and to the right and a second diagonal slice portion DSP_2_4_2 that goes down and to the left. Common electrode slice CES_2_5, which is to be centered over color dot CD_2_5, is a small V-shaped slice that has a first diagonal slice portion DSP_2_5_1 that goes down and to the right and a lower portion that goes down and to the left. Common electrode slice CES_2_6, which is to be centered over color dot CD_2_6, is a long diagonal slice that goes down and to the left. Common electrode slice CES_2_7, which is to be centered over color dot CD_2_7, is a long diagonal slice that goes down and to the left. Common electrode slice CES_2_8, which is to be centered over color dot CD_2_8, is a short diagonal slice that goes down and to the left.

Common electrode slice CES_3_1, which is to be centered over color dot CD_3_1 of pixel design 510, is a short diagonal slice that goes down and to the right. Common electrode slice CES_3_2, which is to be centered over color dot CD_3_2, is a long diagonal slice that goes down and to the right. Common electrode slice CES_3_3, which is to be centered over color dot CD_3_3, is a long diagonal slice that goes down and to the right. Common electrode slice CES_3_4, which is to be centered over color dot CD_3_4, is a large V-shaped slice that has a first diagonal slice portion DSP_3_4_1 that goes down and to the right and a second diagonal slice portion DSP_3_4_2 that goes down and to the left. Common electrode slice CES_3_5, which is to be centered over color dot CD_3_5, is a small V-shaped slice that has a first diagonal slice portion DSP_3_5_1 that goes down and to the right and a second diagonal slice portion DSP_3_5_2 that goes down and to the left. Common electrode slice CES_3_6, which is to be centered over color dot CD_3_6, is a long diagonal slice that goes down and to the left. Common electrode slice CES_3_7, which is to be centered over color dot CD_3_7, is a long diagonal slice that goes down and to the left. Common electrode slice CES_3_8, which is to be centered over color dot CD_3_8, is a short diagonal slice that goes down and to the left.

Figure 10:
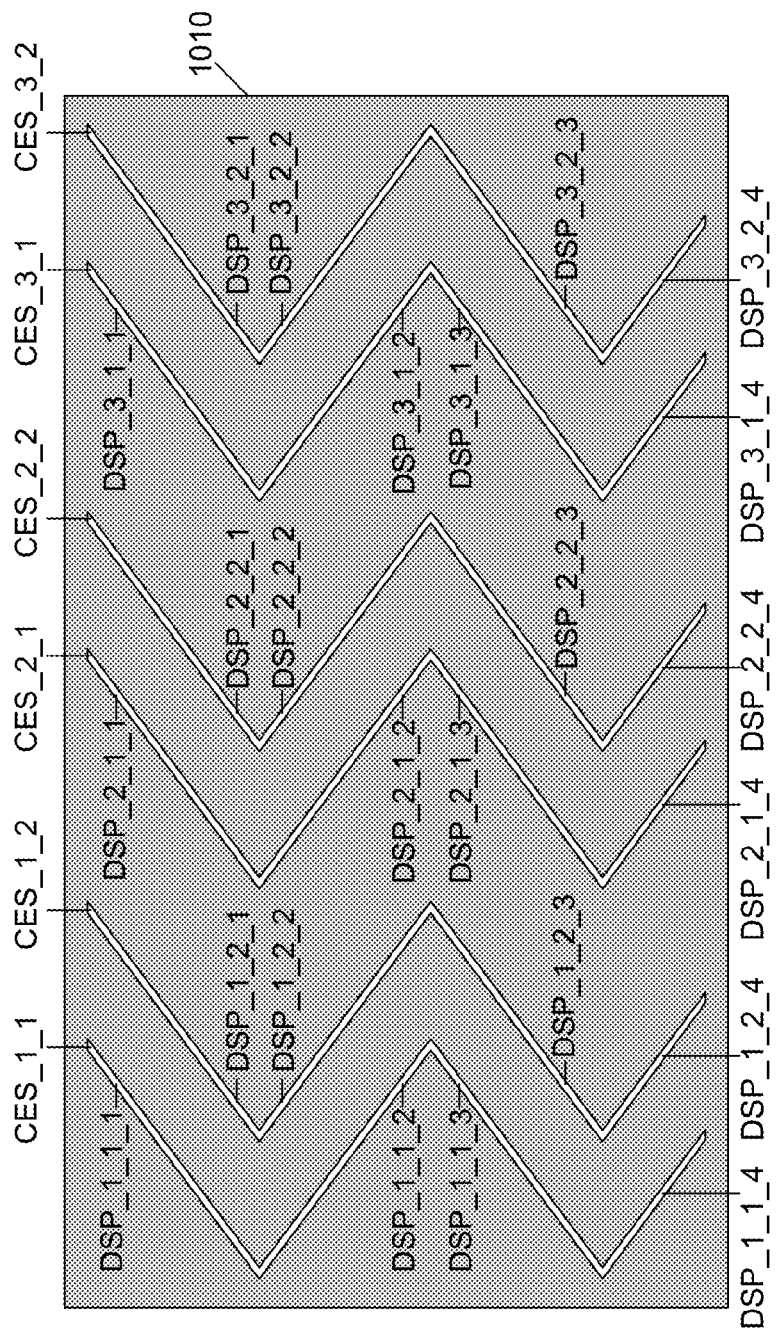
FIG. 10 illustrates a sliced common electrode in accordance with one embodiment of the present invention.

FIG. 10 shows a sliced common electrode 1010 that can be used with pixel design 610 to further enhance the liquid crystal domains. Specifically sliced common electrode 1010 includes two common electrode slices for each of the three color components. For clarity, the common electrode slices are referenced as CES_X_Y, where X indicates the color component and Y numerates the common electrode slice for the color component. Thus, common electrode 1010 includes common electrode slices CES_1_1 and CES_1_2 for color component CC_1, CES_2_1 and CES_2_2 for color component CC_2, and CES_3_1 and CES_3_2 for color component CC_3. Each common electrode slice of common electrode 1010 includes four diagonal slice portions. For clarity, diagonal slice portions of common electrode slice CES_X_Y are referenced as DSP X_Y Z, where X and Y indicates the common electrode slice and Z numerates the diagonal slice portion. Specifically, common electrode slice CES_1_1 includes diagonal slice portions DSP_1_1_1, DSP_1_1_2, DSP_1_1_3, and DSP_1_1_4. Diagonal slice portion DSP_1_1_1, which is to be centered over color dot CD_1_2 of pixel design 610, extends down and to the left. Diagonal slice portion DSP_1_1_2, which is to be centered over color dot CD_1_6 of pixel design 610, starts at the bottom end of diagonal slice portion DSP_1_1_1 and extends down and to the right. Diagonal slice portion DSP_1_1_3, which is to be centered over color dot CD_1_8 of pixel design 610, starts at the bottom end of diagonal slice portion DSP_1_1_2 and extends down and to the left. Diagonal slice portion DSP_1_1_4, which is to be centered over color dot CD_1_12 of pixel design 610, starts at the bottom end of diagonal slice portion DSP_1_1_3 and extends down and to the right.

Common electrode slice CES_1_2 includes diagonal slice portions DSP_1_2_1, DSP_1_2_2, DSP_1_2_3, and DSP_1_2_4. Diagonal slice portion DSP_1_2_1, which is to be centered over color dot CD_1_3 of pixel design 610, extends down and to the left. Diagonal slice portion DSP_1_2_2, which is to be centered over color dot CD_1_5 of pixel design 610, starts at the bottom end of diagonal slice portion DSP_1_2_1 and extends down and to the right. Diagonal slice portion DSP_1_2_3, which is to be centered over color dot CD_1_9 of pixel design 610, starts at the bottom end of diagonal slice portion DSP_1_2_2 and extends down and to the left. Diagonal slice portion DSP_1_2_4, which is to be centered over color dot CD_1_11 of pixel design 610, starts at the bottom end of diagonal slice portion DSP_1_2_3 and extends down and to the right.

Common electrode slice CES_2_1 includes diagonal slice portions DSP_2_1_1, DSP_2_1_2, DSP_2_1_3, and DSP_2_1_4. Diagonal slice portion DSP_2_1_1, which is to be centered over color dot CD_2_2 of pixel design 610, extends down and to the left. Diagonal slice portion DSP_2_1_2, which is to be centered over color dot CD_2_6 of pixel design 610, starts at the bottom end of diagonal slice portion DSP_2_1_1 and extends down and to the right. Diagonal slice portion DSP_2_1_3, which is to be centered over color dot CD_2_8 of pixel design 610, starts at the bottom end of diagonal slice portion DSP_2_1_2 and extends down and to the left. Diagonal slice portion DSP_2_1_4, which is to be centered over color dot CD_2_12 of pixel design 610, starts at the bottom end of diagonal slice portion DSP_2_1_3 and extends down and to the right.

Common electrode slice CES_2_2 includes diagonal slice portions DSP_2_2_1, DSP_2_2_2, DSP_2_2_3, and DSP_2_2_4. Diagonal slice portion DSP_2_2_1, which is to be centered over color dot CD_2_3 of pixel design 610, extends down and to the left. Diagonal slice portion DSP_2_2_2, which is to be centered over color dot CD_2_5 of pixel design 610, starts at the bottom end of diagonal slice portion DSP_2_2_1 and extends down and to the right. Diagonal slice portion DSP_2_2_3, which is to be centered over color dot CD_2_9 of pixel design 610, starts at the bottom end of diagonal slice portion DSP_2_2_2 and extends down and to the left. Diagonal slice portion DSP_2_2_4, which is to be centered over color dot CD_2_11 of pixel design 610, starts at the bottom end of diagonal slice portion DSP_2_2_3 and extends down and to the right.

Common electrode slice CES_3_1 includes diagonal slice portions DSP_3_1_1, DSP_3_1_2, DSP_3_1_3, and DSP_3_1_4. Diagonal slice portion DSP_3_1_1, which is to be centered over color dot CD_3_2 of pixel design 610, extends down and to the left. Diagonal slice portion DSP_3_1_2, which is to be centered over color dot CD_3_6 of pixel design 610, starts at the bottom end of diagonal slice portion DSP_3_1_1 and extends down and to the right. Diagonal slice portion DSP_3_1_3, which is to be centered over color dot CD_3_8 of pixel design 610, starts at the bottom end of diagonal slice portion DSP_3_1_2 and extends down and to the left. Diagonal slice portion DSP_3_1_4, which is to be centered over color dot CD_3_12 of pixel design 610, starts at the bottom end of diagonal slice portion DSP_3_1_3 and extends down and to the right.

Common electrode slice CES_3_2 includes diagonal slice portions DSP_3_2_1, DSP_3_2_2, DSP_3_2_3, and DSP_3_2_4. Diagonal slice portion DSP_3_2_1, which is to be centered over color dot CD_3_3 of pixel design 610, extends down and to the left. Diagonal slice portion DSP_3_2_2, which is to be centered over color dot CD_3_5 of pixel design 610, starts at the bottom end of diagonal slice portion DSP_3_2_1 and extends down and to the right. Diagonal slice portion DSP_3_2_3, which is to be centered over color dot CD_3_9 of pixel design 610, starts at the bottom end of diagonal slice portion DSP_3_2_2 and extends down and to the left. Diagonal slice portion DSP_3_2_4, which is to be centered over color dot CD_3_11 of pixel design 610, starts at the bottom end of diagonal slice portion DSP_3_2_3 and extends down and to the right.

Figure 11:
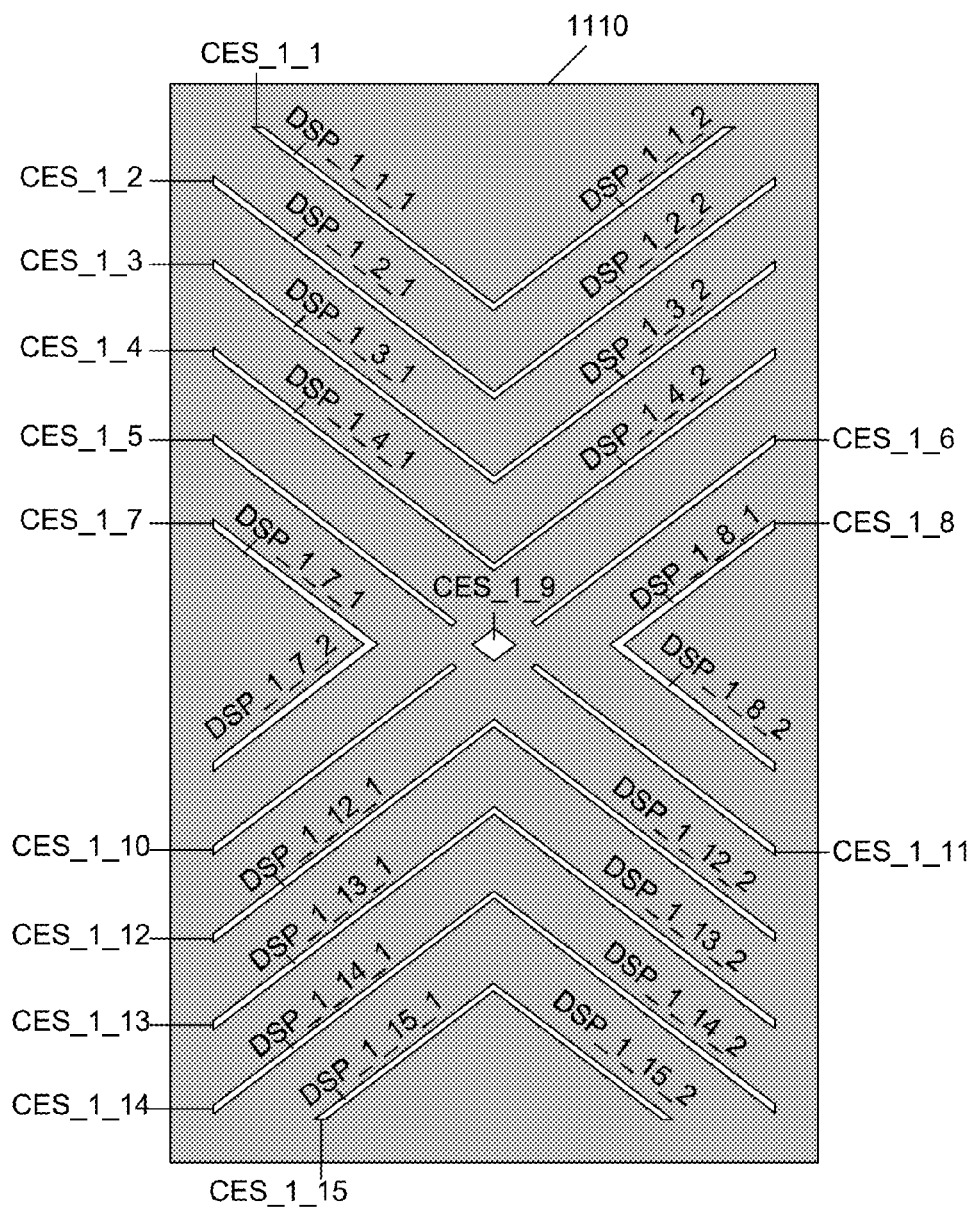
FIG. 11 illustrates a sliced common electrode in accordance with one embodiment of the present invention.

FIG. 11 shows a portion of a sliced common electrode 1110 that can be used with pixel design 710 to further enhance the liquid crystal domains. Specifically FIG. 11 only shows the portion of sliced common electrode 1110 for color component CC_1. The portions of sliced common electrode 1110 for color component CC_2 and color component CC_3 have the same layout as the portion shown in FIG. 11. The portion of common electrode 1110 for color component CC_1 includes fifteen common electrode slices, some of which includes multiple diagonal slice portions. Specifically, sliced common electrode 1110 includes common electrode slices CES_1_1, CES_1_2, CES_1_3, ... CES_1_14, and CES_1_15. Common electrode slice CES_1_1 includes diagonal slice portions DSP_1_1_1 and DSP_1_1_2. Diagonal slice portion DSP_1_1_1, which is to be centered over color dot CD_1_2 of pixel design 710, extends down and to the right. Diagonal slice portion DSP_1_1_2, which is to be centered over color dot CD_1_18 of pixel design 710, starts at the bottom end of diagonal slice portion DSP_1_1_1 and extends up and to the right. Common electrode slice CES_1_2 includes diagonal slice portions DSP_1_2_1 and DSP_1_2_2. Diagonal slice portion DSP_1_2_1, which is to be centered over color dot CD_1_3 of pixel design 710, extends down and to the right. Diagonal slice portion DSP_1_2_2, which is to be centered over color dot CD_1_19 of pixel design 710, starts at the bottom end of diagonal slice portion DSP_1_2_1 and extends up and to the right. Common electrode slice CES_1_3 includes diagonal slice portions DSP_1_3_1 and DSP_1_3_2. Diagonal slice portion DSP_1_3_1, which is to be centered over color dot CD_1_4 of pixel design 710, extends down and to the right. Diagonal slice portion DSP_1_3_2, which is to be centered over color dot CD_1_20 of pixel design 710, starts at the bottom end of diagonal slice portion DSP_1_3_1 and extends up and to the right. Common electrode slice CES_1_4 includes diagonal slice portions DSP_1_4_1 and DSP_1_4_2. Diagonal slice portion DSP_1_4_1, which is to be centered over color dot CD_1_5 of pixel design 710, extends down and to the right. Diagonal slice portion DSP_1_4_2, which is to be centered over color dot CD_1_21 of pixel design 710, starts at the bottom end of diagonal slice portion DSP_1_4_1 and extends up and to the right.

Common electrode slice CES_1_5, which is to be centered over color dot CD_1_6, begins at the midpoint of the left side of color dot CD_1_6 and extends down and to the right. Common electrode slice CES_1_6, which is to be centered over color dot CD_1_22, begins at the midpoint of the right side of color dot CD_1_22 and extends down and to the left. Common electrode slice CES_1_7 includes diagonal slice portions DSP_1_7_1 and DSP_1_7_2. Diagonal slice portion DSP_1_7_1, which is to be centered over color dot CD_1_7 of pixel design 710, extends down and to the right. Diagonal slice portion DSP_1_7_2, which is to be centered over color dot CD_1_9 of pixel design 710, starts at the bottom end of diagonal slice portion DSP_1_7_1 and extends down and to the left. Common electrode slice CES_1_8 includes diagonal slice portions DSP_1_8_1 and DSP_1_8_2. Diagonal slice portion DSP_1_8_1, which is to be centered over color dot CD_1_23 of pixel design 710, extends down and to the left. Diagonal slice portion DSP_1_8_2, which is to be centered over color dot CD_1_25 of pixel design 710, starts at the bottom end of diagonal slice portion DSP_1_8_1 and extends down and to the right. Common electrode slice CES_1_9 is a diamond shaped void that is to be centered on color dot CD_1_15. Common electrode slice CES_1_10, which is to be centered over color dot CD_1_10, begins at the midpoint of the left side of color dot CD_1_10 and extends up and to the right. Common electrode slice CES_1_11, which is to be centered over color dot CD_1_26, begins at the midpoint of the right side of color dot CD_1_26 and extends up and to the left.

Common electrode slice CES_1_12 includes diagonal slice portions DSP_1_12_1 and DSP_1_12_2. Diagonal slice portion DSP_1_12_1, which is to be centered over color dot CD_1_11 of pixel design 710, extends up and to the right. Diagonal slice portion DSP_1_12_2, which is to be centered over color dot CD_1_27 of pixel design 710, starts at the top end of diagonal slice portion DSP_1_12_1 and extends down and to the right. Common electrode slice CES_1_13 includes diagonal slice portions DSP_1_13_1 and DSP_1_13_2. Diagonal slice portion DSP_1_13_1, which is to be centered over color dot CD_1_12 of pixel design 710, extends up and to the right. Diagonal slice portion DSP_1_13_2, which is to be centered over color dot CD_1_28 of pixel design 710, starts at the top end of diagonal slice portion DSP_1_13_1 and extends down and to the right. Common electrode slice CES_1_14 includes diagonal slice portions DSP_1_14_1 and DSP_1_14_2. Diagonal slice portion DSP_1_14_1, which is to be centered over color dot CD_1_13 of pixel design 710, extends up and to the right. Diagonal slice portion DSP_1_14_2, which is to be centered over color dot CD_1_29 of pixel design 710, starts at the top end of diagonal slice portion DSP_1_14_1 and extends down and to the right. Common electrode slice CES_1_15 includes diagonal slice portions DSP_1_15_1 and DSP_1_15_2. Diagonal slice portion DSP_1_15_1, which is to be centered over color dot CD_1_14 of pixel design 710, extends up and to the right. Diagonal slice portion DSP_1_15_2, which is to be centered over color dot CD_1_30 of pixel design 710, starts at the top end of diagonal slice portion DSP_1_15_1 and extends down and to the right.

Many of the common electrode slices shown in the embodiments of FIGS. 9, 10, and 11 have multiple diagonal slice portions. However, in other embodiments of the present invention, common electrode slices having multiple portions may be split into multiple common electrode slices. For example, in one embodiment of the present invention, the four diagonal slice portions of each of the common electrode slices of electrode 1010 are separated four separate common electrode slices. Furthermore, in other embodiments of the present invention, common electrode slices can also include horizontal slice portions and vertical slice portions.

Even though, AIFF MVA LCDs in accordance with the present invention provide wide viewing angle at a low cost, some embodiments of the present invention use optical compensation methods to further increase the viewing angle. For example, some embodiments of the present invention use negative birefringence optical compensation films with vertical oriented optical axis on the top or bottom substrate or both top and bottom substrates to increase viewing angle. Other embodiments may use uniaxial optical compensation films or biaxial optical compensation films with a negative birefringence. In some embodiments, positive compensation films with a parallel optical axis orientation can add to the negative birefringence film with a vertical optical axis orientation. Furthermore, multiple films that include all combinations could be used. Other embodiments may use a circular optical polarizer to improve the optical transmission and viewing angle. Other embodiments may use a circular optical polarizer with the optical compensation films to further improve the optical transmission and viewing angle. Furthermore, some embodiments of the present invention use black matrix (BM) to cover extra-planar fringe field amplifiers to make the extra-planar fringe field amplifiers opaque. Use of the black matrix improves the contrast ratio of the display and may provide better color performance.

In the various embodiments of the present invention, novel structures and methods have been described for creating a multi-domain vertical alignment liquid crystal display without the use of physical features on the substrate. The various embodiments of the structures and methods of this invention that are described above are illustrative only of the principles of this invention and are not intended to limit the scope of the invention to the particular embodiment described. For example, in view of this disclosure those skilled in the art can define other pixel definitions, dot polarity patterns, pixel designs, color components, fringe field amplifying regions, extra planar fringe field amplifiers, vertical amplifying portions, horizontal amplifying portions, diagonal amplifying portions, common electrode slices, diagonal slice portions, horizontal slice portions, vertical slice portions, polarities, fringe fields, electrodes, substrates, films, and so forth, and use these alternative features to create a method or system according to the principles of this invention. Thus, the invention is limited only by the following claims.

What is claimed is:

1. A pixel for a display comprising:
    a first color component comprising
        a first first-component color dot;
        a second first-component color dot;
        third first-component color dot; and
        a fourth first-component color dot;
    a first first-component extra-planar fringe field amplifier comprising:
        a first amplifying portion located between the first first-component color dot and the second first-component color dot;
        a first diagonal amplifying portion between the first first-component color dot and the third first-component color dot; and
        a second diagonal amplifying portion between the second first-component color dot and the fourth first-component color dot;
    a sliced common electrode comprising:
        a first common electrode slice, wherein the first common electrode slice comprises a first diagonal slice portion over the first first-component color dot and a second diagonal slice portion over the second first-component color dot; and
        a second common electrode slice having a first diagonal slice portion and a second diagonal slice portion, wherein the first diagonal slice portion of the second common electrode slice lies over the third first-component color dot and the second diagonal slice portion of the second common electrode slice lies over the fourth first-component color dot.

2. The pixel of claim 1,
    wherein the first color component further comprises a fifth first-component color dot; and
    wherein the first common electrode slice of the sliced common electrode further comprises a third diagonal slice portion over the fifth first-component color dot.

3. The pixel of claim 2,
    wherein the first color component further comprises a sixth first-component color dot; and
    wherein the first common electrode slice of the sliced common electrode further comprises a fourth diagonal slice portion over the sixth first-component color dot.

4. The pixel of claim 1, wherein the first diagonal amplifying portion of the first first-component extra-planar fringe field amplifier is centered between the first diagonal slice portion of the first common electrode slice and the first diagonal slice portion of the second common electrode slice.

5. The pixel of claim 4, wherein the second diagonal amplifying portion of the first first-component extra-planar fringe field amplifier is centered between the second diagonal slice portion of the first common electrode slice and the second diagonal slice portion of the second common electrode slice.

6. The pixel of claim 1 further comprising:
    a second color component comprising
        a first second-component color dot; and
        a second second-component color dot;
    a first second-component extra-planar fringe field amplifier having a first amplifying portion located between the first second-component color dot and the second second-component color dot; and
    wherein the sliced common electrode further comprises a third common electrode slice, wherein the third common electrode slice comprises a first diagonal slice portion over the first second-component color dot and a second diagonal slice portion over the second second-component color dot.

7. The pixel of claim 6, further comprising:
    a first switching element coupled to the first first-component color dot and the second first component color dot; and
    a second switching element coupled to the first second-component color dot and the second second-component color dot.

8. The pixel of claim 7, wherein the first switching element is configured to have a first polarity when the second switching element has a second polarity.

9. The pixel of claim 1, further comprising a first switching element coupled to the first first-component color dot and the second first-component color dot; and wherein the first switching element is configured to have a first polarity when the first first-component extra-planar fringe field amplifier is configured to have a second polarity.

\* \* \* \* \*